United States Patent
Gharachorloo et al.

(10) Patent No.: US 6,622,218 B2
(45) Date of Patent: Sep. 16, 2003

(54) CACHE COHERENCE PROTOCOL ENGINE AND METHOD FOR EFFICIENT PROCESSING OF INTERLEAVED MEMORY TRANSACTIONS IN A MULTIPROCESSOR SYSTEM

(75) Inventors: Kourosh Gharachorloo, Menlo Park, CA (US); Luiz A. Barroso, Mountain View, CA (US); Mosur K. Ravishankar, Mountain View, CA (US); Robert J. Stets, Palo Alto, CA (US)

(73) Assignee: Hewlett-Packard Development Company, LP., Houston, TX (US)

( * ) Notice: Subject to any disclaimer, the term of this patent is extended or adjusted under 35 U.S.C. 154(b) by 87 days.

(21) Appl. No.: 10/042,029

(22) Filed: Jan. 7, 2002

(65) Prior Publication Data

US 2002/0087806 A1 Jul. 4, 2002

Related U.S. Application Data

(63) Continuation-in-part of application No. 09/878,982, filed on Jun. 11, 2001.
(60) Provisional application No. 60/210,675, filed on Jun. 10, 2000.

(51) Int. Cl.$^7$ ................................................ G06F 12/00
(52) U.S. Cl. ...................... 711/141; 711/157; 711/158; 711/167; 713/400; 713/500; 713/600
(58) Field of Search .............................. 711/127, 137, 711/141, 149, 150, 151, 154, 157, 158, 167, 168, 169; 713/400, 501, 502, 600

(56) References Cited

U.S. PATENT DOCUMENTS

| | | | | | |
|---|---|---|---|---|---|
| 5,644,753 | A | * | 7/1997 | Ebrahim et al. | 711/131 |
| 5,958,011 | A | * | 9/1999 | Arimilli et al. | 709/224 |
| 6,154,812 | A | * | 11/2000 | Hetherington et al. | 711/122 |
| 6,266,778 | B1 | * | 7/2001 | Bell | 713/400 |
| 2001/0002481 | A1 | * | 5/2001 | Itoh et al. | 711/167 |

* cited by examiner

Primary Examiner—Donald Sparks
Assistant Examiner—Christian P. Chace

(57) ABSTRACT

The present invention relates generally to a protocol engine for use in a multiprocessor computer system. The protocol engine, which implements a cache coherence protocol, includes a clock signal generator for generating signals denoting interleaved even clock periods and odd clock periods, a memory transaction state array for storing entries, each denoting the state of a respective memory transaction, and processing logic. The memory transactions are divided into even and odd transactions whose states are stored in distinct sets of entries in the memory transaction state array. The processing logic has interleaving circuitry for processing during even clock periods the even memory transactions and for processing during odd clock periods the odd memory transactions. Moreover, the protocol engine is configured to transition from one memory transaction to another in a minimum number of clock cycles. This design improves efficiency for processing commercial workloads, such as on-line transaction processing (OLTP) by taking certain steps in parallel.

60 Claims, 41 Drawing Sheets

| 1st Clock Cycle (ODD) | 2nd Clock Cycle (EVEN) | 3RD Clock Cycle (ODD) | 4th Clock Cycle (EVEN) |
|---|---|---|---|
| Select a message from an input source. Step 2502. | Identify an instruction address corresponding to a running memory transaction, if there is one, and determine whether an instruction corresponding to the instruction address can be executed during the next even clock cycle. Step 2504. | Begin processing the message selected in step 2512 during the 2nd clock cycle or searching for and activating a suspended memory transaction. Step 2514. | Finish processing message selected during the 2nd clock cycle. Step 2518. |
| | Identify an instruction address for an active memory transaction, if any. Step 2506. | Select a message stored in an input buffer. Step 2516. | |
| | Identify an instruction address for the selected message and determine whether an instruction corresponding to the instruction address can be executed during the next even clock cycle. (See additional details in Figure 26.) Step 2508. | | |
| | Select an identified instruction address according to a predefined prioritization scheme. Step 2510. | | |
| | Select a message from an input source or initiate activation of a suspended memory transaction. Step 2512. | | |

Selecting and Processing a Message

Microcode Instruction Format

TSRF entry format

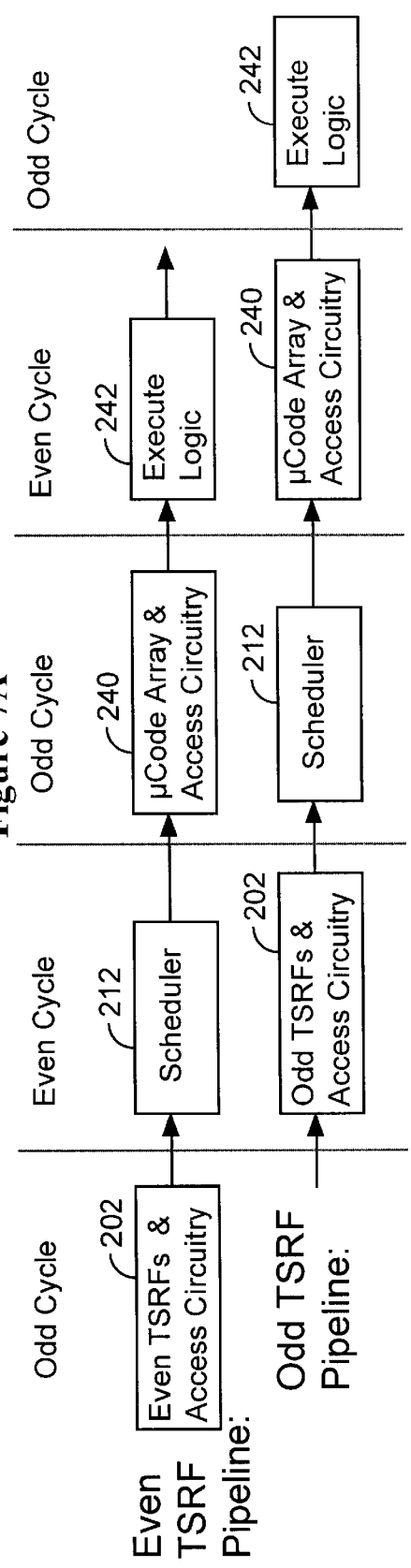

For Direct Mapped L1 Cache:
Address Bit Groups = ABCD
Line Address = ABC
Tag = A
Cache Index for Line = BC
State = invalid, shared, clean exclusive, dirty exclusive For 2-way Set Associative Cache:
Address Bit Groups = ABCD
Line Address = ABC
Tag = AB
Cache Index for Line = C

| |
|---|
| A buffered, high priority message from the ICS |
| A buffered, high priority message from the PS with a TSRF entry ID |
| A buffered, high priority message from the PS without a TSRF entry ID |
| A buffered, low priority message from the ICS |
| A buffered, low priority message from the PS |
| A buffered, I/O message from the PS |
| An unbuffered, low priority, high priority, or I/O message from the PS or the ICS |

Message Selection Prioritization Order (from highest to lowest priority)

FIGURE 15

| 1st Clock Cycle (ODD) | 2nd Clock Cycle (EVEN) | 3RD Clock Cycle (ODD) | 4th Clock Cycle (EVEN) |
| --- | --- | --- | --- |
| Select a message from an input source. Step 2502. | Identify an instruction address corresponding to a running memory transaction, if there is one, and determine whether an instruction corresponding to the instruction address can be executed during the next even clock cycle. Step 2504. | Begin processing the message selected in step 2512 during the 2nd clock cycle or searching for and activating a suspended memory transaction. Step 2514. | Finish processing message selected during the 2nd clock cycle. Step 2518. |
|  | Identify an instruction address for an active memory transaction, if any. Step 2506. | Select a message stored in an input buffer. Step 2516. |  |
|  | Identify an instruction address for the selected message and determine whether an instruction corresponding to the instruction address can be executed during the next even clock cycle. (See additional details in Figure 26.) Step 2508. |  |  |
|  | Select an identified instruction address according to a predefined prioritization scheme. Step 2510. |  |  |
|  | Select a message from an input source or initiate activation of a suspended memory transaction. Step 2512. |  |  |

Selecting and Processing a Message

Figure 25

| 2nd Clock Cycle |
|---|
| Merge the selected high priority message having a TSRF entry ID with a matching, waiting memory transaction. Step 2610. |
| Copy the merged instruction address into the TSRF entry identified by a TSRF entry ID extracted in step 2610. Step 2612. |

Table 2602

| 2nd Clock Cycle |
|---|
| Extract an instruction address from the selected low priority message. Step 2620. |
| Check for a conflict between the new memory transaction and a memory transaction. Step 2622. |
| Allocate an available TSRF entry to the new memory transaction. Step 2624. |
| If the allocation is successful, copy the extracted instruction address into the allocated TSRF entry. Step 2626. |

Table 2604

| 2nd Clock Cycle |
|---|
| Extract an instruction address from the selected high priority message not having a TSRF entry ID. Step 2630. |
| Check for a conflict between the new memory transaction and a memory transaction. Step 2632. |
| Allocate an available TSRF entry to the new memory transaction. Step 2634. |
| Determine whether there is a matching, waiting memory transaction for selected message and, if there is, save its TSRF entry ID to the selected message. Step 2636. |
| If the allocation is successful, no memory transaction conflicts with the new memory transaction, and there is no matching, waiting memory transaction for the selected message, copy the extracted instruction address into the allocated TSRF entry. Step 2638. |

Table 2606

Figure 26

| 3<sup>RD</sup> Clock Cycle | 4<sup>TH</sup> Clock Cycle |
|---|---|
| Copy an instruction corresponding to the selected instruction address into the current instruction buffer. Step 2702. | Execute the instruction corresponding to the selected instruction address. Step 2710. |
| Copy information from an entry corresponding to the selected instruction address into the current even TSRF buffer. Step 2704. | |
| Set the state of the memory transaction corresponding to the selected instruction address to Running. Step 2706. | |
| Finish processing message selected during the 1<sup>st</sup> clock cycle. Step 2708. | |

Steps Taken After Scheduling an Active Transaction in Step 2510

Figure 27

| 3<sup>RD</sup> Clock Cycle | 3<sup>RD</sup> Clock Cycle |
|---|---|
| Copy information from the selected message into a corresponding entry. Step 2810. | If an entry is available in step 2624, copy information from the selected message into the allocated entry. Step 2820. |
| Set the state of the input buffer that stores the selected message to Invalid. Step 2814. | If an entry is available in step 2624, set the state of the input buffer Invalid. Step 2824. |

Table 2802             Table 2804

| 3<sup>RD</sup> Clock Cycle |
|---|
| If an entry is available in step 2634, there is no matching, waiting memory transaction for the selected message, and no memory transaction conflicts with the selected message, copy information from the selected message into the allocated entry. Step 2830. |
| If there is a matching, waiting memory transaction for the selected message, merge the selected message with the waiting entry. Step 2834. |
| If there is a matching, waiting memory transaction for the selected message or no memory transaction is conflicting with the selected message and an entry is not available in step 2634, set the state of the input buffer that stores the selected message to Invalid. Step 2840. |
| If there is no matching, waiting memory transaction for the selected message, the new memory transaction conflicts with an existing memory transaction, and the selected message was speculatively selected from the PS, copy contents of the selected message into an input buffer for subsequent processing. Step 2842. |

Table 2806

Processing of Selected Message for Which a Memory Transaction Is Not Scheduled in Step 2510

Figure 28

| 3<sup>RD</sup> Clock Cycle | 4<sup>TH</sup> Clock Cycle | | |
|---|---|---|---|
| Copy an instruction corresponding to the selected instruction address into the current instruction buffer. Step 2902. | Execute the instruction corresponding to the selected instruction address. Step 2910. | | |
| Copy information from the selected message into the current even TSRF buffer. Step 2904. | | | |
| Set the state of the input buffer that stores the selected message to Invalid. Step 2908. | | | |

Processing of Selected Message with TSRF Entry ID and Corresponding Scheduled Transaction

Figure 29

| 3$^{RD}$ Clock Cycle | 4$^{TH}$ Clock Cycle |
|---|---|
| If a memory transaction conflicts with the selected message and an entry is available for allocation in step 2624, copy information from the selected message into the allocated entry. Step 3002. | If no memory transaction conflicts with the selected message and an entry is available for allocation in step 2624, execute the instruction corresponding to the selected instruction address. Step 3016. |
| If a memory transaction conflicts with the selected message or an entry is not available for allocation in step 2624, squash the selected instruction address. Step 3006. | |
| If no memory transaction conflicts with the selected message and an entry is available for allocation in step 2624, copy an instruction corresponding to the selected instruction address into the current instruction buffer. Step 3008. | |
| If no memory transaction conflicts with the selected message and an entry is available for allocation in step 2624, copy information from the selected message into the current even TSRF buffer. Step 3010. | |
| If an entry is available for allocation in step 2624, set the state of the input buffer that stores the selected message to Invalid. Step 3014. | |

Processing of Selected Low Priority Message and Corresponding Scheduled Transaction

Figure 30

| 3RD Clock Cycle | 4TH Clock Cycle |
|---|---|
| If there is no matching, waiting memory transaction for the selected message, no memory transaction conflicts with the selected message, and an entry is available for allocation in step 2634, copy information from the selected message into the current even TSRF buffer. Step 3102. | If there is no matching, waiting memory transaction for the selected message, no memory transaction conflicts with the selected message, and an entry is available for allocation in step 2634, execute the instruction corresponding to the selected instruction address. Step 3114. |
| If there is a matching, waiting memory transaction for the selected message, no memory transaction conflicts with the selected message, or no entry is available for allocation in step 2634, squash the selected instruction address. Step 3106. | |
| If there is a matching, waiting memory transaction for the selected message, merge the selected message into the waiting memory transaction. Step 3108. | |
| If there is a matching, waiting memory transaction for the selected message or no memory transaction conflicts with the selected message and an entry is available for allocation in step 2634, set the state of the input buffer that stores the selected message to Invalid. Step 3112. | |
| If there is no matching, waiting memory transaction for the selected memory transaction, a memory transaction conflicts with the new memory transaction, and the selected message was speculatively selected from the PS, copy contents of the selected message into an input buffer 192 for subsequent processing Step 3113. | |

Processing of Selected High Priority Message Without TSRF Entry ID and Corresponding Transaction

Figure 31

CACHE COHERENCE PROTOCOL ENGINE AND METHOD FOR EFFICIENT PROCESSING OF INTERLEAVED MEMORY TRANSACTIONS IN A MULTIPROCESSOR SYSTEM

This application is a continuation-in-part of U.S. patent application Ser. No. 09/878,982, filed Jun. 11, 2001, Scalable Multiprocessor System And Cache Coherence Method, which claimed priority on U.S. provisional patent application Ser. No. 60/210,675, filed Jun. 10, 2000.

RELATED APPLICATIONS

This application is related to, and hereby incorporates by reference, the following U.S. patent applications:

System and Method for Daisy Chaining Cache Invalidation Requests in a Shared-memory Multiprocessor System, filed Jun. 11, 2001, attorney docket number 9772-0329-999;

Multiprocessor Cache Coherence System and Method in Which Processor Nodes and Input/Output Nodes Are Equal Participants, filed Jun. 11, 2001, attorney docket number 9772-0324-999;

Cache Coherence Protocol Engine and Method for Processing Memory Transaction in Distinct Address Subsets During Interleaved Time Periods in a Multiprocessor System, filed Jun. 11, attorney docket number 9772-0327-999; and System And Method For Generating Cache Coherence Directory Entries And Error Correction Codes in a Multiprocessor System, U.S. Ser. No. 09/972,477, filed Oct. 5, 2001, which claims priority on U.S. provisional patent application No. 60/238,330, filed Oct. 5, 2000, which is also hereby incorporated by reference in its entirety.

FIELD OF INVENTION

The present invention relates generally to a multiprocessor computer system, and particularly to a multiprocessor system designed to reduce clock cycles required to switch from one memory transaction to another.

BACKGROUND OF THE INVENTION

High-end microprocessor designs have become increasingly more complex during the past decade, with designers continuously pushing the limits of instruction-level parallelism and speculative out-of-order execution. While this trend has led to significant performance gains on target applications such as the SPEC benchmark, continuing along this path is becoming less viable due to substantial increases in development team sizes and design times. Such designs are especially ill suited for important commercial applications, such as on-line transaction processing (OLTP), which suffer from large memory stall times and exhibit little instruction-level parallelism. Given that commercial applications constitute by far the most important market for high-performance servers, the above trends emphasize the need to consider alternative processor designs that specifically target such workloads. Furthermore, more complex designs are yielding diminishing returns in performance even for applications such as SPEC.

Commercial workloads such as databases and Web applications have surpassed technical workloads to become the largest and fastest-growing market segment for high-performance servers. Commercial workloads, such as on-line transaction processing (OLTP), exhibit radically different computer resource usage and behavior than technical workloads. First, commercial workloads often lead to inefficient executions dominated by a large memory stall component. This behavior arises from large instruction and data footprints and high communication miss rates that are characteristic for such workloads. Second, multiple instruction issue and out-of-order execution provide only small gains for workloads such as OLTP due to the data-dependent nature of the computation and the lack of instruction-level parallelism. Third, commercial workloads do not have any use for the high-performance floating-point and multimedia functionality that is implemented in modern microprocessors. Therefore, it is not uncommon for a high-end microprocessor to stall most of the time while executing commercial workloads, which leads to a severe under-utilization of its parallel functional units and high-bandwidth memory system. Overall, the above trends further question the wisdom of pushing for more complex processor designs with wider issue and more speculative execution, especially if the server market is the target.

SUMMARY OF THE INVENTION

The present invention relates generally to a protocol engine for use in a multiprocessor computer system. The protocol engine, which implements a cache coherence protocol, includes a clock signal generator for generating signals denoting interleaved even clock periods and odd clock periods, a memory transaction state array for storing entries, each denoting the state of a respective memory transaction, and processing logic. The memory transactions are divided into even and odd transactions whose states are stored in distinct sets of entries in the memory transaction state array. The processing logic has interleaving circuitry for processing during even clock periods the even memory transactions and for processing during odd clock periods the odd memory transactions. Moreover, the protocol engine is configured to transition from one memory transaction to another in a minimum number of clock cycles. This design improves efficiency for processing commercial workloads, such as on-line transaction processing (OLTP) by taking certain steps in parallel.

BRIEF DESCRIPTION OF THE DRAWINGS

Additional objects and features of the invention will be more readily apparent from the following detailed description and appended claims when taken in conjunction with the drawings, in which:

FIG. 7A is a table indicating operations performed during Even and Odd cycles of the execution unit of the protocol engine; FIG. 7B depicts Even and Odd logical pipelines in the protocol engine that share use of many circuitry components.

FIG. 15 illustrates a prioritization scheme for selecting messages from an input source.

FIGS. 25–31 illustrate steps that enable a preferred embodiment of the present invention.

DESCRIPTION OF THE PREFERRED EMBODIMENTS

All specific quantities (such as numbers of processors, number of nodes, memory sizes, bit sizes of data structures, operating speeds of components, number of interfaces, number of memory locations in buffers, numbers of cache lines), as well as the sizes and number of components in various data structures, disclosed in this document, are provided solely for purposes of explaining the operation of one particular embodiment. These quantities will typically vary, sometimes significantly, from one implementation of the invention to another.

The following is a list of abbreviations frequently used in the descriptions below:

CCP: cache coherence protocol;
FSM: finite state machine;
HPE: home protocol engine;
ICS: intra-chip switch;
I/O: input/output;
MC: memory controller;
PC: processor core;
RPE: remote protocol engine; and
TSRF: Transient State Register File.

Figure 1:
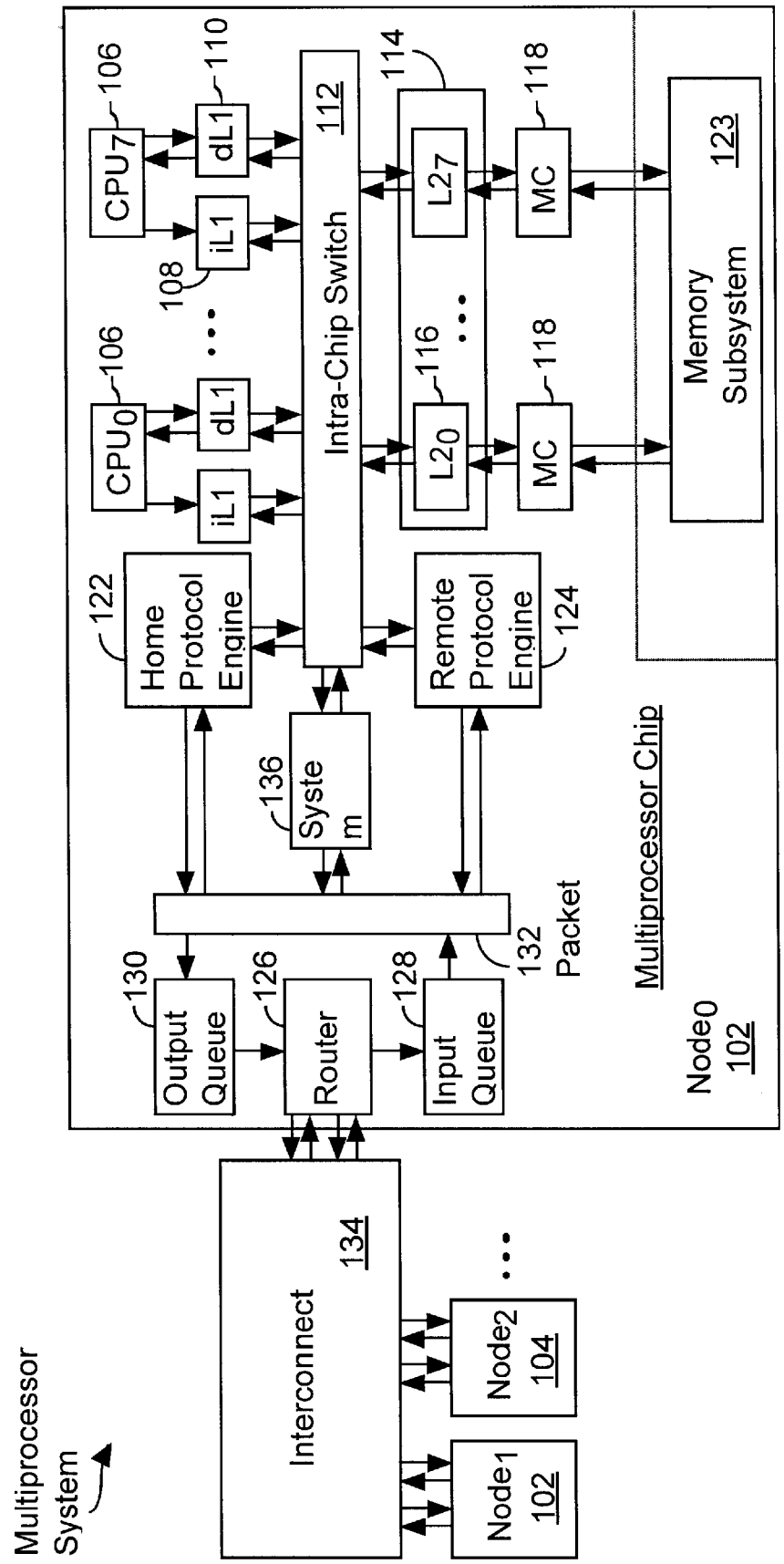
FIG. 1 is a block diagram of a multiprocessor system.

Referring to FIG. 1, there is shown a multiprocessor system 100 including a multiplicity of processor nodes 102 and an I/O nodes 104. Each processor node 102 is preferably implemented as a single chip multiprocessor. In a preferred embodiment, each processor node 102 has eight processor cores (PC) 106; however, other embodiments have two to sixteen PCs 106. The PCs 106, which may be comprised of a central processing unit, are processor cores since their caches, cache coherence logic and other supporting circuitry are shown separately.

Each processor core (PC) 106 is directly connected to dedicated instruction cache (iL1) 108 and data cache (dL1) 110 modules. These first-level caches (L1 cache modules) 108, 110 interface to other modules through an intra-chip switch (ICS) 112. Also connected to the ICS 112 is a logically shared second level cache (L2) 114 that is interleaved into eight separate modules 116, each with its own controller, on-chip tag, and data storage. Coupled to each L2 cache 116 is a memory controller (MC) 118 that preferably interfaces directly to a memory bank of DRAM (dynamic random access memory) chips (not shown) in a memory subsystem 123. In a preferred embodiment, each memory bank provides a bandwidth of 1.6 GB/sec, leading to an aggregate bandwidth of 12.8 GB/sec. Also connected to the ICS 112 are two protocol engines, the Home Protocol Engine (HPE) 122 and the Remote Protocol Engine (RPE) 124, which support shared memory across multiple nodes 102, 104 of the system. Multiple nodes are linked by a subsystem including a router (RT) 126, an input queue (IQ) 128, an output queue (OQ) 130, a packet switch (PS) 132, and a packet switched interconnect 134. The router 136 sends and receives packets to and from other nodes via the interconnect 134. The interconnect 134 physically links multiple nodes 102, 104. In a preferred embodiment the total interconnect bandwidth (in/out) for each node is 32 GB/sec. Finally, a system control (SC) module 136 takes care of miscellaneous maintenance-related functions (e.g., system configuration, initialization, interrupt distribution, exception handling, performance monitoring).

In a preferred embodiment, the various modules communicate exclusively through the connections shown in FIG. 1, which also represent the actual signal connections. This modular approach leads to a strict hierarchical decomposition of the single chip used to implement each node of the system, which allows for the development of each module in relative isolation along with well defined transactional interfaces and clock domains. While each processor node 102 uses a complete multiprocessor system on a chip, the processor nodes 102 do not have any I/O capability in this embodiment.

Figure 2:
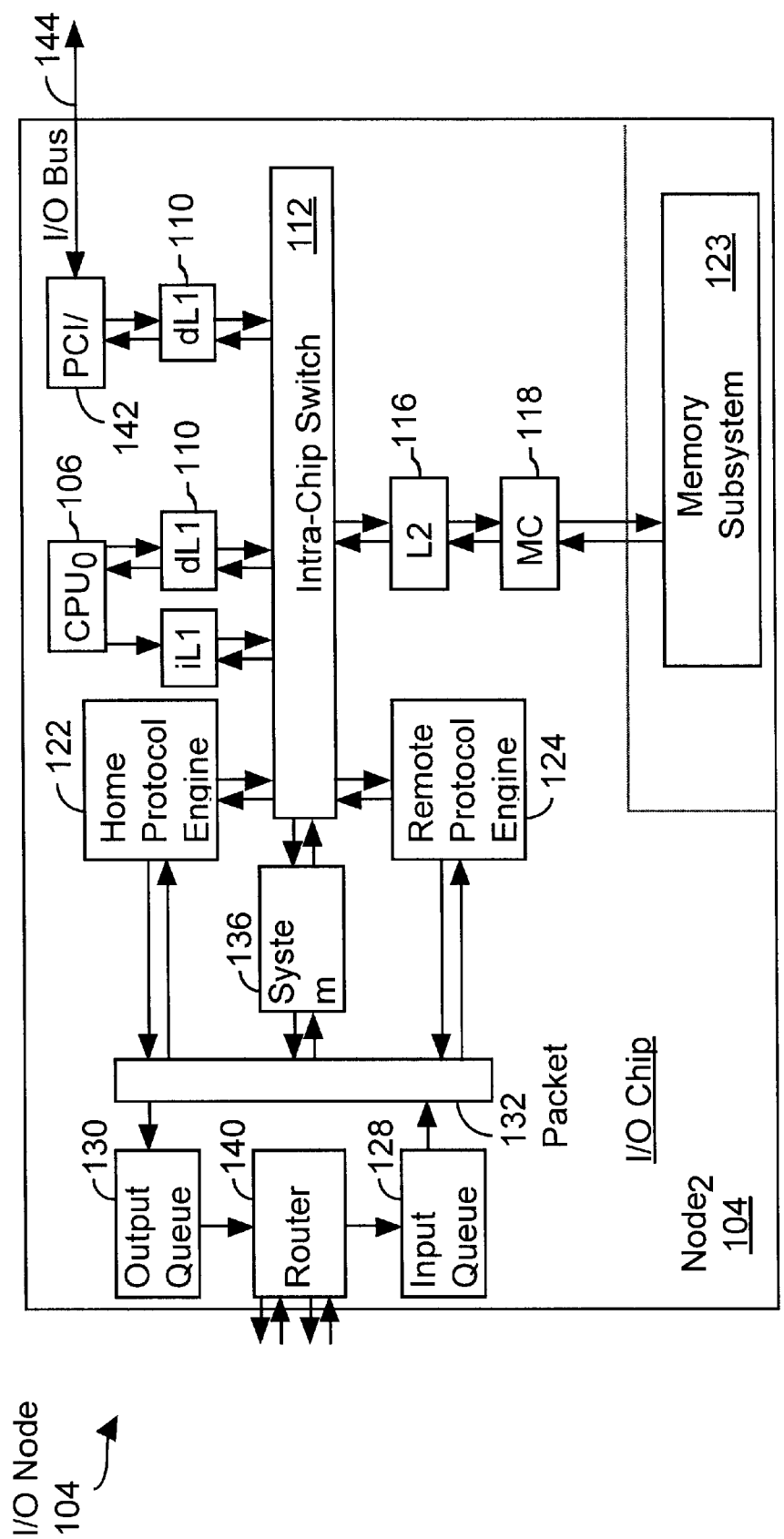
FIG. 2 is a block diagram of an input (I/O) node of the multiprocessor system of FIG. 1.

Instead, I/O is performed by I/O nodes 104, one of which is shown in FIG. 2. Each I/O node 104 is preferably implemented as a single chip that is relatively small in area compared to the chip used to implement the processor nodes 102. Each I/O node 104 is a stripped-down version of the processor node 102 having only one PC 106, one L2 cache 116 and one memory controller module 118. The router 140 on the I/O node 104 is a simplified version of router 126 having support for only two links instead of four, thus eliminating the need for a routing table. The I/O node 104 includes an I/O interface 142, called the PCI/X interface in a preferred embodiment because it provides an interface between a PCI bus and an I/O bus 144.

From the point of view of a programmer, the PC 106 on the I/O node 104 is indistinguishable from a PC 106 included on the processor node 102. Similarly, memory at the I/O node 104 fully participates in the global cache coherence scheme of the multiprocessor system 100 (FIG. 1). The presence of a PC 106 on the I/O node 104 provides several benefits. For instance, it enables optimizations such as scheduling device drivers on this processor for lower latency access to I/O, or virtualization of the interface to various I/O devices (e.g., by having the PC 106 interpret accesses to virtual control registers). Except for the PCI/X interface 142, most of the modules on the I/O node 104 are identical in design to those on the processor node 102. For example, the same first-level data cache module (dL1) 110 that is used with the PCs 106 is also used to interface to the PCI/X module 142. The dL1 module 110 also provides the PCI/X interface 142 with address translation, access to I/O space registers, and interrupt generation. The I/O node 104 may also be customized to support other I/O standards such as Fiber Channel and System I/O.

Referring back to FIG. 1, the multiprocessor system 100 in a preferred embodiment allows for glueless scaling up to 1023 nodes 102, 104, with an arbitrary ratio of I/O nodes 104 to processing nodes 102. The ratio of I/O nodes 104 to processor nodes 102 is adjustable to match the resource needs of any particular workload. Furthermore, the router 126, 140 in each of the nodes 102, 104 supports arbitrary network topologies and allows for dynamic reconfigurability.

The I/O nodes 104 of the system are treated the same as processor nodes 102, that is, as full-fledged members of the multiprocessor system 100. In part, this design decision is based on the observation that available inter-chip bandwidth is best invested in a single switching fabric that forms a global resource utilized for both memory and I/O traffic.

In an alternate embodiment, one or more of the I/O nodes 104 of the system have no processor cores and therefore no L1 caches other than the L1 cache for the interface 142 to an I/O bus or device. Furthermore, a first subset of the no-processor core versions of I/O nodes 104 may also lack a memory subsystem 123, while other ones of the no-processor core versions of the I/O nodes do include a memory subsystem 123.

Processor Core and First-Level Caches

In a preferred embodiment, the PC 106 uses a single-issue, in-order design capable of executing the Alpha instruction set. It consists of a 500 MHz pipelined datapath with hardware support for floating-point operations. The pipeline has 8 stages: instruction fetch, register-read, ALU 1 through 5, and write-back. The 5-stage ALU supports pipelined floating-point and multiply instructions. However, most instructions execute in a single cycle. The PC 106 includes several performance enhancing features including a branch target buffer, pre-compute logic for branch conditions, and a fully bypassed datapath. The PC 106 interfaces with separate first-level instruction and data caches designed for single-cycle latency.

As will be described in more detail below, the system uses 64 KB two-way set-associative, blocking caches with virtual indices and physical tags. The L1 cache modules 108, 110 include tag compare logic, instruction and data translation lookaside buffers (TLBs) (each storing 256 entries, in a 4-way associative caching arrangement), and a store buffer (data cache only). The L1 cache modules 108, 110 also maintains a 2-bit state field per cache line, corresponding to the four states in a typical MESI protocol. For simplicity, the L1 instruction cache modules 108 and L1 data cache modules 110 use virtually the same design. Therefore, unlike other Alpha implementations, the instruction cache is kept coherent by hardware. Treating all cache modules 108, 110 in the same way also simplifies the implementation of a no-inclusion policy at the L2 level.

Intra-chip Switch

Figure 3:
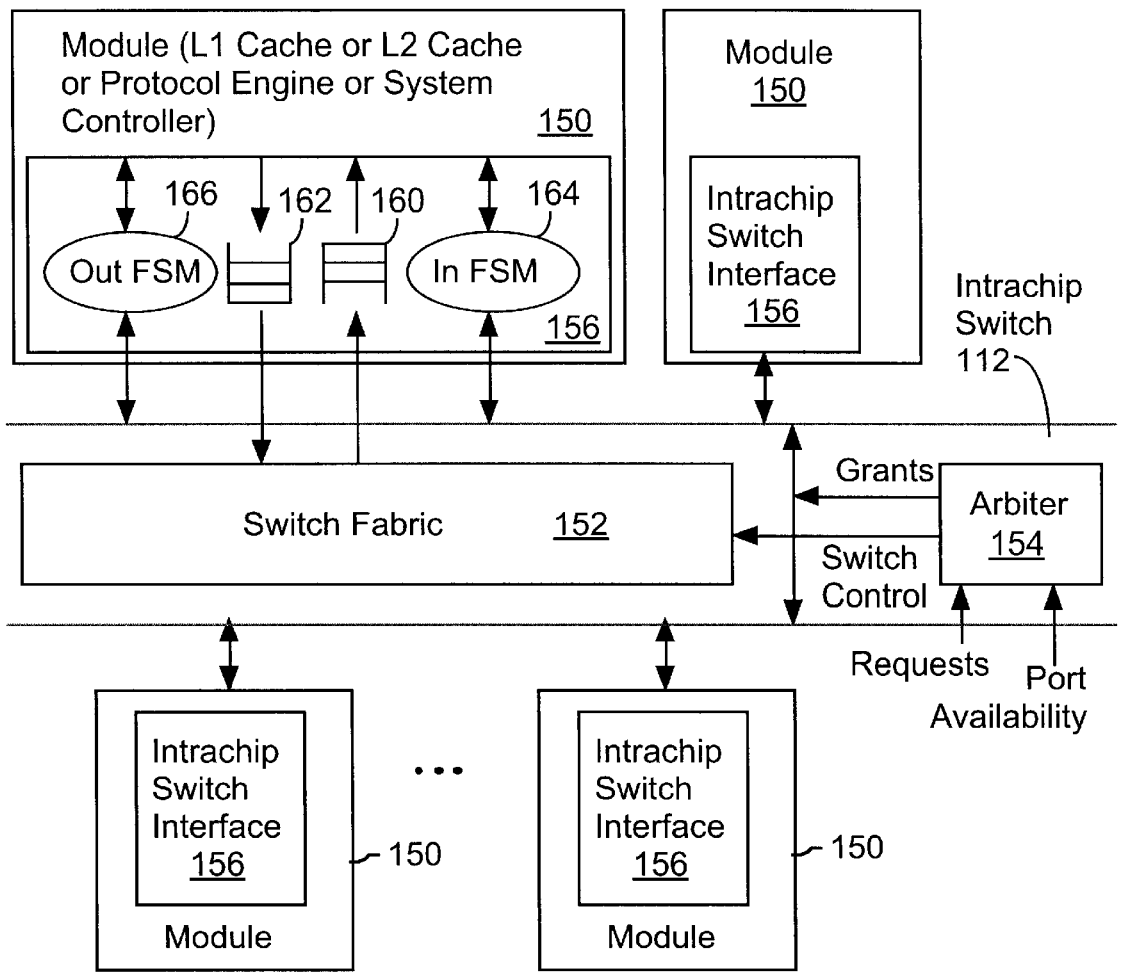
FIG. 3 is a block diagram of a intra-chip switch and the module interfaces used to couple the modules of a system node to the intra-chip switch.

Referring to FIG. 3, conceptually, the ICS 112 is a crossbar that inter-connects most of the modules 150 on a processor node 102 or I/O node 104. The ICS 112 includes a switch fabric 152 and an arbiter 154 for determining which data transfer(s) to handle during each available data transfer period. The length of the data period depends on the number of transfers required to send one cache line across the ICS 112. In a preferred embodiment, each connection provided by the switch fabric 152 of the ICS 112 has a path width of 64 data bits, plus eight parity bits, for a total of 72 bits. Each cache line transported through the ICS 112 has 512 bits of data and sixty-four parity bits. Memory lines are transported along with the corresponding sixty-four parity bits when they are transported through the ICS 112. Parity bits for memory lines are also sent to and used in the L1 cache arrays. However, parity bits are not used in the L2 cache and they are also not used in main memory. Instead, in the L2 cache, 20 ECC bits are associated with each memory line, and more specifically a 10-bit ECC is associated with each 256-bit half memory line. In the L2 cache and main memory, the 64 bits otherwise available for use as parity bits are used instead to store the 20 ECC bits, as well as a 44-bit directory entry, which will be described in more detail below. Data transfers generally are sent with a command or transaction type indicator, which is transferred in parallel with the first 64 bits of data of the cache line. Each cache line sized data transfer requires eight clock cycles, with 64 bits of data and a proportional share of the parity and ECC bits being transferred during each clock cycle.

Arbitration and flow control are handled by the arbiter 154. To better understand the arbiter it is helpful to first review the interface 156 presented by each module 150 (i.e., L1 cache modules 108, 110, L2 cache, protocol engine or system controller) to the ICS 112. As shown in FIG. 3, the standard intra-chip interface 156 provided by each such module includes one or more input buffers 160, one or more output buffers 162, a first finite state machine (FSM) 164 for controlling use of the input buffer(s) 160, and a second finite state machine (FSM) 166 for controlling use of the output buffer(s) 162. The arbiter 154, via the FSM 164, 166 of each module 150 keeps track of the availability of buffer space in the output buffers 162 of the modules 150 at all times, and exercises flow control by deferring requests to transfer data to modules with full input buffers 160. The arbiter 154 also receives all intra-chip data transfer requests from the interfaces 156 of the modules 150, and arbitrates between the requests whose destinations have input buffers 160 with sufficient room to receive a data transfer (i.e., a cache line of data).

In a preferred embodiment three parallel communication lanes, also called queues, are implemented in the input buffers 160 and output buffers 162 of the ICS interface 156, as well as in the input and output buffers of interfaces (not shown) to the packet switch 126 and interconnect 134 (see FIG. 1). These lanes or queues are labeled I/O, low priority and high priority, respectively. The high priority queues in the input and output buffers are used to store messages sent from a home node to another node of the system, replies from third party nodes to the home node or the requester node for a particular transaction, and messages internal to a node. The low priority queues are used to store messages going to the home node for a particular transaction. The low priority message are thus messages for initiating new memory transactions, while the high priority messages are messages for completing previously initiated memory transactions. The I/O queues are used for handling requests being sent to I/O devices. The messages in the I/O queues are given the lowest priority by the intrachip switch 112 and also by the packet switch 126 and interconnect 134 (see FIG. 1).

The use of multiple communication lanes generally increases the size of the input and output buffers in the interfaces to the ICS 112, packet switch 126 and interconnect 134. However, the use of multiple communication lanes is important for avoid deadlock conditions in the network, and in particular for ensuring that active memory transactions make forward progress even when the system is experiencing high levels of protocol message traffic. In alternate embodiments, four or more communication lanes are used instead of three. In particular, in one alternate embodiment the high priority lane is replaced by two separate communication lanes, one for messages sent from the home node of a memory transaction and the other for replies sent by third parties to either the home node or any other node in the system. Providing the additional communication lane helps to ensure that messages sent by the home nodes of transactions are not blocked by reply messages being sent by the same node(s) for transactions in which those nodes are not the home node, and vice versa.

From a philosophical viewpoint, the ICS 112 is the primary facility for decomposing the processor node 102 and I/O node 104 into relatively independent, isolated modules 150. For instance, the transactional nature of the ICS 112 and the uniformity of the interfaces 156 presented by the modules 150 to the ICS 112 together allow different types of modules 150 to have different numbers of internal pipeline stages for handling various type of memory transactions.

The ICS 112 uses a uni-directional, push-only data transfer technique. The initiator of a memory transaction always sources data. If the destination of a transaction is ready, the arbiter 154 schedules the data transfer according to datapath availability. A grant is issued by the arbiter 154 to the initiator of the transaction to commence the data transfer at a rate of one 64-bit word per cycle without any further flow control. Concurrently, the destination receives a signal from the arbiter 154 that identifies the initiator and the type of transfer. Transfers across the ICS 112 are atomic operations.

Each port to the ICS 112 consists of two independent 64-bit data paths (plus additional datapath bits for eight parity bits) for sending and receiving data. The ICS 112 supports back-to-back transfers without dead-cycles between transfers. In order to reduce latency, in a preferred embodiment the modules 150 are allowed to issue a "pre-request" indicating the target destination of a future request, ahead of the actual transfer request. The pre-request is used by the ICS 112 to pre-allocate data paths and to speculatively assert a grant signal to the requester.

Directory Used in Cache Coherence Protocol

Figure 4:
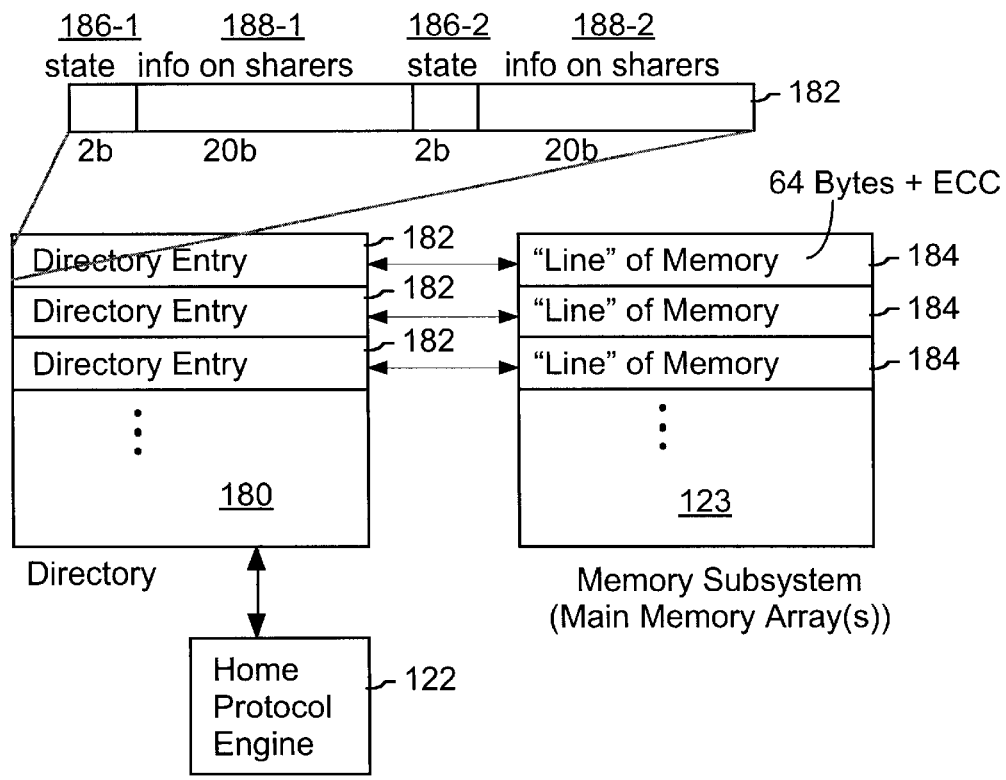
FIG. 4 depicts a directory data structure for keeping track of which nodes of the system have copies of each line of memory data.

Referring to FIG. 4, within each node of the system that has a memory subsystem 123, a cache state directory 180 is maintained by the home protocol engine (EPE) 122. The memory subsystem 123 of a node is also called the main memory array of the node. The directory 180 for a node's memory subsystem 123 includes one directory entry 182 for each "memory line" 184 in the memory system 123. A "memory line" is the unit of memory that fits into one cache line of the L1 cache modules 108, 110 and L2 caches 114. In a preferred embodiment, a memory line is 512 bits (64 bytes, or eight 64-bit words) of data; however, the size of the memory line will vary from one implementation to another. Each memory line 184 also includes two 10-bit ECC (error correction code) codes (one for each half memory line). The 20 bits of ECC codes and the 44-bit directory entry 182 occupy the same amount of memory, 64 bits, as would be required for one parity bit per byte. The ECC bits are used only in main memory and the L2 cache, to detect and correct errors in retrieved memory lines, while the directory entry is used by the home protocol engine (BPE) 122 to maintain cache coherence of the memory lines 184 corresponding to the directory entries 182.

Each directory entry 182 includes a state field 186 for indicating the state of the corresponding memory line 184, and a sharer-information field 188 for identifying nodes 102, 104 that have or might have a shared copy of the corresponding memory line 184. A directory entry 182 in a preferred embodiment contains 44 bits, with the state field 186 comprising a 2-bit field that is repeated (i.e., stored twice in each directory entry 182) and the sharer-information field 188 comprising a 40-bit field that is split into two 20-bit fields 188-1, 188-2. In a preferred embodiment there are two possible formats for the sharer-information field 188, with the format of the sharer-information field 188 in a given directory entry 182 being determined by the number of nodes 102, 104 sharing the memory line 184 corresponding to the directory entry 182. Generally, a node 102, 104 is said to "share" a memory line 184 if it maintains a read-only copy of the memory line 184—typically stored in a cache array 108, 110, 114 within the respective node 102, 104.

In a preferred embodiment (with a 40-bit sharer-information field and a maximum of 1023 nodes), when the number of nodes 102, 104 currently sharing a memory line 184 is four or less, a first sharer-information field 188 format called the "limited-pointer" format is used. In this format, the 40-bit sharer-information field 188 is divided into four 10-bit sub-fields, each of which is used to store a "direct node pointer" that identifies a node 102, 104 that is a sharer of the memory line 184. A predefined null pointer value (e.g., 0x000 or 0x3FF) is stored in one or more of the 10-bit sub-fields to indicate that the respective 10-bit field does not identify a node 102, 104 (e.g., when fewer than four nodes 102, 104 share a memory line 184). More generally, the size of the sharer-information field 188 and the number of bits required for each direct node pointer determines the maximum number (DP) of direct node pointers that a sharer-information field 188 can store. Additionally, the node pointers (i.e., identifiers) included in the 10-bit sub-fields are obtained from requests to share a corresponding memory line of information 184. Thus, each request to share a memory line of information 184 (described in detail below), includes a 10-bit identifier of the requesting node.

Also, in a preferred embodiment, when the number of nodes 102, 104 sharing a memory line 184 is more than four, a second sharer-information field 188 format called the "coarse vector" format is used. In this format, each bit in the sharer-information field 188 corresponds to one or more nodes 102, 104. More specifically, when the number of nodes 102, 104 in the multiprocessor system 100 is more than four but less than forty-one, each bit of the sharer-information field 188 either corresponds to one node 102, 104 or does not correspond to any node 102, 104. Thus, a set bit (zero or one depending on the specific implementation) in the sharer-information field 188 of a given directory entry 182 indicates that the one node 102, 104 corresponding to the set bit shares the memory line 184 corresponding to the directory entry 182. And when the number of nodes 102, 104 in the multiprocessor system 100 is more than forty, one or more of the bits in the sharer-information field 188 correspond to a plurality of nodes 102, 104. Thus, a set bit (zero or one depending on the specific implementation) in the sharer-information field 188 of a given directory entry 182 indicates that the one or more nodes 102, 104 corresponding to the set bit share the memory line 184 corresponding to the directory entry 182.

Because only one bit is used to identify one or more nodes 102, 104 when the sharer-information field 188 is in the coarse-vector format, each node 102, 104 in the multiprocessor system 100 must be mapped to a bit in the sharer-information field 188. The node to bit assignment table 189 of FIG. 4 illustrates a mapping of a plurality of nodes to a number of bits in a preferred embodiment (preferred embodiments of the invention do not actually utilize a table, which is included here merely for illustration). Specifically, table 189 shows 76 nodes 102, 104 mapped to respective bits in a 40-bit sharer-information field 188. Each column in table 189 is associated with a bit in the sharer-information field 188. Thus, according to table 189 the first bit in the sharer-information field 188 is associated with the node 102, 104 identified (and addressed) as 40. Since only 76 nodes 102, 104 are included in the multiprocessor system 100 of this example, table 189 includes only two rows. But if the number of nodes 102, 104 included in the multiprocessor system 100 in this example exceeded 79, 119, 159, etc., additional rows would be included in the table 189. In other words, additional nodes 102, 104 would be associated with one or more of the bits in the sharer-information field 188.

As indicated above, the numbers included in each entry of table 189 are node identifiers. The brackets around "0" is meant to indicate that 0 is not a valid node identifier in the embodiment illustrated in table 189. In this embodiment, zero is used in the limited-pointer format to indicate that a particular sub-field of the sharer-information field 188 does not identify a node 102, 104. To maintain consistency between the two formats, zero is not a valid node identifier in either format.

Determining the node identifiers for nodes 102, 104 associated with a given bit in sharer-information field 188 (which permits the home node 102, 104 to send out invalidation requests when a given sharer-information field 188 is in the coarse-vector format), is divided into two basic steps. Assuming that a given bit is set and associated with column 3 of table 189 (FIG. 4), the first node 102, 104 associated with this bit is simply the column number, i.e., 3. To calculate subsequent node identifiers of nodes 102, 104 associated with this bit, the system adds to the column number positive integer multiples of the number of bits included in the sharer-information field 188 to the column number. For example, for column three of the sharer-information field, the associated system nodes are 3, 43, 83 and so on. The second step (i.e., adding multiples of the number of bits in the sharer-information field 188) is continued until the calculated node identifier exceeds the total number of nodes 102, 104 in multiprocessor system 100, in which case, the previously calculated node identifier is the identifier of the final node 102, 104 associated with a given bit.

As noted above, each directory entry 182 includes a state field 186. In a preferred embodiment, the state field 186 is set to one of the following defined states:

invalid: indicates that the corresponding memory line 184 is not shared by another node 102, 104;

exclusive: indicates that a node 102, 104 has an exclusive copy of the corresponding memory line of information 184, and thus may make changes to the memory line of information 184;

shared: indicates that the sharer-information field 188 is configured in the limited-pointer format described above and that the number of nodes having a non-exclusive (i.e., shared) copy of the corresponding memory line of information 184 is less than or equal to DP;

shared-cv: indicates that more than DP nodes 102, 104 have a non-exclusive (i.e., shared) copy of the corresponding memory line of information 184 and that the sharer-information field 188 is configured in the coarse vector format described above.

Protocol Engines

Figure 5:
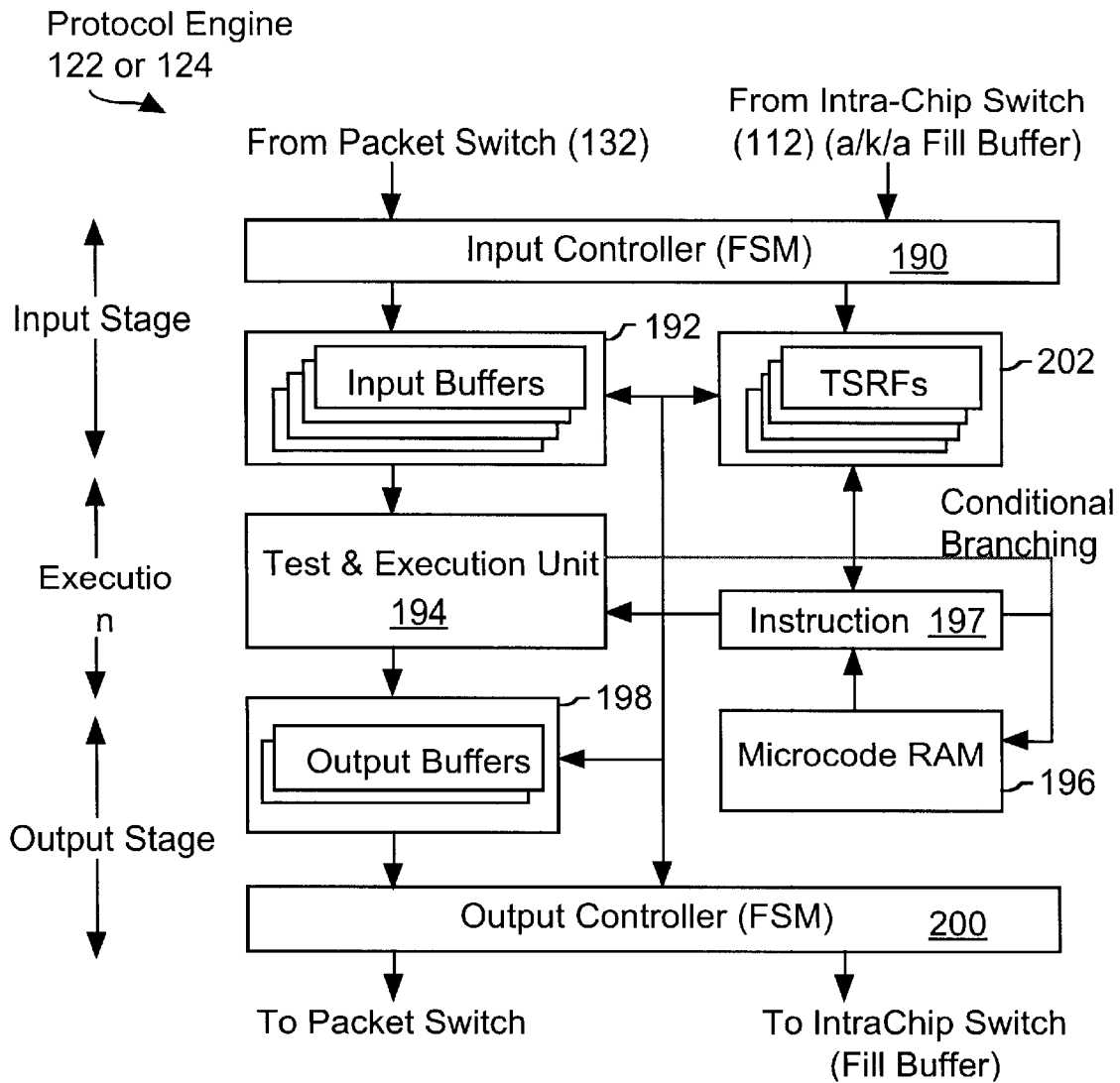
FIG. 5 is a block diagram of a protocol engine.

The basic architecture of each of the protocol engines 122, 124 (FIG. 1) is shown in FIG. 5. The protocol engines are responsible for handling memory transactions, such as the sharing of cache lines, the exclusive assignment of a cache line to a processor in a particular node of the system, remote read and write operations. The protocol engines 122, 124 are responsible for maintaining cache coherence of cache lines among the nodes 102, 104 of the multiprocessor system 100.

Each of the protocol engines 122, 124, as shown in FIG. 5, includes an input controller 190, preferably implemented as a finite state machine used in connection with a set of input buffers 192 for receiving data (inbound messages) from the ICS 112 and the PS 132. Received messages, some of which include a full cache line of data and the associated parity bits, are stored in the input buffers 192. In a preferred embodiment, sufficient input buffers 192 are provided to store inbound, received data for up to sixteen ongoing memory transactions. A test and execution unit 194 (herein called the execution unit) executes instructions obtained from an instruction memory 196, also called the microcode array, so as to advance memory transactions, also called cache coherence transactions. The currently selected instruction, obtained from the instruction memory 196, is held in a current instruction buffer 197 for decoding and execution by the execution unit 194. Output messages generated by the execution unit 194 are stored in a output buffers 198, the operation of which are controlled by an output controller 200, preferably implemented as a finite state machine. The output messages are transferred from the output buffers 198 to specified destinations within the same node 102, 104 as a protocol engine 122, 124 via the ICS 112 or to specified destinations within other nodes 102, 104 of the multiprocessor system 100 via the PS 132.

While the processor nodes 102 and I/O nodes 104 of a preferred embodiment use two protocol engines, including a home protocol engine (PPE) 122 (FIG. 1) for handling memory transactions where the node 102, 104 in which the protocol engine 122 resides is the home of the memory line that is the subject of the memory transaction, and a remote protocol engine (RPE) (124, FIG. 1) for handling memory transactions where a remote node 102, 104 is the home of the memory line that is the subject of the memory transaction, for most purposes the two protocol engines 122, 124 may be considered to be logically a single protocol engine.

Figure 6A:
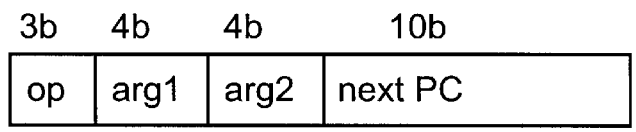
FIG. 6A depicts the instruction format of the instructions executed in one embodiment of the protocol engine of FIG. 5.

FIG. 6A shows the format of each of the instructions stored in the instruction memory 196 and instruction buffer 197. As shown, each instruction includes an operator, two operands, and a next program counter field. The operator indicates the type of operation to be performed by the execution unit 194 when executing the instruction, the two operands provide parameters that affect the execution of an instruction.

The current state of multiple memory transactions is stored in a set of registers collectively called the Transient State Register File (TSRF) 202. Each memory transaction has a memory line address (sometimes called the global memory address) that identifies the memory line that is the subject of the memory transaction. More specifically, the memory line address identifies the node 102, 104 that interfaces with the memory subsystem 123 that stores the memory line of information 184 (i.e., home node) and a specific position within the memory subsystem 123 of the memory line of information 184. In a preferred embodiment, the top M (e.g., 10) bits of the memory line address identify the home node 102, 104 of the memory line of information 184, while the remainder of the address bits identify the memory line 184 within the identified node. In a preferred embodiment, the memory line address for a memory line does not include any of the address bits used to identify sub-portions of the memory line, such as individual 64-bit words of individual bytes within the memory line of information 184. However, in other embodiments that support transactions on sub-portions of memory lines, the memory line addresses used may include bits for identifying such memory line sub-portions.

Figure 6B:
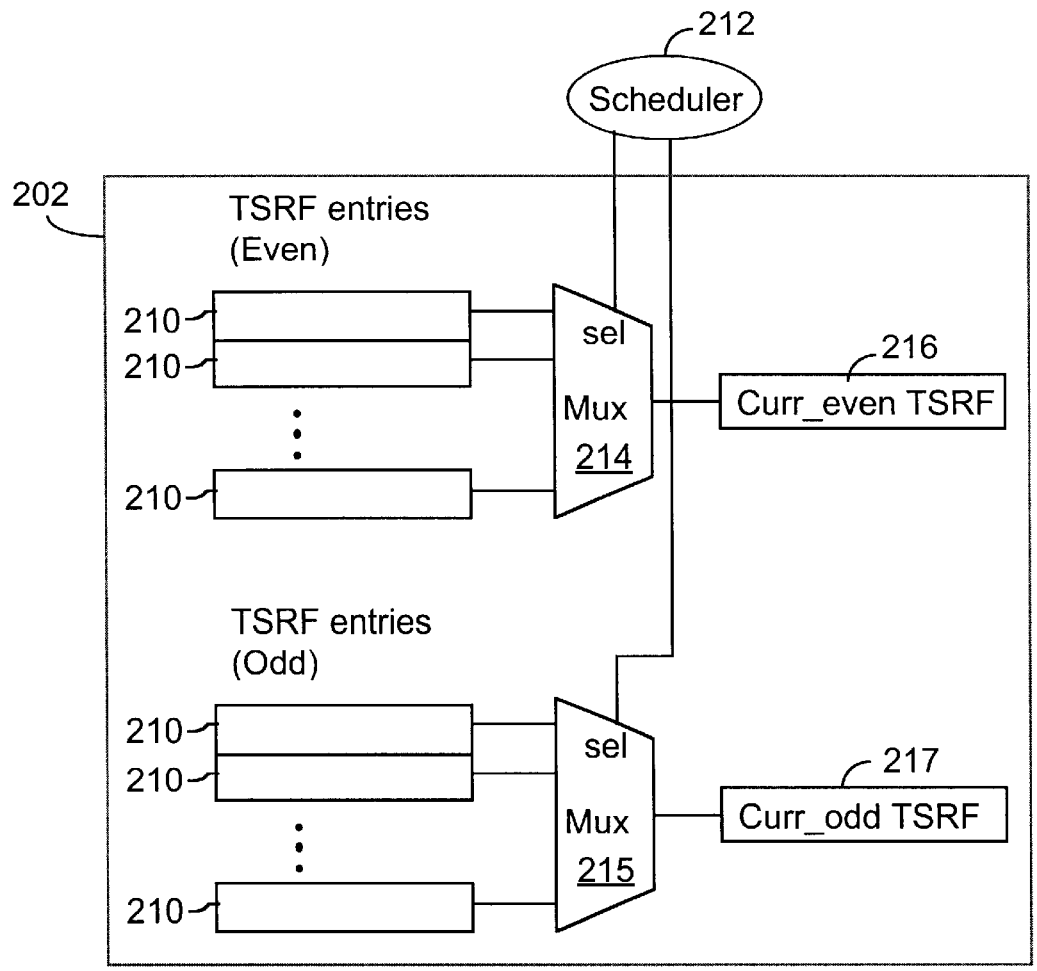
FIG. 6B is a block diagram of a portion of the TSRF selection logic of the protocol engine of FIG. 5.

Referring to FIG. 6B, each memory transaction has a respective entry 210 stored in the Transient State Register File (TSRF) 202 that indicates the state of the memory transaction. In a preferred embodiment, the TSRF 202 has registers for storing sixteen entries 210 as well as access circuitry for reading and updating the contents of the TSRF entries 210. Obviously the number of entries in the TSRF 202 is a design choice that will vary from one implementation to another. Typically, the TSRF 202 will include at least as many entries as the number of PCs 106 included in a processor node 102.

Referring to FIG. 6B, the entries 210 of the TSRF 202 are divided into two groups—"even" TSRF entries 210 and "odd" TSRF entries 210. The "even" TSRF entries 210 are used for memory transactions associated with memory lines of information 184 that have "even" memory line addresses (i.e., memory line addresses ending in a "0" bit), while the "odd" TSRF entries 210 are used for memory transactions associated with memory lines of information 184 that have "odd" memory line addresses (i.e., memory line addresses ending in a "1" bit).

Figure 7C:
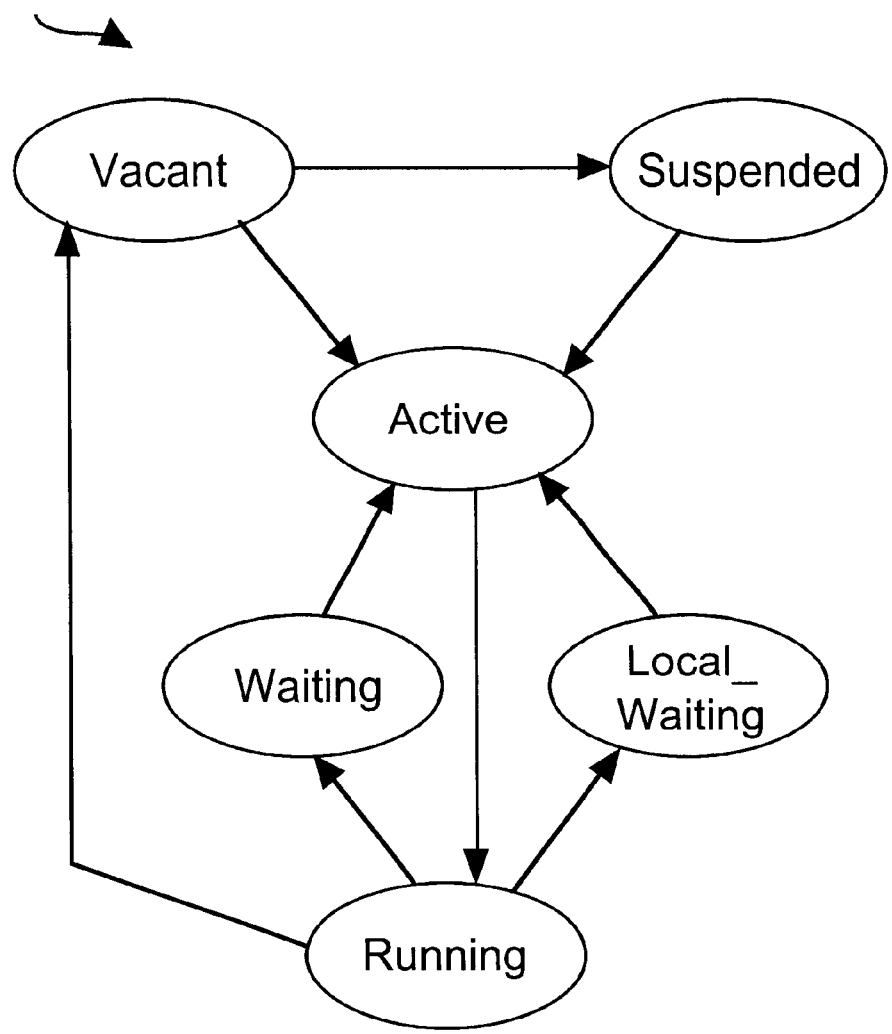
FIG. 7C depicts a state transition diagram for any single one of the TSRF entries in the Transient State Register File (TSRF) of the protocol engine of FIG. 5.

Referring to FIGS. 6B, 7A–7C, and 8, the sequence of operations required to execute an instruction so as to advance a memory transaction is: reading the TSRF entries, scheduling one of the transactions represented by the TSRF entries, retrieving from the instruction memory the instruction identified by the TSRF of the scheduled transaction, and executing the instruction. As shown in FIGS. 7A and 7B, this sequence of four operations is pipelined and is furthermore performed by two "logical pipelines" that are parallel but offset from each other by one clock cycle. One logical pipeline is for the odd TSRF entries and the other is for the even TSRF entries. However, the two logical pipelines are implemented using a shared scheduler 212, a shared microcode array 196 and access circuitry (see FIG. 8), and shared execute logic 240, which along with the scheduler 212 is part of the test and execution unit 194. Only the TSRF registers and access circuitry 202 have distinct even and odd circuits.

Alternating clock cycles of the test and execution unit 194 are called Even and Odd clock cycles. As shown in FIG. 7A, during each even clock cycle the following operations are performed, simultaneously, by the circuitry modules identified in FIG. 7B:

reading the Odd TSRF entries, including comparing the address in each of the Odd TSRF entries with the addresses of messages received from the packet switch and intra-chip switch;

scheduling a next Even transaction (by selecting an Even TSRF entry) to be advanced by executing an instruction identified by the "next PC" field of one of the Even TSRF entries;

reading the microcode instruction identified by (A) the Odd transaction scheduled in the immediately previous Odd clock cycle and the condition code (CC) bits stored in the TSRF entry for the scheduled Odd transaction; and executing the instruction for the currently scheduled Even transaction, where the instruction is identified by the "next PC" field of the Even transaction selected by the scheduler two clock cycles ago as well as the condition code bits stored in the TSRF of the currently scheduled transaction.

Similarly, as shown in FIG. 7A, during each Odd clock cycle the following operations are performed, simultaneously, by the circuitry modules identified in FIG. 7B:

reading the Even TSRF entries, including comparing the address in each of the Even TSRF entries with the addresses of messages received from the packet switch and intra-chip switch;

scheduling a next Odd transaction (by selecting an Odd TSRF entry) to be advanced by executing an instruction identified by the "next PC" field of one of the Odd TSRF entries;

reading the microcode instruction identified by (A) the Even transaction scheduled in the immediately previous Even clock cycle and the condition code (CC) bits stored in the TSRF entry for the scheduled Even transaction; and executing the instruction for the currently scheduled Odd transaction, where the instruction is identified by the "next PC" field of the Odd transaction selected by the scheduler two clock cycles ago as well as the condition code bits stored in the TSRF of the currently scheduled transaction.

The scheduler 212 selects the next Even (or Odd) transaction at the same time that the current Even (or Odd) transaction is being executed. In some circumstances, it is important for the current transaction to remain active and to be executed during two or more successive even clock cycles. For example, this is the case when a transaction needs to send two or more messages to other nodes in the system. The scheduler is able to determine whether the current Even (or Odd) transaction should be scheduled to execute again during the next Even (or Odd) clock cycle by inspecting the state, counters and condition codes in the TSRF of the currently executing transaction to determine if they satisfy predefined criteria for continuing execution of the current transaction for an additional execution cycle.

By interleaving instruction fetch and instruction execute cycles, the bandwidth and computational resources of the test and execution unit 194 and the microcode memory 196 are fully utilized.

As shown in FIG. 6B, the test and execution unit 194 (FIG. 5) of the protocol engine includes a scheduler 212 that selects an even TSRF entry 210 and an odd TSRF entry 210, corresponding to the next even memory transaction and the next odd memory transaction to be processed or advanced by the execution unit 194. The selections by the scheduler 212 are conveyed to a pair of multiplexers 214, 215 that transfer information from selected even and odd TSRF entries 210 to a pair of latches 216, 217 for storing the state of the currently running memory transactions. The TSRF entries stored in latches 216, 217 are used by the execution logic 242 (FIG. 8) of the execute unit 194 (FIG. 5).

Figure 6C:
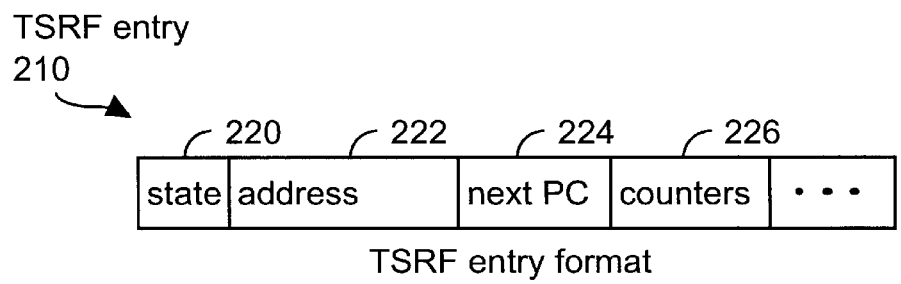
FIG. 6C depicts a subset of the fields of each TSRF entry in the Transient State Register File (TSRF) of the protocol engine of FIG. 5.

Referring to FIG. 6C, each TSRF entry 210 includes many fields, a small subset of which are identified and described below:

a state field 220: indicates the state of the associated memory transaction if any;

an address field 222: stores the memory line address associated with a memory transaction if any;

a next program counter field 224: identifies the next instruction to be executed by the execution unit when certain preconditions required for continued execution of the memory transaction are satisfied; and a set of counter fields 226: are used to store count values that, for example, control repeated execution of an instruction (e.g., when a transaction needs to send out N identical protocol messages to other nodes 102, 104, one of the counter fields 226 is initially to a value corresponding to N, and is then decremented or incremented after each execution of the instruction until a predefined terminal count value is reached, at which point the memory transaction is either complete or a next program counter for the transaction is determined). The counter fields 226 and the state field 220 together form an overall or more specific state of an associated memory transaction.

In a preferred embodiment, the set of defined states for the state field 220 include:

vacant (also called invalid): indicates that the TSRF entry 210 does not store information related to a memory transaction;

active: indicates that the associated memory transaction is available for scheduling/execution;

running: indicates that the associated memory transaction is currently running (i.e., is currently being executed by the execution unit 194, or was the transaction for which an instruction was executed during the last available even or odd execution cycle);

waiting: indicates that the associated memory transaction is stalled/deferred, waiting for a protocol message from another node 102, 104 to be delivered via the PS 132;

local_waiting: indicates that the associated memory transaction is stalled, waiting for a protocol message from within the same node 102, 104 to be delivered via the ICS 112; and suspended: indicates that the associated memory transaction is suspended because there is a memory address conflict with a previously allocated memory transaction having the same memory line address.

FIG. 7C shows all defined state transitions for each of the TSRF entries 210. A Vacant TSRF entry 210 becomes Active when a message initiating a new memory transaction is received and there is no unfinished transaction having the same memory line address and that blocks activation of the new memory transaction. A Vacant TSRF entry 210 becomes Suspended when a message initiating a new memory transaction is received and there is unfinished memory transaction having the same memory line address that blocks activation of the new memory transaction.

When an Active transaction is scheduled for execution it enters the Running state. If the execution of the transaction completes the transaction, the TSRF returns to the Vacant state. The Running Transaction remains in the Running state until it was sent all the protocol messages required for handling a current portion of the transaction. If execution of the transaction does not complete the transaction, the state of the TSRF becomes Waiting if the transaction is waiting for one or more messages from one or more other nodes to be able to continue the transaction, and becomes Local_ Waiting if the transaction is waiting only for one or more messages from the local node to be able to continue the transaction.

The scheduler 212 includes arbitration logic for selecting the next even TSRF entry and the next odd TSRF entry to be sent to the execution unit 194 in accordance with (A) the states of the TSRF entries, (B) the buffered received messages received via the PS 132 and the ICS 112 and which TSRF entry, if any, corresponds to each of the buffered received messages, and (C) a set of prioritization rules. Each TSRF entry and each buffered received message identifies the memory line associated therewith, and the arbitration logic of the scheduler includes an array of comparators for comparing the memory line addresses in the TSRF entries with the memory line addresses in the buffered received messages so as to produce a corresponding set of status update signals. The status update signals are used for "upgrading" TSRF entries from the Waiting and Local_ Waiting state to the active state, as well as for downgrading the TSRF entry for the last running transaction to the waiting, local waiting or vacant state, depending on whether the transaction is finished, and if not finished, what type of message (i.e., from the local node or a remote note) the transaction needs to receive in order to ready to resume execution.

The status update signals are also used to determine when a buffered received message has the same address as a previously allocated TSRF, but is for a different memory transaction. When this condition is detected by the arbitration logic, one of three actions is performed: (A) a new TSRF entry is allocated for the transaction associated with the received message, and the new transaction is suspended, (B) the received message is merged into previously allocated transaction and modifies its state, or (C) the message is temporarily left in the input buffer because the previously allocated transaction is not currently in a state allowing the received message to be merged with it, and the received message is then either merged with the previously allocated transaction or, if that transaction completes, a new TSRF is allocated for the new message and that TSRF is placed in the Active state. When the received message is of the type that could potentially be merged with a previously allocated transaction, the previously allocated transaction must be in the Waiting or Local_Waiting state before the merger can be performed. When a Receive instruction is executed, the transaction enters a Waiting or Local_Waiting state. The transaction can not enter the Active state until either (A) one of the predefined messages required to advance the transaction, or (B) one of the predefined messages that can be merged with the transaction is received.

Figure 8:
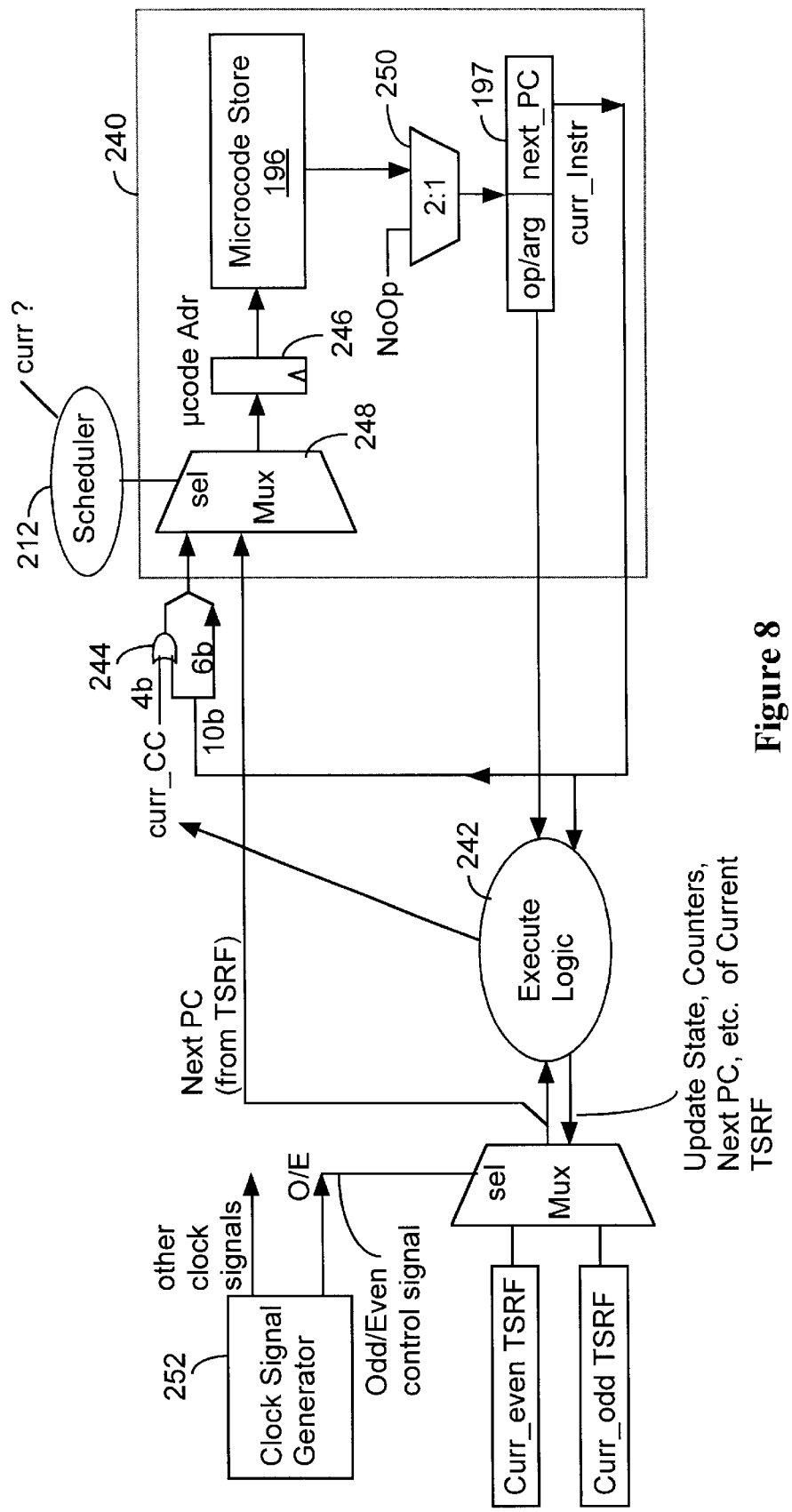
FIG. 8 is a block diagram of a portion the execution logic of the protocol engine of FIG. 5.

Referring to FIGS. 6B and 8, the scheduler 212 selects between continued execution of the currently Running transaction and any of the other Active transactions, if any. FIG. 6B shows a portion of the logic for selecting an Active transaction. FIG. 8 shows logic for continuing execution of a currently Running transaction. On the right side of FIG. 8 is shown a current instruction buffer 197 for holding the current instruction for Running transaction.

The operator and arguments of the current instruction are passed to the execute logic 242, which also has access to all the fields of the TSRF of the Running transaction. The execute logic computes a set of condition codes, labeled "Curr_CC" in FIG. 8, as well as new State and Next PC for the TSRF of the running transaction. The Next PC, to be stored in the TSRF of the current Running transaction, is obtained from the current instruction stored in buffer 197. The execute logic 242 may also update one or more counters in the TSRF of the current Running transaction as well as other fields of the TSRF.

When the scheduler 212 determines that the current Running transaction should continue to run, the next instruction for the transaction is determined as follows. The current instruction in buffer 197 includes a "next PC" field that specifies the base address of a next instruction. Predefined bits (e.g., the four least significant bits) of the "next PC" address are logically combined (by logic gate or gates 244) with the condition codes (Curr_CC) generated by the execute logic 242 so as to generate a microcode address that is stored in microcode address latch 246. Multiplexers 248 and 250 are provided to facilitate selection between the current Running transaction and another Active transaction. Multiplexers 248 and 250 operate during both Even and Odd clock cycles so as to perform separate instruction retrieval operations during Even and Odd clock cycles (See FIG. 7A).

When all the Even (or Odd) TSRF entries are in the Vacant state, meaning that there are no running, active or waiting Even (or Odd) memory transactions, there are no Even (or Odd) memory transactions for the scheduler to select for execution, and thus the corresponding logical pipeline is unused. More generally, when none of the Even (or Odd) TSRF entries are in the Running or Active state (see discussion of FIG. 6C), meaning that there are no Even (or Odd) memory transactions that are ready to be processed by the execution unit of the protocol engine, the corresponding logical pipeline is unused. During the corresponding clock periods instructions are not fetched from the instruction memory and the test and execution unit remains dormant.

The operation of the protocol engine while handling various specific memory transactions will be described in more detail below. Additional aspects of the scheduler and execution logic will also be described in more detail below.

L1 Cache

Figure 9A:
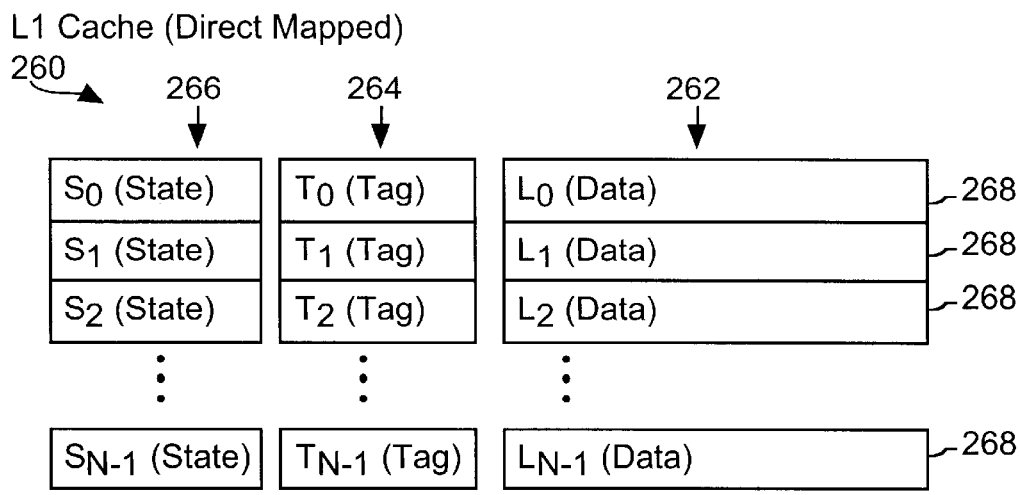
FIGS. 9A and 9B depict two embodiments of the Tag-State and Data arrays of an L1 cache.

Referring to FIG. 9A, for simplicity a direct mapped version of the L1 cache 260 will be explained before explaining the two-way set associative version, shown in FIG. 9B. Each L1 cache 260, whether it is a data or instruction cache (see FIG. 1) includes a data array 262 for storing cache lines, a tag array 264 and a state array 266. Each entry 268 of the L1 cache 260 includes a cache line, a tag and a state value. The cache line consists of the data from one memory line, and in a preferred embodiment this consists of 64 bytes (512 bits) of data plus parity and ECC bits corresponding to the 64 bytes.

The tag of each entry 268 consists of the address bits required to uniquely identify the cache line, if any, stored in the entry. Each address used to access memory consists of a string of address bits, ABCD, where A, B, C and D each consist of different groups of the address bits. The D bits are used to identify specific words (or bits, or bytes, depending on the implementation) within the cache line. The B and C bits, herein called BC, identify the entry 268 into which the memory line at address ABC0 is stored within the L1 cache. The BC bits are called the index or cache index of the address. The A bits comprise the tag of the cache line, which together with the cache index uniquely identify the memory line. The only reason for dividing the cache index bits, BC, into two groups is for purposes of explaining the embodiment shown in FIG. 9B.

The state of each L1 cache entry 268 is represented by two bits, which for each cache line represent one of four predefined states:

invalid, which means that the cache entry 268 is empty, or that the data in it is invalid and should not be used;

shared, which means that other processors or other nodes in the system have non-exclusive copies of the same memory line as the one stored in the cache entry;

clean_exclusive, which means that this L1 cache has the only copy of the associated memory line, has been allocated exclusive use thereof, and that the value of the cache line has not been changed by the processor coupled to the L1 cache; and dirty_exclusive, which means that this L1 cache has the only copy of the associated memory line, has been allocated exclusive use thereof, and that the value of the cache line has changed by the processor coupled to the L1 cache.

Figure 9B:
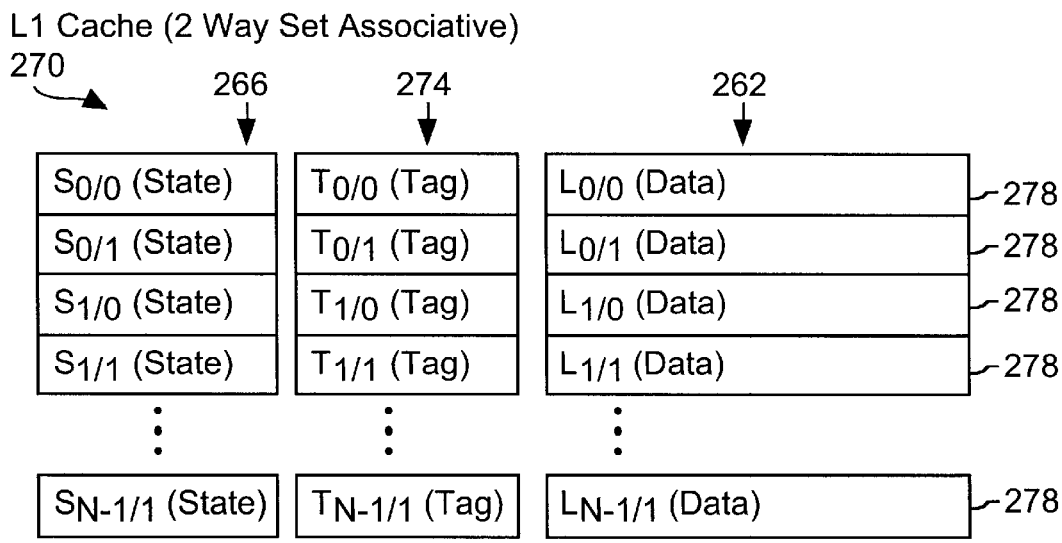

Referring to FIG. 9B, there is shown a two-way associative version of the L1 cache, which is a preferred implementation. Only the differences between the L1 caches of FIGS. 9B and 9A will be described. In particular, the set associative L1 cache 270 has the same number of entries 278 as the direct mapped L1 cache 260, but in this version there are two cache lines mapped to each cache index instead of just one. As a result, there are only half as many cache index values, and therefore the cache index is represented by just the C bits of the ABCD address bits. In this embodiment of the L1 cache, the B address bit of each memory line address is included in the tag of the entry, and thus the tag array 274 is one bit wider in this embodiment than in the direct mapped L1 cache embodiment. If the L1 cache were a four-way associative cache, the tag array 274 would be two bits wider than in the direct mapped L1 cache embodiment. A two-way associative L1 cache is preferred over a direct mapped cache because it reduces cache evictions caused by cache index conflicts.

L1 Data Paths and Control Logic

Figure 9C:
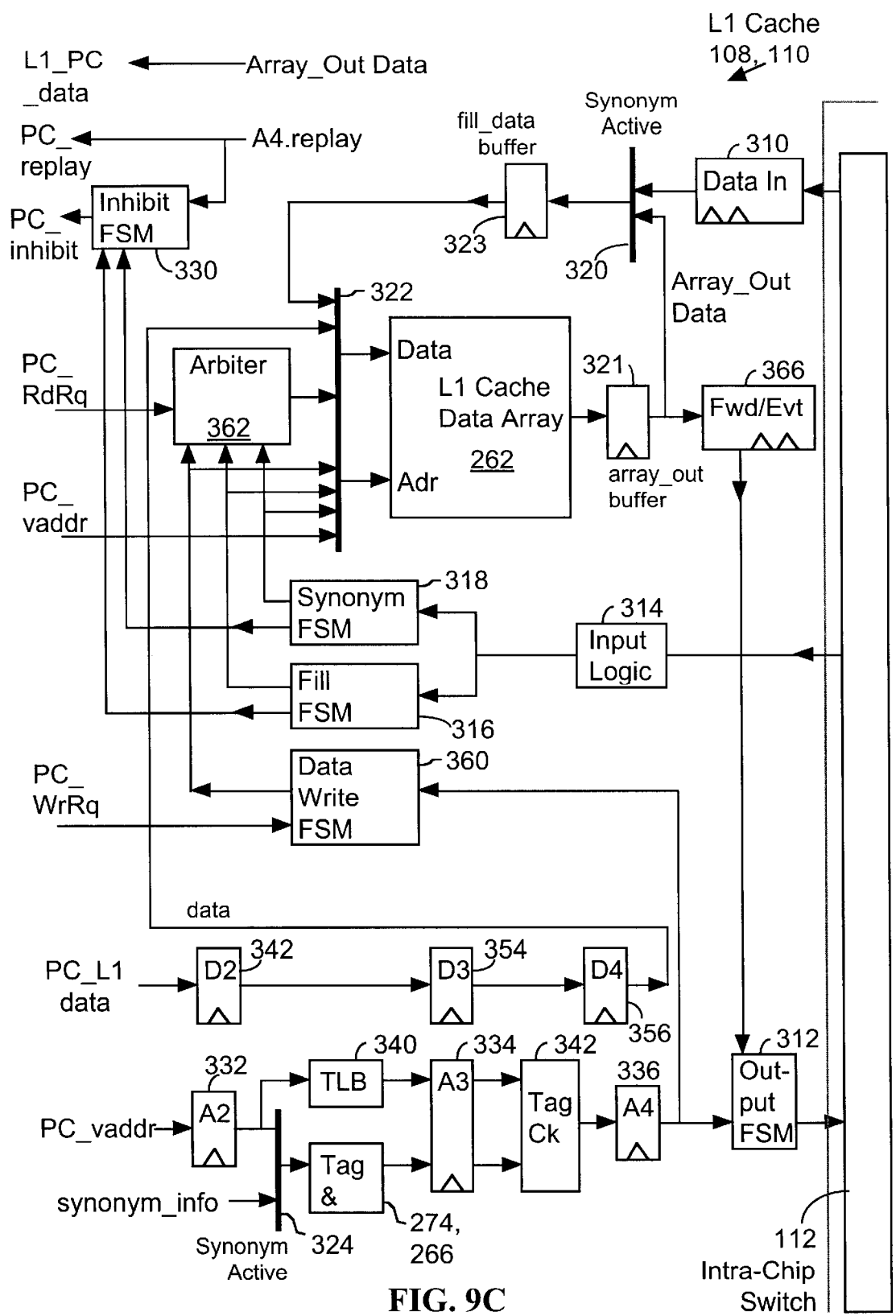
FIG. 9C shows the architecture of the L1 cache in more detail.

FIG. 9C shows the data paths and primary components of the L1 cache 108, 110. Some of the connections between the various finite state machines of the L1 cache and some of the connections between those finite state machines, the tag and state arrays 274, 266 and other components of the L1 cache 108, 110 that are described below are not shown in FIG. 9C in order to avoid undue cluttering of this figure.

The L1 cache receives data (PC_L1_data) and a virtual address (PC_vaddr) from the processor core coupled to the L1 cache. Other signals received by the L1 cache from the processor core are a read request signal (PC_RdRq), which signals that the processor core is requesting data from the L1 cache, and a write request (PC_WrRq), which signals that the processor is requesting to write data into the L1 cache. The signals sent by the L1 cache to the processor core include data output by the L1 cache (L1_PC_data), a replay signal (PC_replay) requiring the processor to retry the last request sent by the processor core to the L1 cache, and an inhibit signal (PC_inhibit) to inform the processor core to inhibit its memory accesses because the L1 cache is busy (e.g., servicing a cache miss).

The L1 cache receives data from and sends data to the L2 cache, main memory, and other devices via the intra-chip switch 112. Received data is temporarily buffered by a data in buffer 310, and data being sent elsewhere is output via an output finite state machine (Output FSM) 312. The output buffer for sourcing data to the ICS 112 is called the Fwd/Evt buffer 366.

Input logic 314 receives control signals sent via the ICS 112 and conveys those control signals to either a fill FSM 316 or a synonym FSM 318. The fill FSM 316 controls the loading of a cache line received from the ICS 112 into the L1 cache data array 262. The synonym FSM 318 controls the movement of a cache line from one L1 cache slot to another when the L2 cache instructs the L1 cache to do so. Multiplexer 320 routes cached data from a slot of the L1 cache data array 262 back to the data array input multiplexer 322 under the control of the synonym FSM 318. Input and output staging buffers 321, 323 are preferably used in this data path, for instance to facilitate delivery of successive portions of the data in a cache line over the data path.

When the synonym FSM 318 is not active, multiplexer 320 sources data from the data input buffer 310 to the data array input multiplexer 322. The movement of a cache line from one L1 cache slot to another is required when the cache line index derived from a virtual address does not match the physical location of a cache line in the L1 cache. A tag information input multiplexer 324 is also controlled by the synonym FSM 318 to enable tag information for the L1 tag array 274 to be sourced by synonym information from the synonym FSM 318 when the synonym FSM 318 is activated. When the synonym FSM 318 is not activated, the tag information input multiplexer 324 sources tag information for the L1 tag array 274 from the virtual address (PC_vaddr) provided by the processor core.

An inhibit FSM 330 receives signals from the fill FSM 316 and synonym FSM 318 when those finite state machines are activated and sources the PC_inhibit signal to the processor core while either of these finite state machines is servicing a cache fill or synonym cache line relocation operation.

When the processor core sends either a read or write request to the L1 cache, the processor core provides a virtual address, PC_vaddr. The virtual address and information derived from it, such as a valid tag match signal, are stored in a series of staging buffers 332, 334, 336. Additional staging buffers, beyond those shown in FIG. 9C, may be required in some implementations. The virtual address is translated into a physical address (PA) by a translation lookaside buffer (TLB) 340 at the same time that a tag and state lookup is performed by the tag and state arrays 274, 266. The resulting physical address and tag lookup results are stored in a second staging buffer 334 and are then conveyed to a tag checking circuit 342 that determines if there is a tag match for a valid cache line. The results of the tag check, which includes state information as well as tag match information and the virtual address being checked, are stored in yet another staging buffer 336. The information in the staging buffer 336 is conveyed to a data write FSM 360 when a valid match is found, and is conveyed to the output FSM 312 when a cache miss is detected. The final staging buffer 336 also stores a "replay" signal, generated by the tag checking circuit 342, and the replay signal is conveyed to the processor core to indicate whether the L1 read or write operation requested by the processor core must be resubmitted to the L1 cache after the PC_inhibit signal is deactivated.

When a data write is being performed, the write request signal (PC_WrRq) and the results of the tag lookup are used by a data write FSM 360 and a cache access Arbiter 362 to determine if (and when) the data sourced by the processor core is to be written into the L1 cache data array 262. The data sourced by the processor core is buffered in a series of staging buffers 352, 354, 356 so that the data to be written is available at the data array input multiplexer 322 at the same time that the tag check results become available to the data write FSM 360. The data write FSM 360 stalls the data pipeline 352, 354, 356 if the arbiter 362 determines that the L1 cache is not ready to store the sourced data into the L1 cache data array 262.

When a data read is being performed, the read request signal (PC_RdRq) is received directly by the arbiter 362 and the virtual address is used to directly read a cache line in the data array 262 even before the results of the tag lookup and check are ready. The data read from the data array is temporarily buffered in staging buffer 321 and is discarded if a cache miss is detected. If the read data is being read in response to a processor core request and a cache hit is detected, the read data is sourced from the staging buffer 321 to the processor core via the data path labeled Array_Out Data (L1_PC_data). If the read data is being read in response to a request received via the ICS 112, the read data is sourced from the staging buffer 321 to the Fwd/Evt buffer 366, and from there it is conveyed to the output FSM 312 for transmission to the requesting device via the ICS 112.

L2 Cache with Duplicate L1 Tags

Figure 10A:
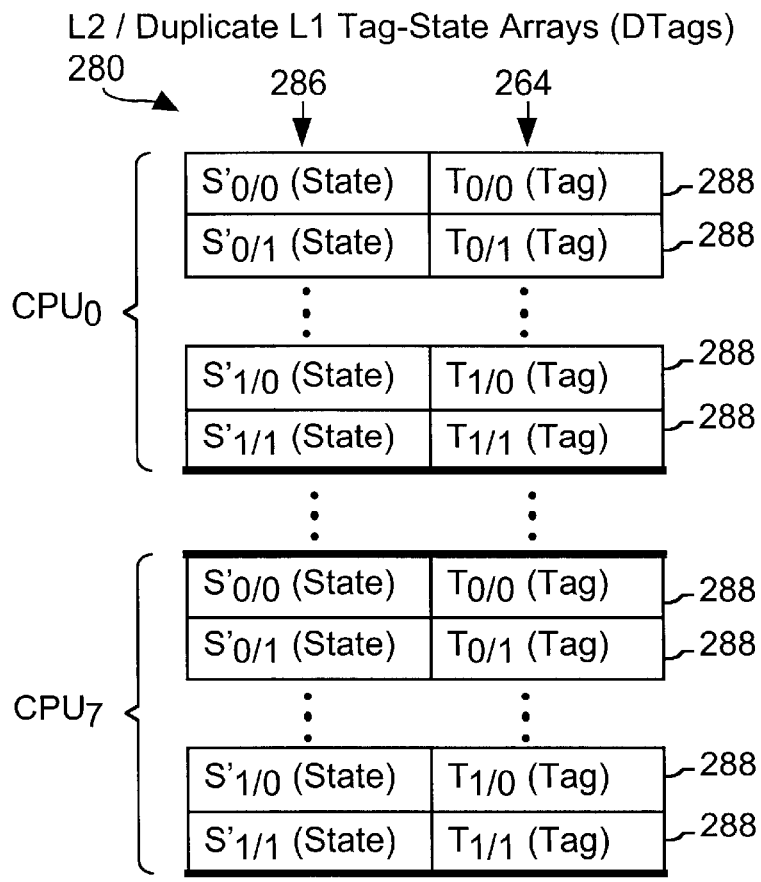
FIGS. 10A and 10B depict the duplicate tag, tag-state and data arrays of an L2 cache.

Referring to FIG. 10A, the L2 cache includes a set of "duplicate L1 tag and state arrays" 280. These "DTag" arrays 280 contain exact copies of the tag arrays of all the L1 caches in the same node as the L2 cache, and furthermore contain state information that is similar to, but not identical, to the state information in the L1 cache state arrays 266 (FIG. 9A). Thus, each entry 288 of the DTag arrays 280 corresponds to exactly one of the L1 cache entries 268 in the L1 caches of the node. The relationship between the state information in the L1 cache, the state information in the DTag arrays 280 of the L2 cache, and the state information in the L2 cache (see FIG. 10B) is as follows:

| L1 state | DTag-L1 state | Possible corresponding L2 states |
|---|---|---|
| invalid | invalid | invalid, clean, clean_nodex, dirty |
| shared | shared_clean | invalid, clean, clean_nodex, dirty |
|  | shared_clean_owner | invalid |
|  | shared_clean_owner_nodex | invalid |
|  | shared_dirty | invalid |
| clean_exclusive | exclusive | invalid |
| dirty_exclusive |  | invalid |

As shown in the above table, the L2 cache keeps additional information in the DTag arrays regarding the ownership of shared cache lines. For instance, the shared_clean_owner_nodex state for any particular cache line indicates that the cache line in the L1 cache has not been modified, and that this node is the exclusive owner of the cache line. The clean_nodex state in the L2 cache means the same thing.

An L1 cache line with a DTag state of exclusive, shared_dirty, shared_clean_owner or shared_clean_owner_nodex is the owner of the cache line. If the L2 cache has a valid copy of the cache line, it is the owner of the cache line, and the only possible DTag states for that cache line are invalid or shared_clean. An L1 cache always performs a write-back when it replaces a cache line of which it is the owner. The written back cache line is loaded into the L2 cache, possibly victimizing another L2 cache line.

The L1 cache owner of a cache line responds to other L1 misses on the same cache line. In this case the requester of the cache line become the new owner and the previous owner's DTag state for the cache line is changed to shared_clean.

If a cache line is present in a particular node, node-exclusive information is kept in either the L2 state of in the DTag state of the owner L1 cache. The L2 states clean_nodex and dirty, and the DTag states shared_clean_owner_nodex, shared_dirty and exclusive all indicate that the node is the only node in the system that is caching the identified memory line (i.e., identified by the tag and cache index of the cache line). In a preferred embodiment, dirty (i.e., modified) cache lines are never shared across nodes. Thus, if a node has cache line that has been modified with respect to the memory copy, no other node in the system can have a copy of the line. As a result, when a node requests a shared copy of a cache line that has been modified by another node, the memory transaction that satisfies the request will always write-back the modified data to memory. Within a single node, however, a preferred embodiment allows sharing of a modified cache line among the processor cores. In this case, the DTag state of the L1 owner is set to shared_dirty and any other sharers have their DTag state set to shared_clean.

Figure 10B:
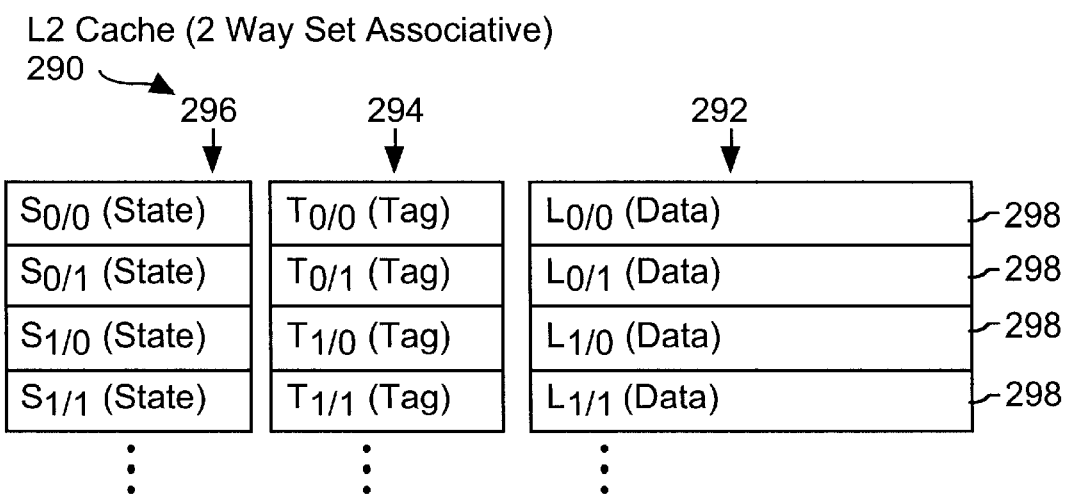

Referring to FIG. 10B, the main L2 cache array 290 includes a data array 292 for storing cache lines, a tag array 294 and a state array 296. The L2 cache array is preferably distributed across eight interleaved arrays, but for purposes of this explanation, the interleaved array structure is not shown, as it does not affect the logical organization and operation of the L2 cache. Each entry 298 of the L2 cache 260 includes a cache line, a tag and a state value. The cache line consists of the data from one memory line, and in a preferred embodiment this consists of 64 bytes (512 bits) of data plus parity and ECC bits corresponding to the 64 bytes.

The tag of each entry 268 consists of the address bits required to uniquely identify the cache line, if any, stored in the entry. Because the L2 cache is typically much larger than the L1 caches, a different subset of the address bits of a memory line address is used to identify the cache index and a different subset of the address bits is used as the tag compared with the address bits used for those purposes in the L1 caches.

The L2 cache line state value for each L2 cache entry is selected from among the following state values:

invalid, which means that the cache entry 268 is empty, or that the data in it is invalid and should not be used;

clean, which means that the value of the memory line has not been changed and is therefore the same as the copy in main memory, and furthermore means that copies of the cache line may be stored in (A) one or more of the L1 caches of the same node as the L2 cache and/or (B) the L1 or L2 caches in other nodes of the system, and that these copies are non-exclusive copies of the same memory line as the one stored in the L2 cache entry;

clean_nodex (clean node-exclusive), which means that the L2 cache has a clean copy of the associated memory line (i.e., the memory line has not been changed and is the same as the copy in main memory), and that there may be cached copies of this memory line in local L1 caches in the same node as the L2 cache, but there are no copies of the memory line in any other nodes of the system; and dirty, which means that this L2 cache has the only copy of the associated memory line, and that the value of the cache line has been changed by one of the processor cores coupled to the L2 cache.

L2 Data Paths and Control Logic

Figure 10C:
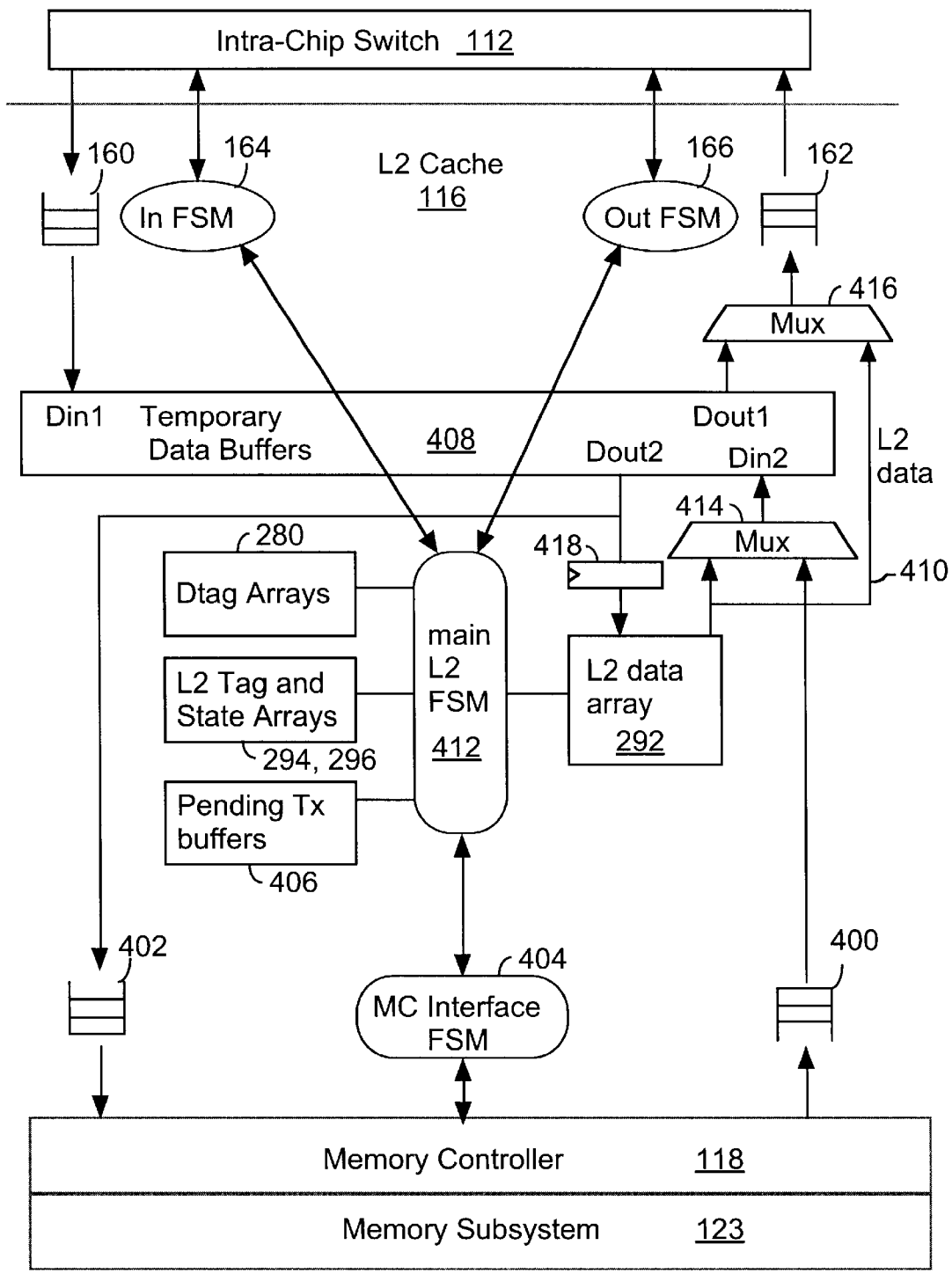
FIG. 10C shows the architecture of the L2 cache in more detail.

FIG. 10C shows the data paths and primary components of the L2 cache 116. As described earlier with respect to FIG. 3, the L2 cache has an interface to the intra-chip switch 112. This interface includes one or more input buffers 160, one or more output buffers 162, an input finite state machine (In FSM) 164 for controlling use of the input buffer(s) 160, and an output finite state machine (Out FSM) 166 for controlling use of the output buffer(s) 162. Similarly, the L2 cache 116 has an interface to the memory controller 118 (see also FIG. 1) that includes one or more input buffers 400, one or more output buffers 402 and a memory controller interface finite state machine (MC interface FSM) 404 for controlling the use of the MC interface input and output buffers 400, 402.

A set of pending buffers 406 are used to store status information about memory transactions pending in the L2 cache. For instance, the pending buffers 406 keep track of requests made to the memory subsystem (see FIG. 1) via the memory controller 118. A set of temporary data buffers 408 are used to temporarily store cache line data associated with pending memory transactions, including data being sourced to the L2 cache, data sourced from the L2 cache, and data transported through the L2 cache (i.e., from the memory subsystem 123 to the L1 cache). Data sent by the L2 cache in response to an L1 cache miss bypasses the temporary data buffers 408 and is sent via a bypass data path 410 so as to reduce latency when the L2 cache contains the data needed to satisfy a cache miss in an L1 cache (which is coupled to the L2 cache via the ICS 112).

The duplicate tag (DTag) arrays 280 and L2 tag and state arrays 294, 296 have been discussed above with reference to FIGS. 10A and 10B. Access to and updating of these arrays is handled by the main L2 finite state machine 412. The main L2 FSM 412 includes DTag and tag lookup, DTag and tag checking, and DTag, tag and state updating logic.

When an L1 cache miss is serviced by the L2 cache 116, and the L2 cache does not have a cached copy of the memory line required by the L1 cache, the request is forwarded to the memory subsystem 123 via the MC interface FSM 404. The memory line of information provided by the reply from the memory subsystem 123 is not stored in the L2 cache 116. Instead the memory line is sent directly to the L1 cache, bypassing the L2 data array 292. More specifically, the reply from the memory subsystem is directed through multiplexer 414 to the Din2 input port of the temporary data buffers 408. The reply is then output at the Dout1 port of the temporary data buffers 408 to the interface output buffer 162 via output multiplexer 416.

When an L1 cache evicts a memory line from the L1 cache, the victim memory line is sent to the L2 cache for storage via the ICS 112 and the interface input buffer 160. The victim memory line is received at the Din1 input port of the temporary data buffers 408 and temporarily stored therein. The victim memory line is then sent from the temporary data buffers 408 to the L2 data array 292, via the Dout2 port of the temporary data buffers 408 and a staging buffer 418, for storage in the L2 data array 292.

When the L2 cache sources a memory line to an L1 cache, the memory line read from the L2 data array 292 is conveyed via bypass line 410 to output multiplexer 416, and from there to the ICS interface output buffer 162. The output FSM 166 handles the transfer of the memory line from the output buffer 162 to the ICS 112, and from there it is sent to the L1 cache.

Duplicate tags (DTags) are used by the L2 cache to determine which L1 caches have cached copies of an identified memory line. The duplicate tags in the DTag arrays 280 are accessed by the main L2 FSM 412, and information derived from the duplicate tags is used to send messages via the output FSM 166 to one or more of the L1 caches in the same node as the L2 cache, or to other components of the node.

Cache Coherence Protocol

The present invention includes a cache coherence protocol (CCP) that enables the sharing of memory lines of information 184 across multiple nodes 102, 104 without imposing protocol message ordering requirements or requiring negative acknowledgments (NAKs). Because invalidation NAKs are not used in this invention, the CCP includes an assumption that the various requests (e.g., read request) discussed below always succeed. Additionally, the CCP is invalidation based, so shared copies of a memory line of information 184 are invalidated when the memory line of information 184 is updated.

As noted above, memory transaction relates to a memory line of information. Completion of a memory transaction requires a plurality of protocol messages, which are generated in part by instructions. Preferred embodiments of the present invention use seven instruction types: SEND, RECEIVE, LSEND (to local node), LSEND_REC (combined send/receive to/from local node), TEST, SET, and MOVE. The actual protocol code is specified at a slightly higher level with symbolic arguments, and C-style code blocks. A sophisticated microcode assembler is used to do the appropriate translation and mapping to instruction memory 196.

Typical memory transactions require only a few instructions at each node 102, 104 for completion. For example, a memory transaction including a read request of a memory line of information 184 stored in a memory subsystem interfaced with a remote node 102, 104 requires a total of four instructions at the requesting node 102, 104: a SEND of the read request to the remote node 102, 104; a RECEIVE of the read reply; a TEST of the state of the memory transaction (e.g., state field 220 and counters field 226); and an LSEND that sends a protocol message based on the read reply to the PC 106 that initiated the memory transaction. The CCP supports read, read-exclusive, exclusive, and write-back request types. A number of other protocol messages are supported as well in order to implement the requests.

Figure 11A:
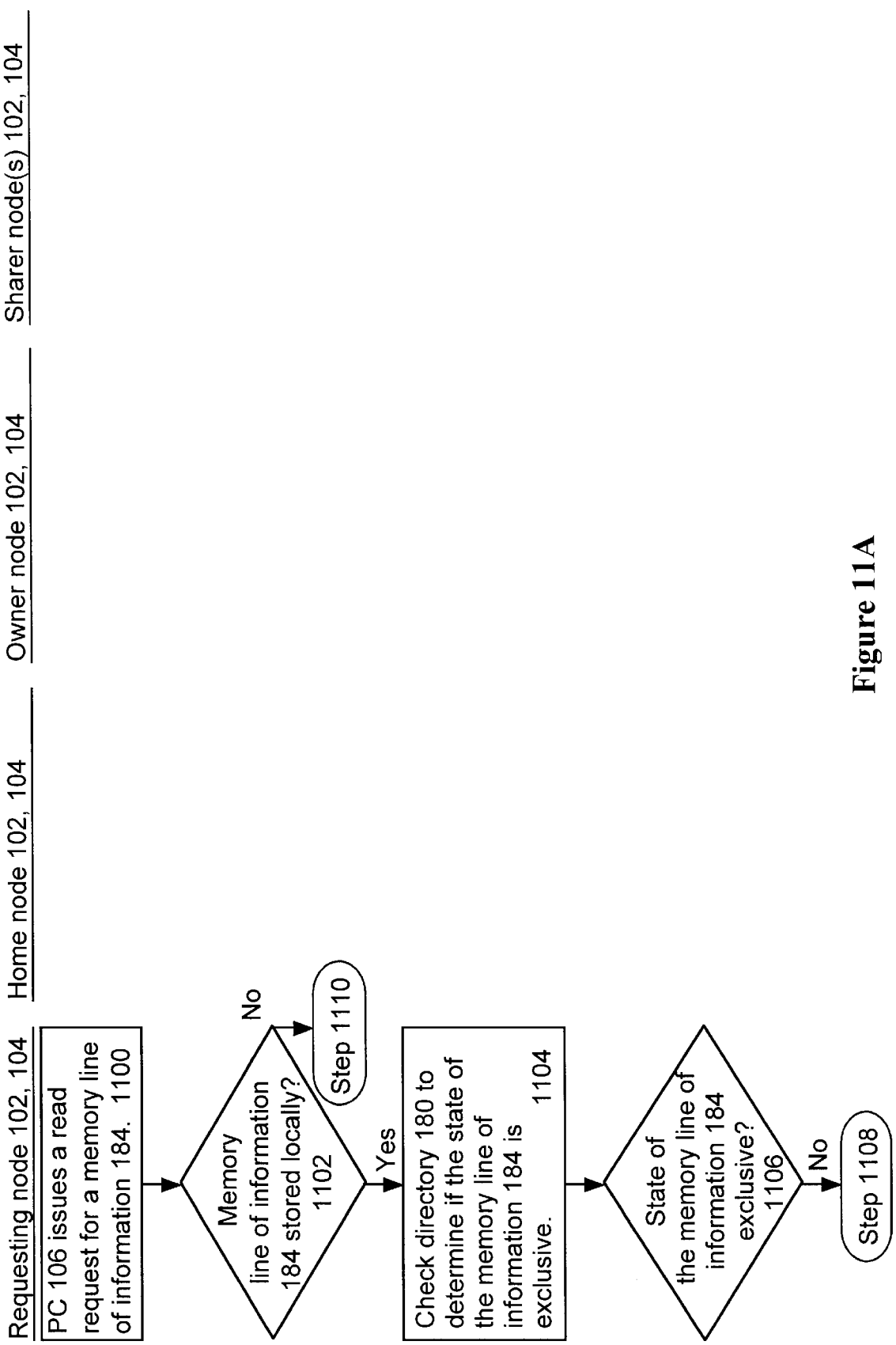
FIGS. 11A, 11B, 11C, 11D and 11E illustrate the exchange of protocol messages in the course of a read request.
Figure 11B:
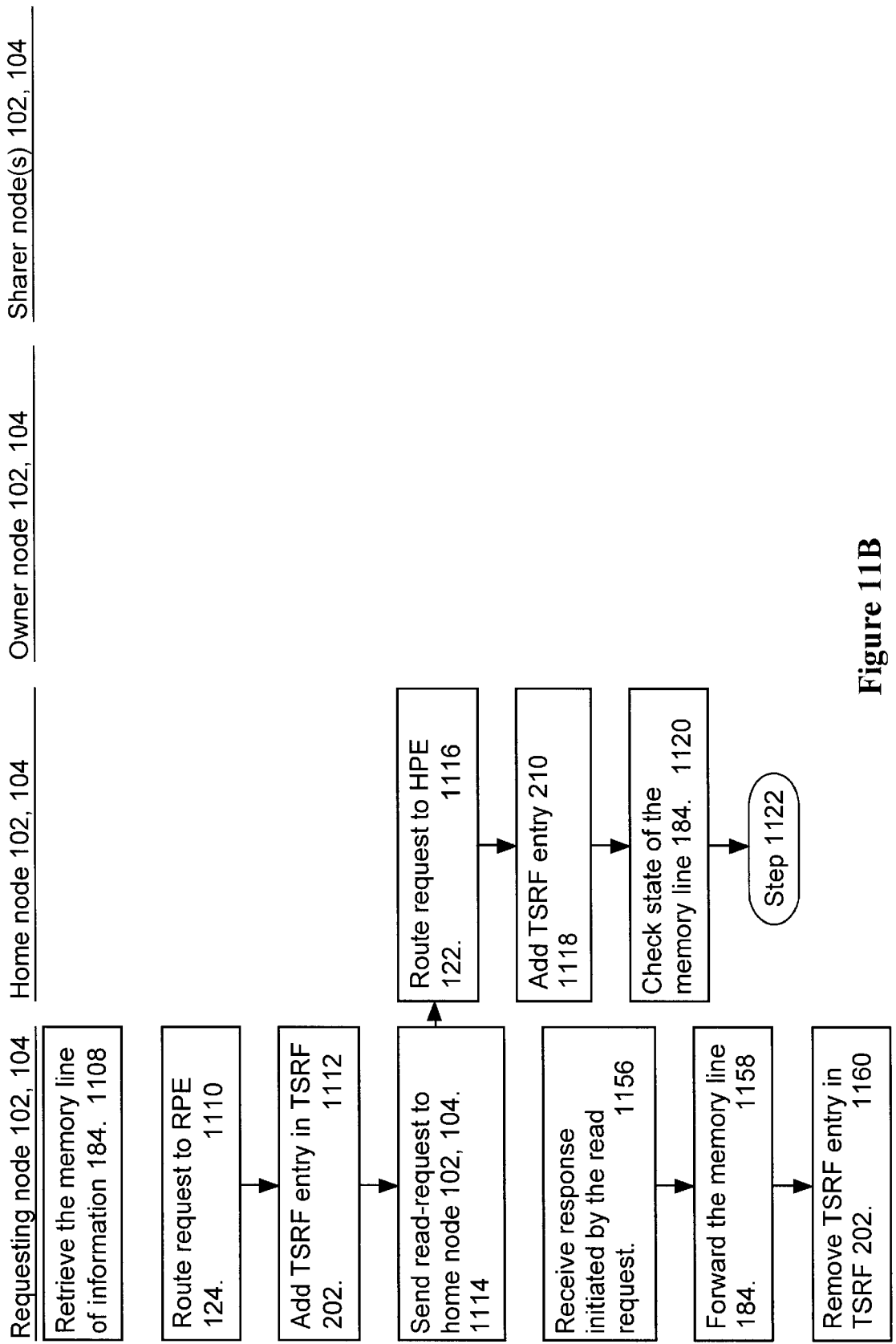

The request types are now discussed in greater detail. FIG. 11A illustrates steps executed to satisfy a read request for a memory line of information 184. In a first step, a PC 106 issues the read request for the memory line of information 184 (step 1100). If the memory line of information 184 is stored locally (step 1102-Yes), the state of the memory line of information 184 is checked by reference to a corresponding entry 182 in the directory 180 (step 1104). If the directory entry 182 does not indicate that a remote node 102, 104 has an exclusive copy of the memory line of information 184 (step 1106-No), the memory line of information 184 is retrieved directly from the memory subsystem 123 (FIG. 11B, step 1108).

If the memory line of information 184 is not stored locally (step 1102-No), the read request is routed to the RPE 124 (step 1110). The RPE 124 adds an entry 210 in the TSRF 202 (step 1112). The new entry 210 indicates that a read reply is required to advance the state of this memory transaction. The new entry 210 also indicates that until the read reply is received, incoming requests related to the memory line of information 184 are stalled, which means that a TSRF entry 210 is added to the TSRF 202 for the incoming requests. Once the read reply is received, the state of the TSRF entry 210 is updated by the RPE 124 so that these incoming requests are processed.

The RPE 124 then sends a read request to the home node (step 1114). The home node is the node 102, 104 to which the memory subsystem 123 storing the memory line of information 184 is interfaced.

Figure 11C:
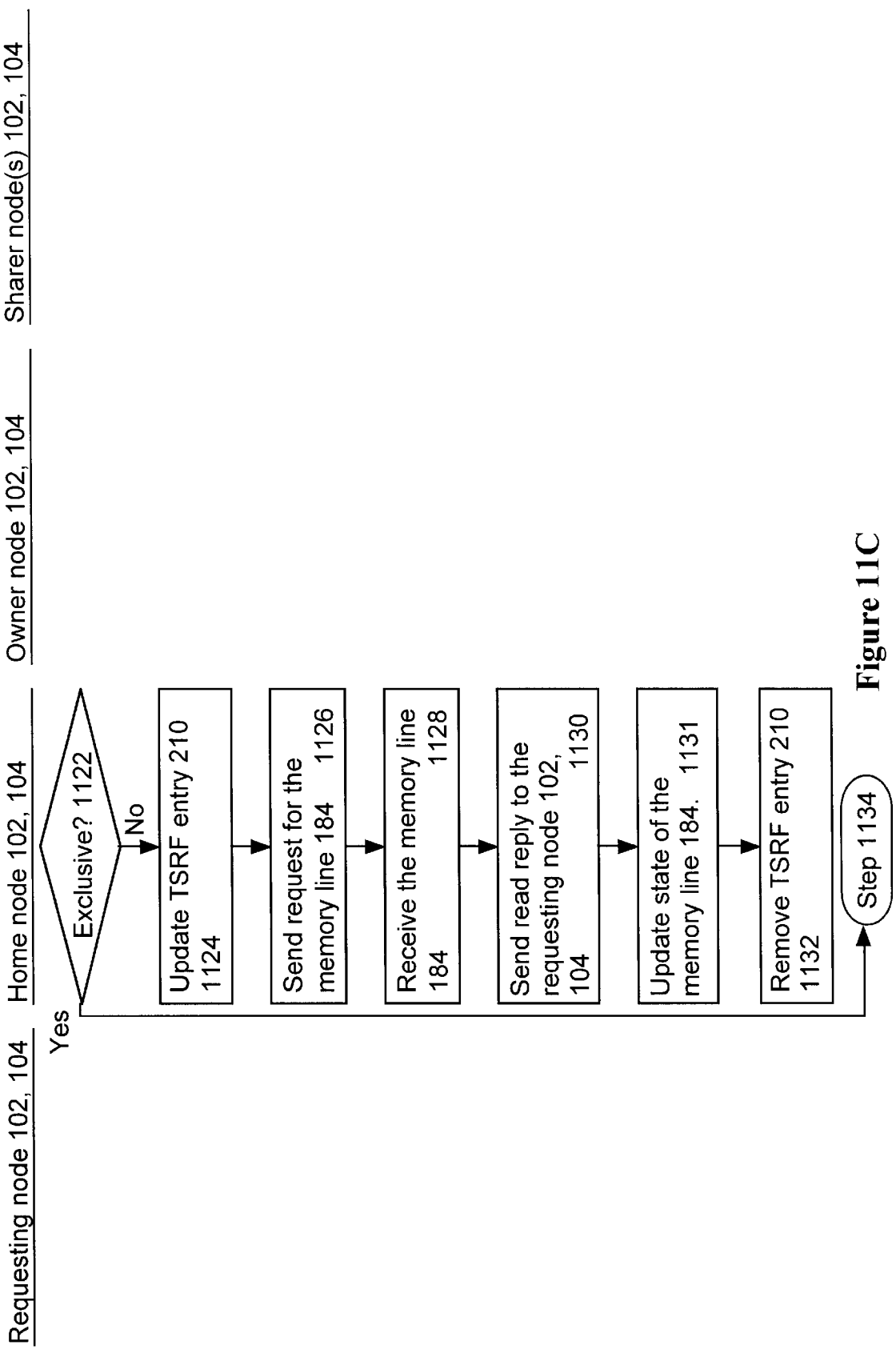

The read request is received by the home node 102, 104, and routed internally as described above to the HPE 122 (step 1116). The HPE 122 responds by adding an entry 210 in the TSRF 202 (step 1118) and checking the state of the memory line of information 184 in a corresponding entry 182 in the directory 180 (step 1120). If the entry 182 does not indicate that a node 102, 104 has an exclusive copy of the memory line of information 184 (FIG. 11C, step 1122-No), the HPE 122 updates the entry 210 in the TSRF 202 so that it indicates that the memory transaction requires an internal response to a request for the memory line of information 184 in order to advance to another state (step 1124). The HPE 122 then submits an internal request for the memory line of information 184 from the memory subsystem 123 (step 1126). Upon receiving the memory line of information 184 (step 1128), the BPE 122 sends a read reply to the requesting node 102, 104 (step 1130), updates the state of the memory line of information (step 1131), and removes the TSRF entry 210 (step 1132).

As noted above, the state of the memory line of information 184 is embodied in a corresponding entry 182 in the directory 180. Included in the entry 182 is a state field 186 and a sharer-information field 188. If the state field 186 indicates that the state of the memory line of information is shared-cv, the BPE determines which bit in the bits of the sharer-information field 188 the requesting node 102, 104 is mapped to. If the bit is not already set to indicate that a node 102, 104 mapped to that bit is sharing a copy of the memory line of information 184, the bit is so set.

If the state field 186 indicates that the state of the memory line of information is "shared", the HPE 122 determines if the requesting node 102, 104 is already identified as sharing the memory line of information 184 in the sharer-information field 188. If so, the sharer-information field 188 and state field 186 are not changed. If the requesting node 102, 104 is not already identified as sharing the memory line of information 184, the BPE 122 determines if any of the sub-fields within the sharer-information field 188 is set to indicate that it does not identify a sharer node 102, 104 (e.g., set to zero). If such a field is found, the HPE 122 sets it to identify the requesting node 102, 104. As noted above, the identity of the requesting node 102, 104 is included in the original request to share the memory line of information 184. If no such sub-field within the sharer-information field 188 is set to indicate that it does not identify a sharer node 102, 104, the HPE 122 must set the state field 186 to "shared-cv". Additionally, the HPE 122 must identify and set the bits in the 40-bit sharer-information field associated with (A) the four nodes 102, 104 previously identified by the sharer-information field 188 and (B) the requesting node 102, 104. The HPE 122 then removes the entry 210 from the TSRF 202 (step 1132).

Figure 11D:
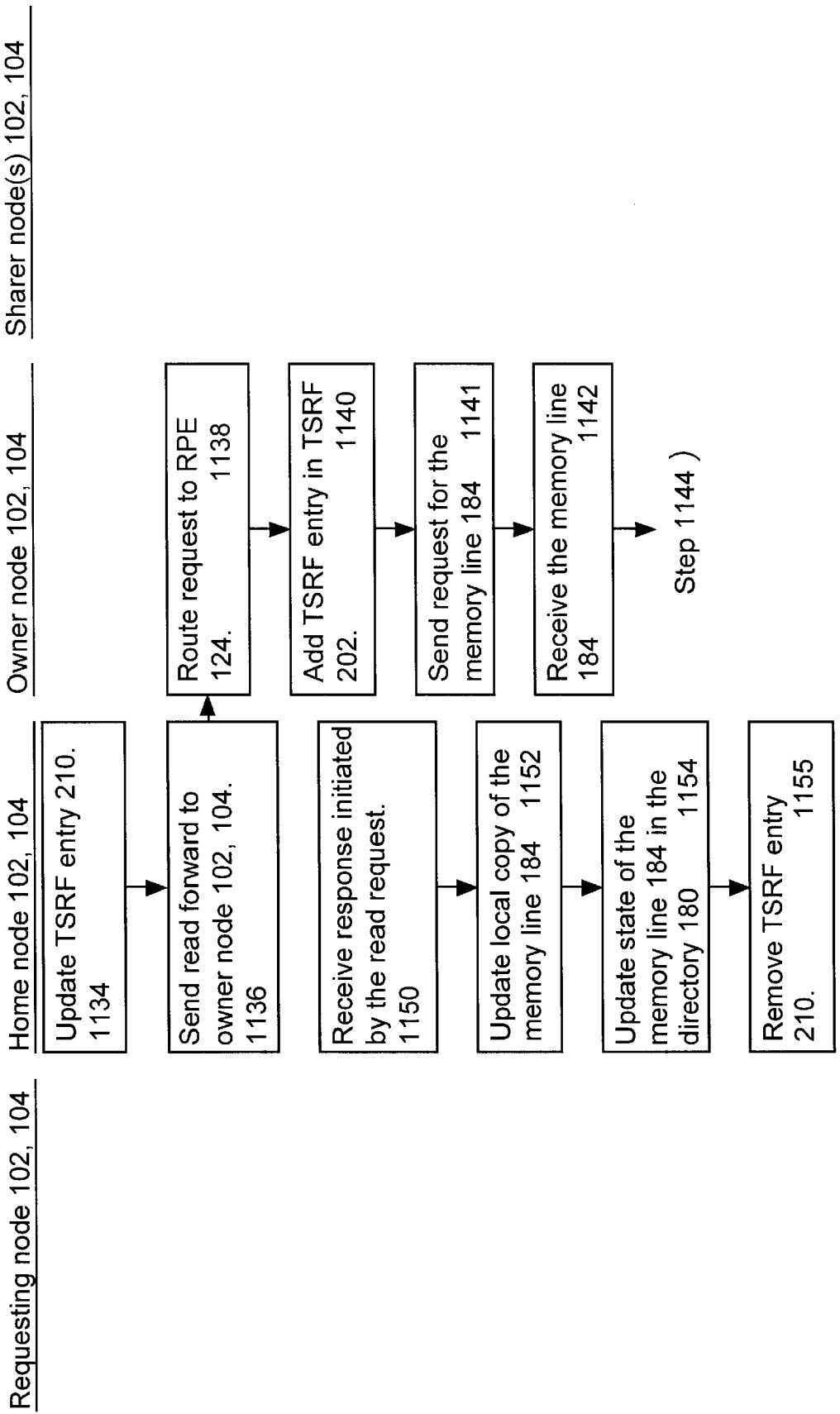

If the entry 182 indicates that a node 102, 104 (i.e., owner node) has an exclusive copy of the memory line of information 184 (step 1122-Yes), the HPE 122 updates the entry 210 in the TSRF 202 so that it indicates that the memory transaction requires a share write-back in order to advance to another state (FIG. 11D, step 1134). The state also indicates that any requests related to the memory line of information 184 received while the HPE 122 is waiting for the share write-back should be deferred (i.e., stalled) until after receipt of the share write-back. This is accomplished by adding a new entry 210 to the TSRF 202 for such requests, and setting the state of these new entries 210 to indicate that the associated memory transaction is eligible for processing once the share write-back is received.

Figure 11E:
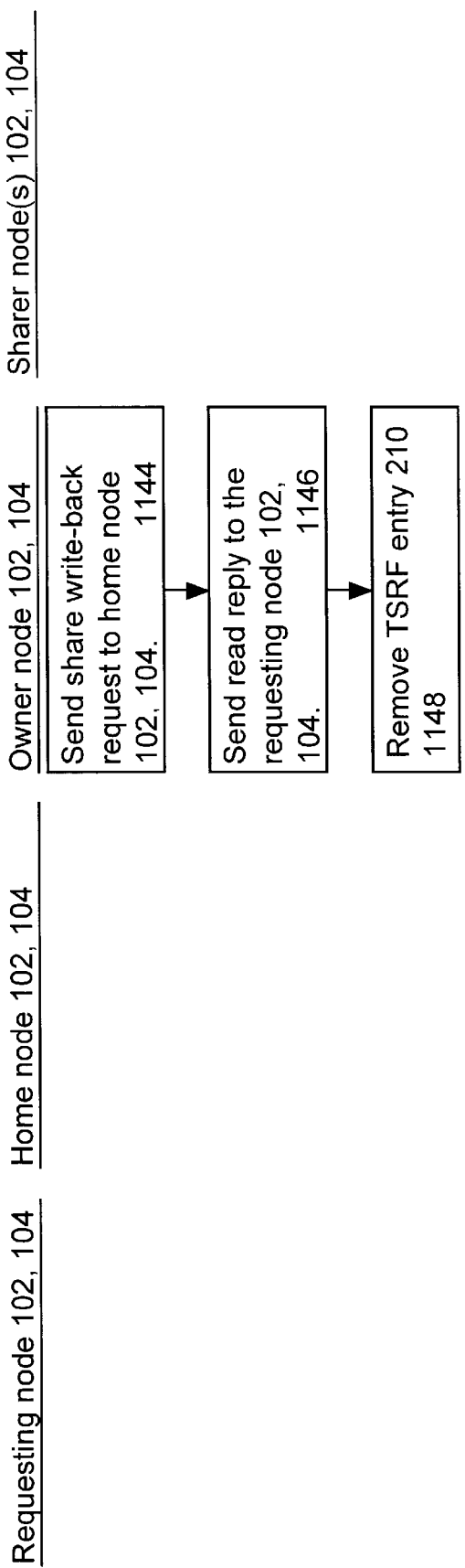

The HPE 122 then sends a read forward to the owner node 102, 104 (step 1136). The read forward is received by the owner node 102, 104, and routed to the RPE 124 (step 1138). The RPE 124 responds by adding an entry 210 in the TSRF 202 indicating that the memory transaction requires an internal response to a request for the memory line of information 184 in order to advance to another state (step 1140). The RPE 124 then sends an internal request for the memory line of information 184 from L1 or L2 cache 110, 114 (step 1141). Upon receiving the memory line of information 184 (step 1142), the RPE 124 sends a share write-back to the home node 102, 104 (FIG. 11E, step 1144) and a read reply to the requesting node 102, 104 (step 1146), both of these protocol messages include an up-to-date copy of the memory line of information 184. The RPE 124 also removes the entry 210 from the TSRF 202 (step 1148).

Upon receiving the share write-back (step 1150), the HPE 122 updates a copy of the memory line of information 184 (either in the memory subsystem 123 initially or a local cache initially and the memory subsystem 123 subsequently) (step 1152). BPE 122 then updates the state of the memory line of information 184 in the directory 180 to indicate that both the requesting node 102, 104 and the former owner node 102, 104 are both storing a shared copy of the memory line of information 184 (step 1154). The EPE 122 also updates the state of any entries 210 in the TSRF 202 for a request relating to the memory line of information 184 and received while waiting for the share write-back to indicate that the associated memory transaction may be executed. The HPE 122 then removes the entry 210 in the TSRF 202 related to this memory transaction (step 1155).

Upon receiving the read response (whether sent by the home node 102, 104 or an owner node 102, 104) (step 1156), the RPE 124 forwards the shared copy of the memory line of information 184 to the PC 106 that initiated the memory transaction (step 1158). The RPE also removes the entry 210 in the TSRF 202 related to the memory transaction (step 1160).

The read request steps described above with reference to FIGS. 11A–11E are subject to an optimization in preferred embodiments of the present invention. Specifically, if the memory line of information requested by the requesting node 102, 104 is not shared or owned by any nodes 102, 104, the HPE 122 returns an exclusive copy of the memory line of information 184. In other words, the response to a request for a shared copy of the memory line of information 184 is "upgraded" from a read reply to a read-exclusive reply. Thus, the requesting node 102, 104 is identified in the directory 180 as exclusive owner of the memory line of information. However, this optimization does not affect the home node's 102, 104 response to a request for a memory line of information that is comprised of an instruction since an instruction is never written to by a requesting node. Thus, there is no reason to provide an exclusive copy.

Figure 12A:
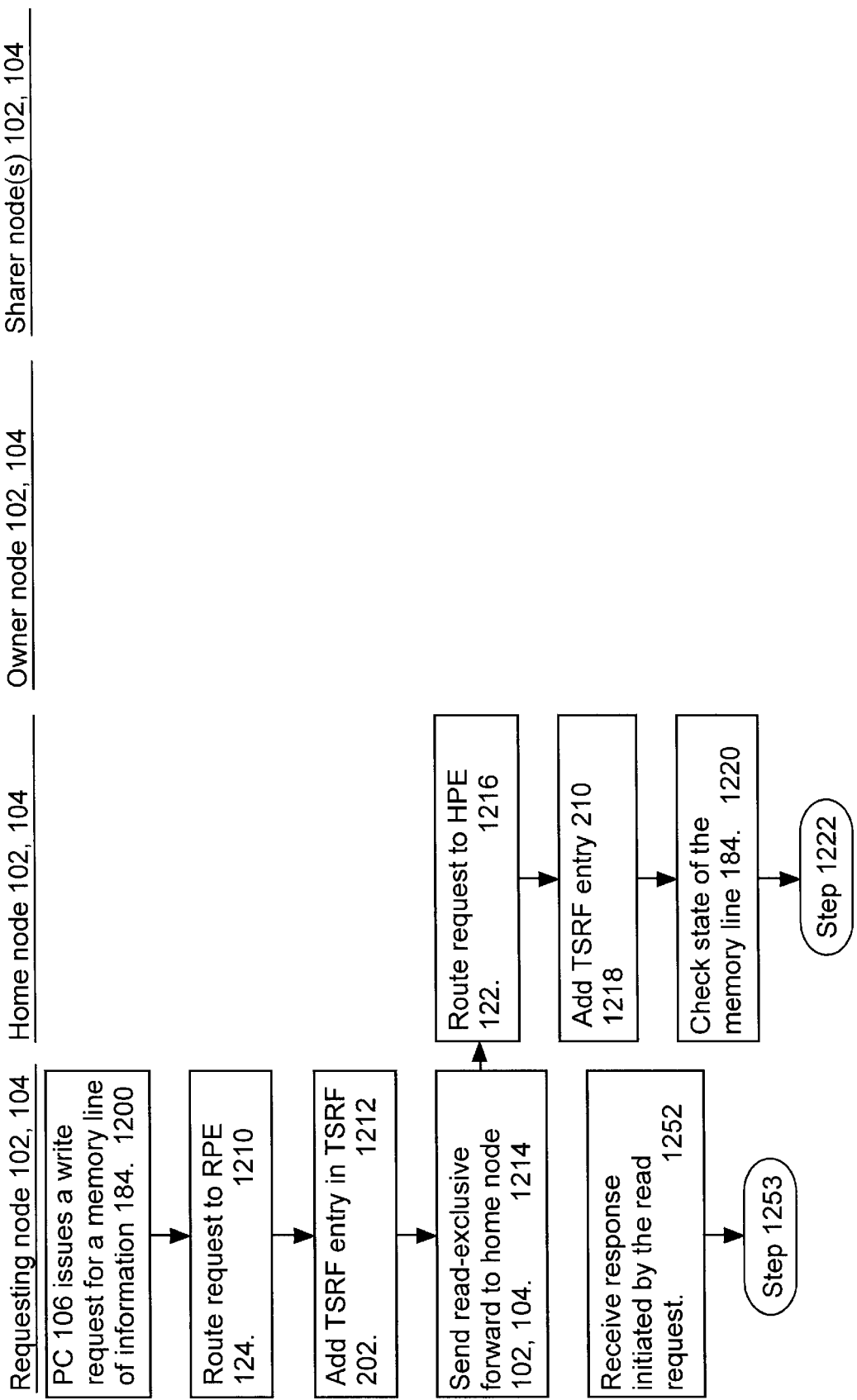
FIGS. 12A, 12B, 12C and 12D illustrate the exchange of protocol messages in the course of a write request.

FIG. 12A illustrates steps executed to satisfy a request for an exclusive copy of a specified memory line of information 184, which permits the node 102, 104 requesting the memory line of information 184 (i.e., requesting node) to modify the memory line of information 184. In a first step, a PC 106 issues the request for an exclusive copy of the memory line of information 184 (step 1200). The request is routed to the RPE 124 (step 1210), which adds an entry 210 in the TSRF 202 (step 1212). The new entry 210 indicates that a read-exclusive reply and a number (zero or more) of invalidation acknowledgments are required to advance the state of this memory transaction. The RPE 124 then sends a read-exclusive request to the home node (step 1214). At this point the memory transaction in the RPE 124 enters the Waiting state, where it remains until it receives the aforementioned read-exclusive reply and (zero or more) invalidation acknowledgments. When these messages are received by the RPE 124, the memory transaction it will made Active and then Running in order to receive and process these protocol messages so as to advance and complete the memory transaction. The new entry 210 also indicates that until the aforementioned replies are received, incoming requests related to the memory line of information 184 are stalled, which means that a TSRF entry 210 is added to the TSRF 202 for the incoming requests. Once the aforementioned replies are received, the state of the TSRF entry 210 is updated by the RPE 124 so that these incoming requests are processed.

The read-exclusive request is received by the home node 102, 104, and routed to the HPE 122 (step 1216) of the home node, which adds an entry 210 in the TSRF 202 (step 1218). The HPE 122 then checks the state of the specified memory line 184 in a corresponding entry 182 in the directory 180 (step 1220). At this time, the HPE also sends a request to the L2 cache to locate and invalidate any copies of the specified memory line that may be present on the home node. The L2 cache uses the information in its L2 tag array and DTag arrays to determine if any copies of the specified memory line are present in the L2 cache or any of the L1 caches in the home node. If a copy of the specified memory line is found in the L2 cache, it is invalidated by the L2 cache, and if a search of the DTag arrays locates any copies of the specified memory line in the home node's L1 caches a command message is sent by the L2 cache to the identified local L1 cache or caches instructing those L1 caches to invalidate their copies of the specified memory line. Each L1 cache that receives the invalidate command respond to this command by setting the state of the corresponding cache line to "invalid". It should be noted that when the requestor for exclusive ownership of the specified memory line is a processor core in the home node of the memory line, L2 cache invalidates all cached copies of the specified memory line except for the copy (if any) held by the L1 cache of the requesting processor.

Figure 12B:
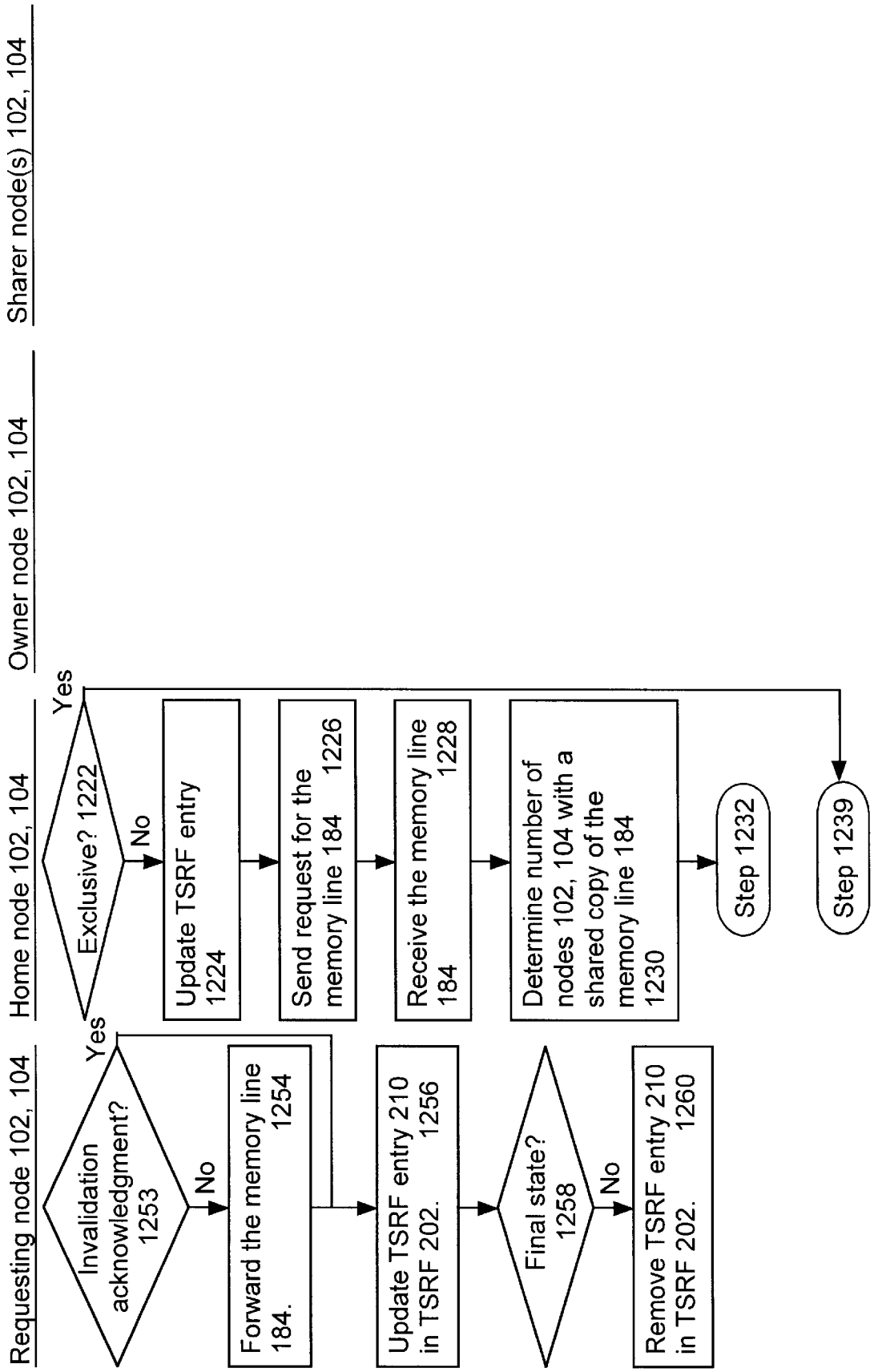
Figure 12C:
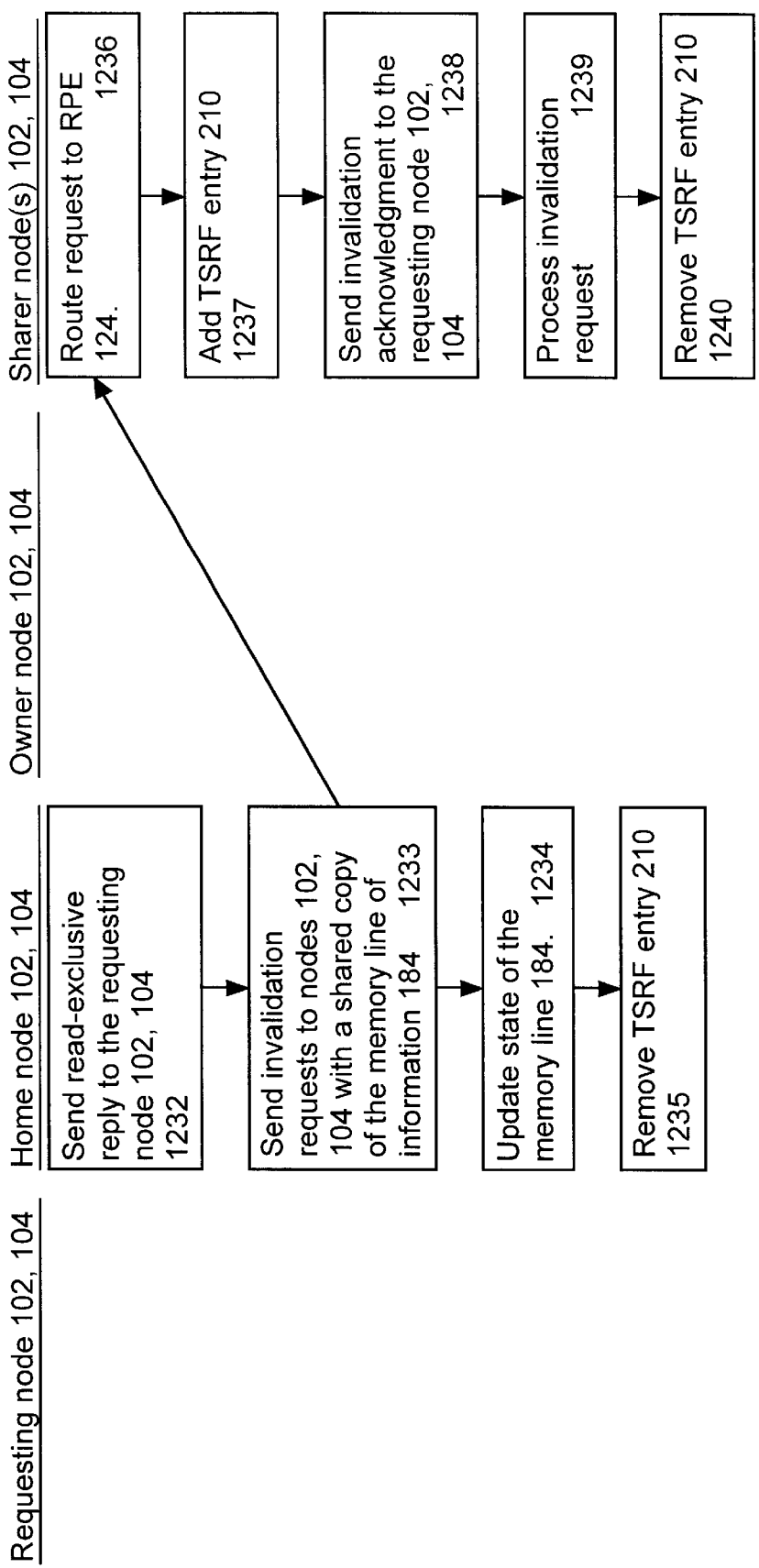
Figure 12D:
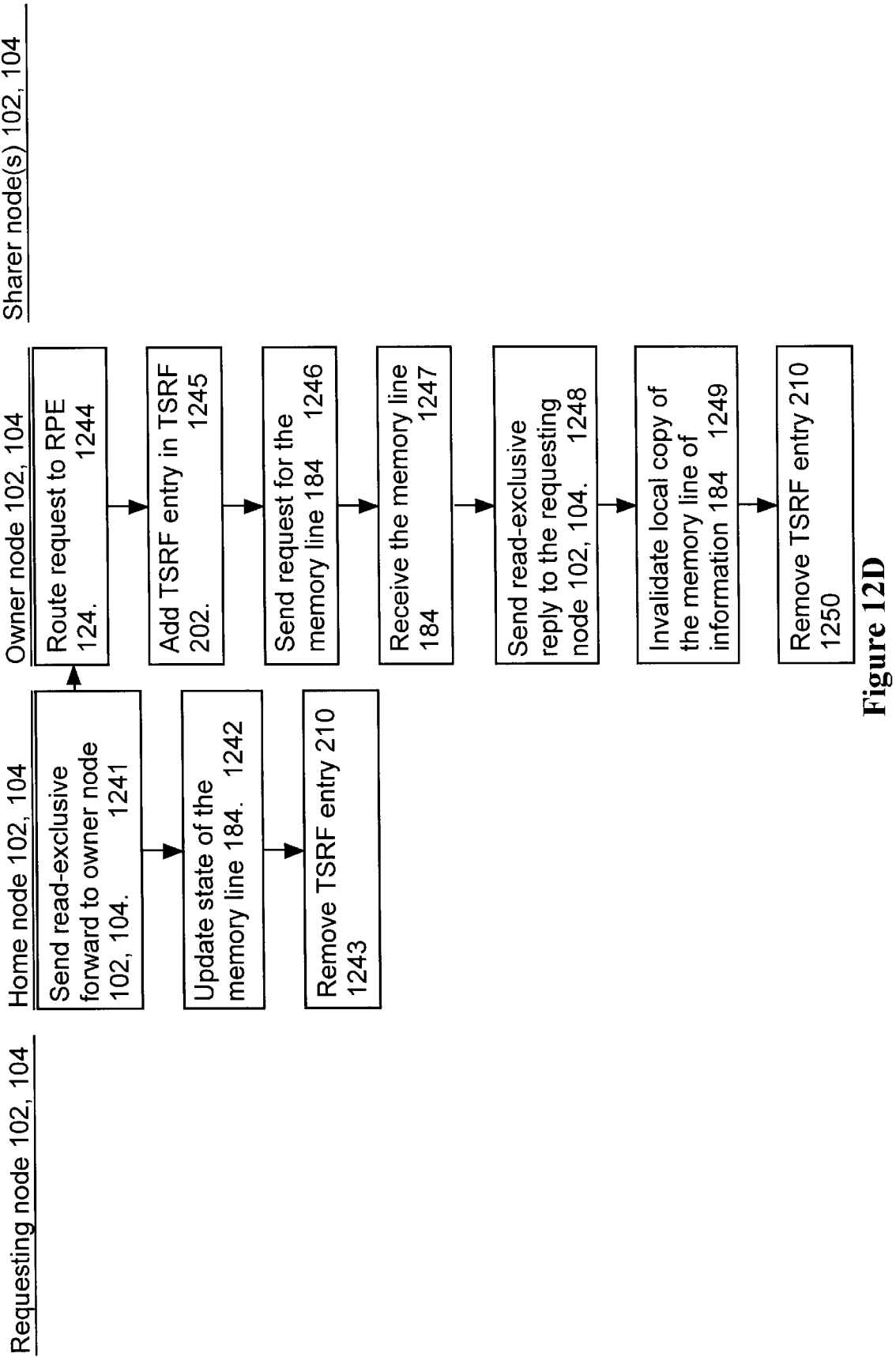

If the directory entry 182 for the specified memory line does not indicate that a node 102, 104 has an exclusive copy of the memory line of information 184 (FIG. 12B, step 1222-No), the HPE 122 updates the entry 210 in the TSRF 202 to indicate that the memory transaction requires an internal response to a request for the memory line of information 184 in order to advance to another state (step 1224). The HPE 122 then sends a request for the memory line of information 184 from the memory subsystem 123 (step 1226). Upon receiving the memory line of information 184 (step 1228), the EPE 122 determines the number of nodes 102, 104 that have a shared copy of the memory line of information by reference to an entry 182 in the directory 180 corresponding to the memory line of information 184 (step 1230). The HPE 122 then sends a read-exclusive reply to the requesting node 102, 104 (step 1232). The read-exclusive reply includes a copy of the memory line of information and indicates the number of invalidation acknowledgments to expect. HPE 122 then sends an invalidation request to each node 102, 104, if any, that has a shared copy of the memory line of information 184 (step 1233). The HPE uses the information in the directory entry for the memory line to identify the nodes having a shared copy of the memory line. HPE 122 then updates the state of the memory line of information 184 in the directory 180 to indicate that the requesting node 102, 104 is an exclusive owner of the memory line of information (step 1234) and removes the TSRF entry 210 in the TSRF 202 related to this memory transaction (step 1235). Thus, from the perspective of the home node 102, 104, the entire memory transaction (including activity at other nodes 102, 104) is now complete, though other nodes 102, 104 must process protocol messages relating to this memory transaction.

The invalidation request is received by the sharer node(s) 102, 104, and routed to the RPE 124 (step 1236) in each of those nodes, which respond by adding an entry 210 to the TSRF 202 (step 1237). The RPE 124 responds initially by sending an invalidation acknowledgment to the requesting node 102, 104 (step 1238). Additional steps taken by the RPE 124 depend upon whether the RPE is waiting on any requests related to the same memory line of information 184 (step 1239). See the discussion below, in the section entitled "Limited Fanout Daisy-Chaining Invalidation Requests," for a description of another methodology of sending and handling invalidation requests and acknowledgments.

If the RPE 124 is waiting for a response to a read request, the invalidation request is merged with the outstanding read request transaction. To do this the RPE updates the TSRF entry 210 corresponding to the outstanding read request to indicate that an invalidation request related to the same memory line of information 184 has been received. Once the response to the read request is received, the PC 106 that initiated the read request/memory transaction is given a read-once copy of the memory line of information. In other words, the PC 106 is not permitted to cache a copy of the memory line of information 184. This situation (receiving an invalidation request while waiting for a response to a read request) occurs because the CCP does not order protocol messages. More specifically, the home node 102, 104 received the read request and sent a response to the read request before receiving the read-exclusive request and sending the invalidation request, but the invalidation request is received before the response.

If the RPE 124 is waiting for a response to a read-exclusive request or an exclusive request, the invalidation request is acknowledged as noted above and no additional steps are taken (e.g., there is no limitation to a read-once copy).

Once these additional steps are complete, the RPE 124 removes the TSRF entry 210 related to this memory transaction (step 1240).

If the directory entry 182 indicates that a node 102, 104 has an exclusive copy of the memory line of information 184 (step 1222-Yes), the HPE 122 sends a "read-exclusive forward" message to the owner node 102, 104 (step 1241), updates the state of the memory line of information 184 in the directory 180 to indicate that the requesting node 102, 104 is exclusive owner of the memory line of information 184 (step 1242), and removes the TSRF entry 210 in the TSRF 202 related to this memory transaction (step 1243). Thus, from the perspective of the home node 102, 104, the entire memory transaction (which includes activity at other nodes 102, 104) is now complete, though other nodes 102, 104 continue to process this memory transaction.

The read-exclusive forward is received by the owner node 102, 104, and routed to the RPE 124 (step 1244). The RPE 124 responds by adding an entry 210 in the TSRF 202 indicating that the memory transaction requires an internal response to a request for the memory line of information 184 in order to advance to another state (step 1245). The RPE 124 then sends a request for the memory line of information 184 from the L1 or L2 cache 110, 114 in which the memory line is locally stored (step 1246). Upon receiving the memory line of information 184 (step 1247), the RPE 124 sends a read-exclusive reply to the requesting node 102, 104 (step 1248). This protocol messages includes an up-to-date copy of the memory line of information 184. The RPE 124 then invalidates the local copy of the memory line of information 184 (step 1249) and removes the entry 210 from the TSRF 202 (step 1250).

When the home node is the owner node, there is no need for the HPE of the owner node to send a read-exclusive forward to the owner node. Instead, the HPE sends a message to the L2 cache requesting that it forward a copy of the specified memory line and that it furthermore invalidate all cached copies of the memory line in the L2 cache and/or the L1 caches in the home node. The HPE would then send the read-exclusive reply message to the requesting node (i.e., steps 1246 through 1250 would be performed by the home node, since it is also the owner node in this example).

Upon receiving the read-exclusive response (step 1252), the steps taken depend upon the content of the response. As noted above, a read-exclusive request can result in a number of invalidation acknowledgments from nodes 102, 104 that have or had a shared copy of the memory line of information 184. Additionally, the CCP does not requires protocol message ordering, so invalidation acknowledgments can arrive at the requesting node before a read-exclusive reply. If the response is an invalidation acknowledgment (step 1253-Yes), RPE 124 updates the TSRF entry 210 in the TSRF 202 associated with this memory transaction to reflect that the invalidation acknowledgment was received (step 1256). More specifically, RPE 124 increments or decrements a counter in the counter fields 226 of the TSRF entry 210.

If the response is not an invalidation acknowledgment (step 1253-No), it is a read-exclusive reply, in which case the RPE 124 forwards the memory line of information 184 included in the reply to the PC 106 that requested the memory line of information (step 1254). If the read-exclusive reply indicates that a number of invalidation acknowledgment are to be received, the reply to the PC 106 also indicates that the memory transaction is not complete (unless the number of invalidation acknowledgments have already been received). RPE 124 then updates the TSRF entry 210 to reflect that the read-exclusive reply has been received and to indicate the number of invalidation acknowledgments, if any, to be received as well (step 1256).

Whether an invalidation acknowledgment or a read-exclusive reply is received, RPE 124 then determines if another protocol message is due (e.g., an invalidation acknowledgment or a read-exclusive reply). If no additional protocol messages are due, (step 1258-Yes), RPE 124 removes the TSRF entry 210 from the TSRF 202 (step 1260). Otherwise, the entry 210 is not removed immediately, but is updated and eventually removed as additional, related protocol messages are received. Additionally, the RPE 124 sends an additional message to the PC 106 to indicate that the memory transaction is complete if the RPE 124 indicated to the PC 106 in its earlier reply that the memory transaction was not complete.

Until the TSRF entry 210 in the TSRF 202 is removed, incoming requests (read, read-exclusive, exclusive protocol messages) related to the memory line of information 184 are merged with the existing TSRF entry 210 related to this memory line of information 184 and put in the Suspended state. Once the read-exclusive reply and all invalidation acknowledgments, if any, are received, the state of the TSRF entry 210 is updated to the Active state so that it will be selected by the scheduler and the merged requests will be processed by the test and execution unit 194.

Additionally, the write request steps described above with reference to FIGS. 12A–12D are subject to an optimization in preferred embodiments of the present invention. Specifically, if the requesting node 102, 104 already has a copy of the memory line of information, the RPE 124 of the requesting node sends an "exclusive request" to the home node 102, 104 instead of a "read-exclusive request." If the requesting node 102, 104 is unambiguously listed as a sharer node 102, 104 in the entry 182 of the directory 180, the steps are the same as those described above with reference to FIGS. 12A–12D, with the exception that the home node 102, 104 does not include the memory line of information 184 with the exclusive reply (a protocol message sent instead of a read-exclusive reply).

A given node is unambiguously listed as a sharer node if the sharer-information field 188 is in the limited-pointer format and includes the identifier of the given node or in coarse-vector format and only the requesting node is associated with a particular set bit. Thus, a given node is not unambiguously listed as a sharer node 102, 104 if (1) the sharer-information field 188 is in the limited-pointer format but does not include the identifier of the given node, or (2) the sharer-information field 188 is in the course-vector format and the bit associated with the given node 102, 104 is also associated with other nodes.

If the requesting node 102, 104 is not unambiguously listed as a sharer node 102, 104 in the entry 182 of the directory 180, the HPE 122 converts the exclusive request to a read-exclusive request, which is then processed as described above. Alternatively, the HPE 122 sends a protocol message to the RPE 124 at the requesting node 102, 104 directing it to send a read-exclusive request to the home node. In another alternate embodiment, the RPE of the requesting node is configured to recognize when the number of nodes in the system is sufficiently great that the coarse vector bit used to represent the requesting node in the sharer information field 188 of directory entries also represents at least one other node. In this alternate embodiment, the RPE of the requesting node is further configured to not send exclusive requests when it recognizes, detects or knows this of this system status, and to instead send a read-exclusive request. In other words, in this situation the "exclusive request" optimization is suppressed or not used.

Figure 13:
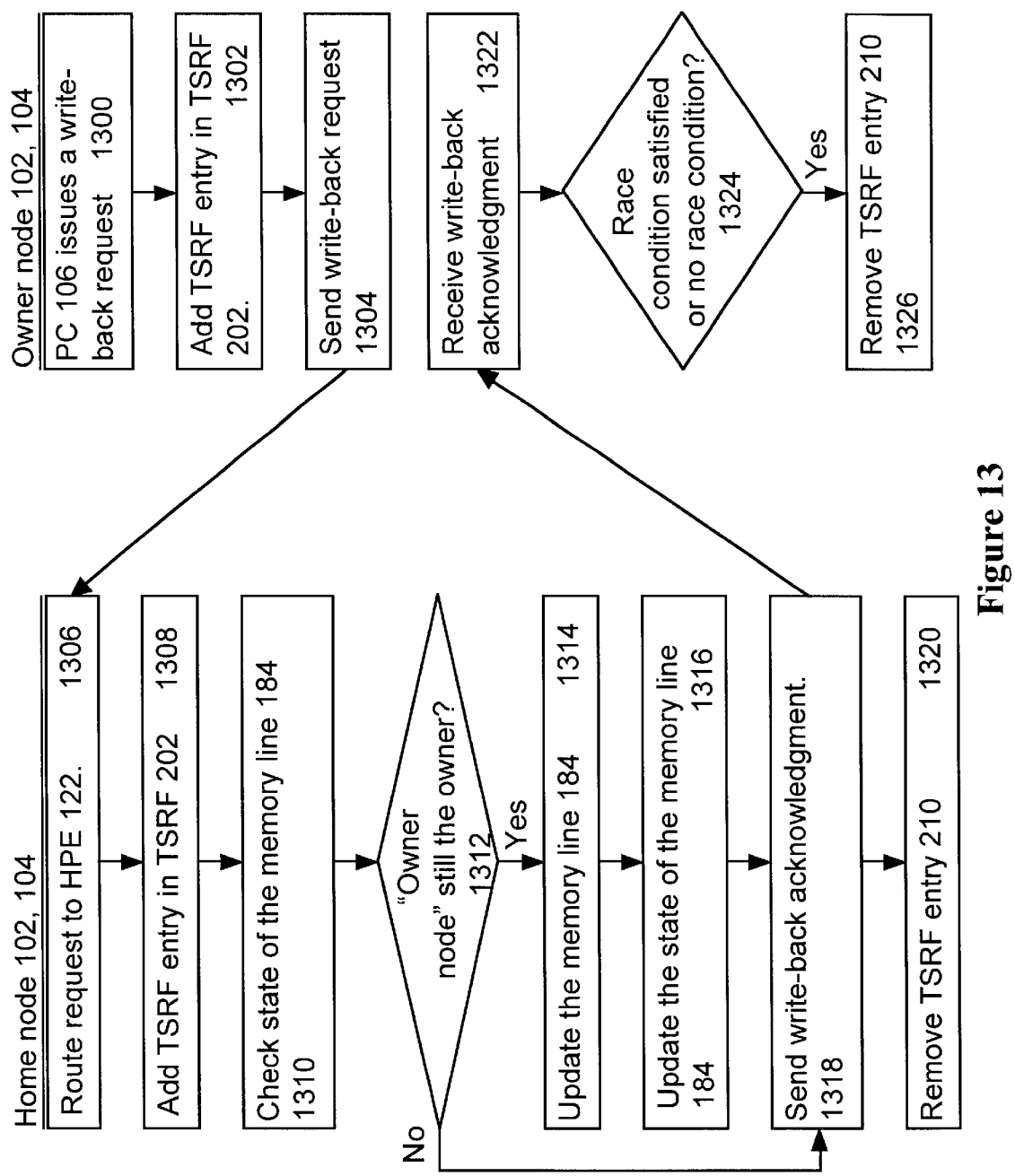
FIG. 13 illustrates the exchange of protocol messages in the course of completing a write-back request.

FIG. 13 illustrates steps taken to support a write-back request protocol message. A write-back request is initiated by a PC 106 when, for example, space is needed in the caches 110, 114 (step 1300). As an exception to the general rule described above, the write-back request is a high-priority protocol message. This exception is required because of a potential for the race condition described below.

The request is routed to the RPE 124, which responds by adding an entry 210 in the TSRF 202 (step 1302) and sending a write-back request to the home node 102, 104 (step 1304). The entry 210 indicates that a write-back acknowledgment is required to advance the memory transaction to a next state. Additionally, the RPE 124 maintains the memory line of information 184 until the write-back acknowledgment is received and, if necessary, a forwarded request is received. If a forwarded request is received (e.g., read forward), it is handled as described above; however, the RPE 124 updates the state of the TSRF entry 210 to indicate that the forwarded request was received.

Upon being received at the home node 102, 104, the write-back request is routed to the HPE 122 (step 1306) of the home node, which responds by adding an entry 210 in the TSRF 202 (step 1308). HPE 122 responds by checking the state of the memory line (step 1310). In particular, the HPE 122 determines if the directory entry 182 corresponding to the memory line of information still indicates that the "owner" node 102, 104 is the owner of the memory line of information 184. If so (step 1312-Yes), the HPE 122 updates the memory line of information 184 in the memory subsystem 123 (step 1314) and the state of the associated directory entry to indicate that the memory line of information 184 is no longer shared or owned by the former owner node 102, 104 (step 1316). HPE 122 then sends a write-back acknowledgment to the former owner node 102, 104 indicating that the memory transaction was successful (step 1318). The HPE then removes the TSRF entry 210 related to this memory transaction (step 1320).

If the directory entry 182 corresponding to the memory line of information does not indicate that the "owner" node 102, 104 is the owner of the memory line of information 184 (step 1312-No), HPE 122 sends a write-back acknowledgment to the former owner node 102, 104 indicating that the write-back request was stale (i.e., that the memory transaction was not successful) (step 1318). More specifically, the write-back acknowledgment indicates that the home node 102, 104 forwarded a request related to the memory line of information 184 to the former owner node 102, 104 before receiving the write-back request. The HPE then removes the TSRF entry 210 related to this memory transaction (step 1320).

Upon receiving the write-back acknowledgment (step 1324), the RPE 124 of the former owner node determines if a race condition exists and whether it has been satisfied. As noted above, the write-back acknowledgment will indicate whether a race condition exists (i.e., whether the home node has forwarded a request related to the memory line that is the subject of the write-back request). The TSRF entry 210 in the RPE of the former owner node will indicate if the forwarded request has already been received and processed by the former owner node 102, 104. If so, the RPE 124 removes the TSRF entry 210 for the memory transaction (step 1326). If not, the RPE 124 updates the state of the TSRF entry 210 to indicate that the forwarded request is required in order to advance the state of the memory transaction to a final state, and thus remove the TSRF entry 210.

Limited Fanout Daisy-chaining Invalidation Requests

In the above described embodiments, the home node 102, 104 always sends invalidation requests to sharer nodes 102, 104 individually. Each sharer node 102, 104 then sends an invalidation acknowledgment to the requesting node 102, 104. Accordingly, the maximum number of invalidation requests and invalidation acknowledgments is entirely dependent upon the number of nodes 102, 104 sharing a given memory line of information 184 and bound only by the number of nodes 102, 104 in the multiprocessor system 100. To reduce the number of protocol messages (e.g., invalidation requests and invalidation acknowledgments) active at any given moment, the invention configures directory entries (see FIG. 4 and the above discussion of the directory data structure 180) using the above described limited-pointer format and coarse-vector format, and furthermore employs a limited fanout, daisy-chaining invalidation methodology that ensures that no more than a specified number of invalidation requests and invalidation acknowledgments are active at any given moment, which avoids deadlocks.

The maximum number of invalidation requests and acknowledgments, resulting from a request for exclusive ownership of a particular memory line, that are active at any given moment is herein called the maximum fanout. In the preferred embodiments, the maximum fanout is a number between four and ten. The protocol engines of the present invention are configured to ensure that the number of invalidation requests and/or acknowledgments simultaneously active in a system as a resulting of a single a request for exclusive ownership of a particular memory line never exceeds the maximum fanout.

In preferred embodiments, the maximum number of invalidation requests and invalidation acknowledgments is set to four. Thus, the sharer-information field 188 of each directory entry 182 (FIG. 4) is configured to identify a maximum of DP (e.g. four) nodes when using the limited-pointer format. Similarly, the bits (e.g., 40-bits) of the sharer-information field 188 are grouped into DP (e.g., four) groups (e.g., 10-bit groups) when in the coarse-vector format. While the operation of the invention will be described with respect to an embodiment in which the sharer-information field 188 contains four groups of 10-bits for a total of 40 bits, in other embodiments the total number of bits in the sharer-information field, the number of groups of bits, and the number of bits per group, may vary substantially from those used in the preferred embodiment.

As described in more detail below, the home node 102, 104 sends at most one invalidation request for each of the four 10 bit groups. In particular, the home node sends an invalidation request to the first node, if any, identified as being a potential sharer by each 10-bit group within the sharer-information field. Thus, a home node 102, 104 sends at most four invalidation request messages to other nodes. Further, a subsequent set of invalidation request messages, if needed, are sent by the nodes that receive the initial invalidation request messages, this time to the second node, if any, identified as being a potential sharer by each respective 10-bit group within the sharer-information field. This process is repeated by each node receiving an invalidation request until the last node identified as being a potential sharer by each respective 10-bit group within the sharer-information field has received an invalidation request. Only the last identified node for each respective 10-bit group sends an invalidation acknowledgment to the requesting node 102, 104. Using this limited fanout, daisy chaining-like methodology, the maximum number of invalidation request messages and invalidation acknowledgment messages that are active at any one time as the result of a request for exclusive ownership of a particular memory line never exceeds four, which is the maximum fanout in a preferred embodiment. In other preferred embodiment, the maximum fanout varies from four to ten.

In some embodiments of the present invention, the bits are grouped, for example, as follows: the first 10-bits, the second 10-bits, the third 10-bits, and the fourth 10-bits of a 40-bit sharer-information field 188 are groups 1–4 respectively. But in preferred embodiments of the invention, the bits within each group are interleaved. Specifically, in the preferred embodiment, the bits (and table 189 columns) 0, 4, 8, 12, 16, 20, 24, 28, 32, and 36 form one group; bits (and table 189 columns) 1, 5, 9, 13, 17, 21, 25, 29, 33, and 37 form a second group; bits (and table 189 columns) 2, 6, 10, 14, 18, 22, 26, 30, 34, and 38 form a third group; bits (and table 189 columns) 3, 7, 11, 15, 19, 23, 27, 31, 35, and 39 form a fourth group.

Though group identifiers (e.g., first group, second group, etc.) are not required for a node 102, 104 to determine which group it is in (since each node 102, 104 has access to its identifier) the number of bit groups and the number of bits in the sharer-information field 188 are required to establish the bit membership of each group (i.e., to determine the position of the bits of a given group within the sharer-information field 188) or equivalently, to establish the identity of a first node 102, 104 associated with each bit and additional nodes 102, 104 associated with each bit of a given group.

Figure 14A:
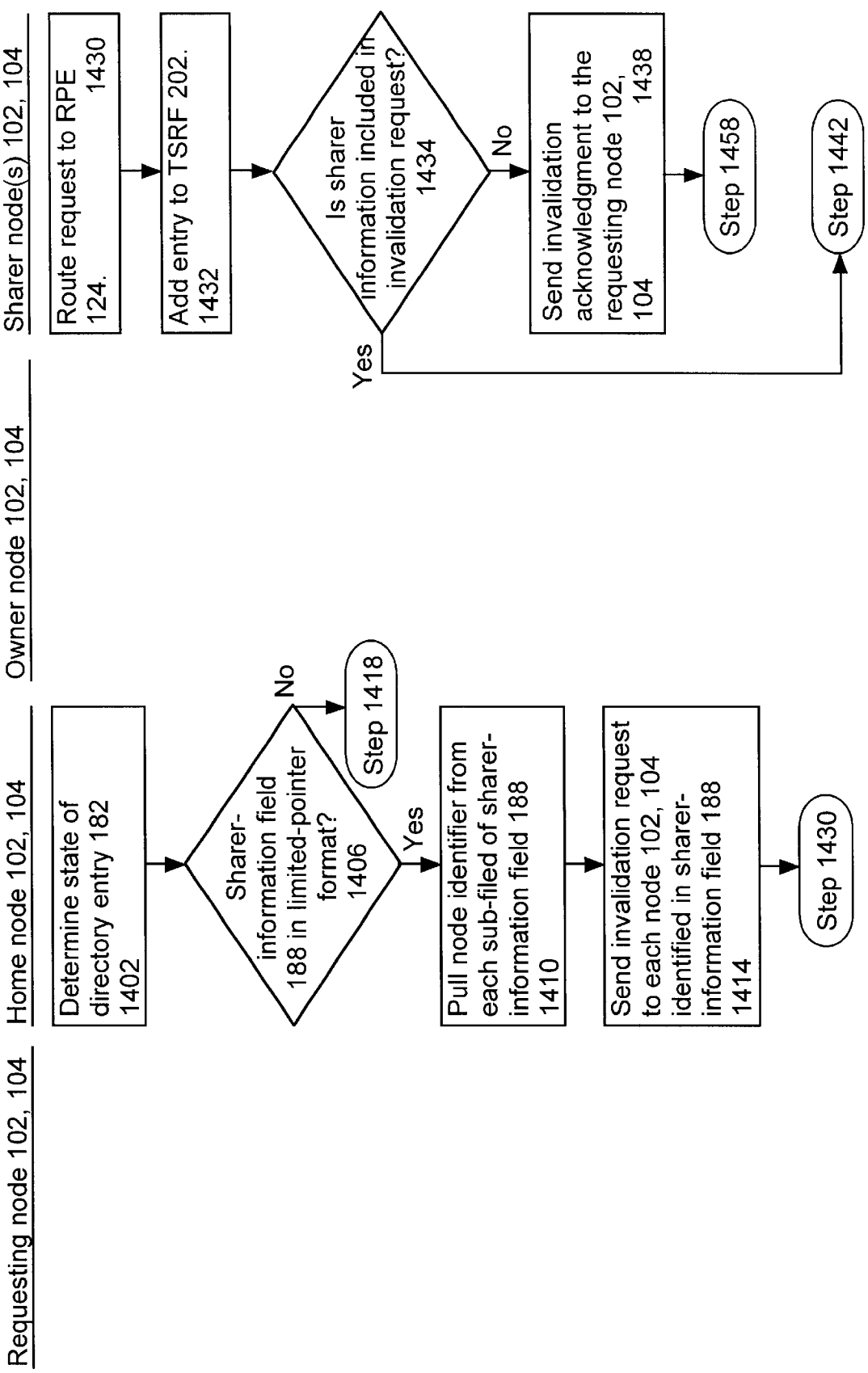
FIGS. 14A and 14B illustrate the exchange of protocol messages in the course of executing an invalidation request when nodes are represented in a limited-pointer format or a coarse-vector format.
Figure 14B:
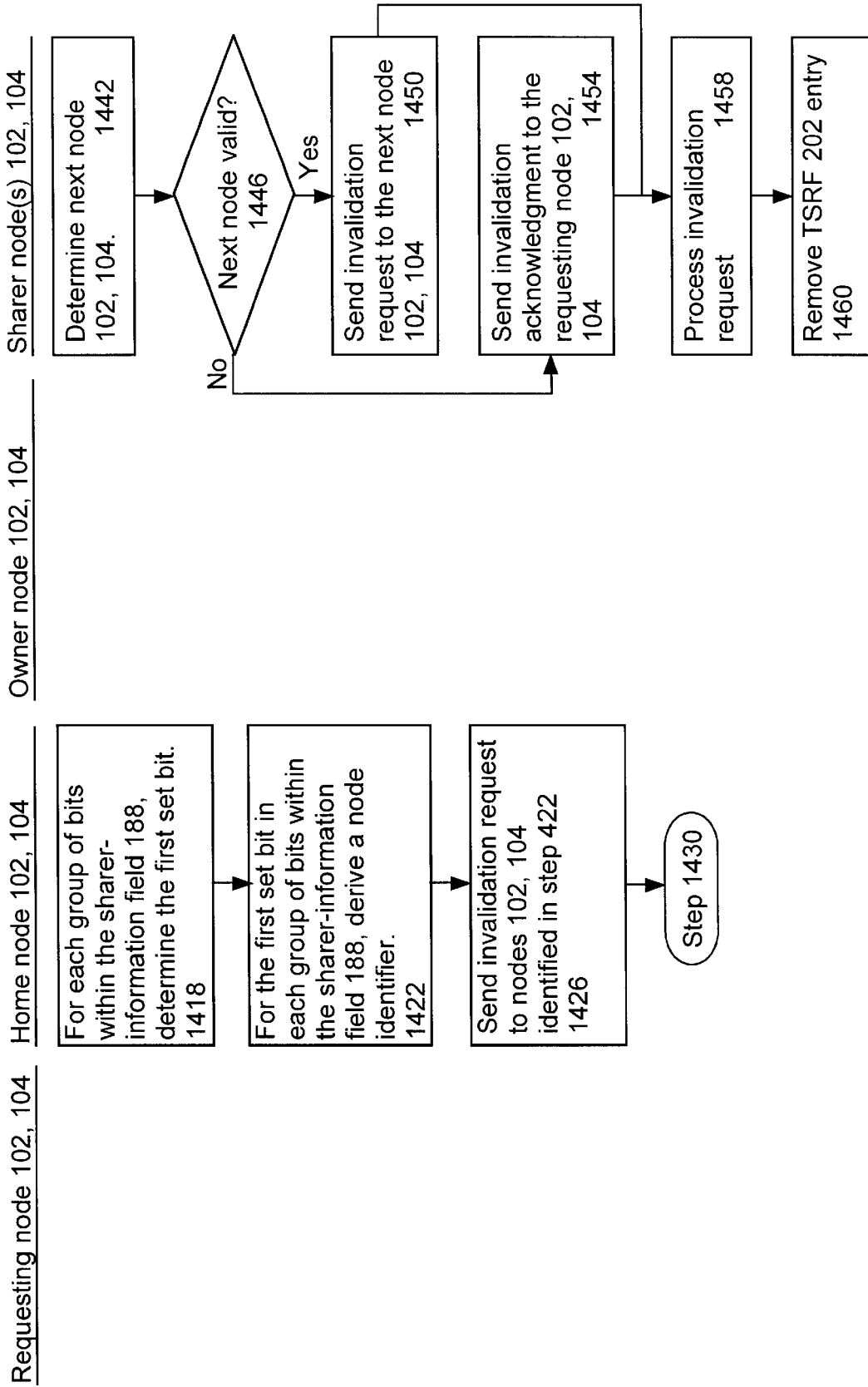

This aspect of the invention is now described in greater detail with reference to FIGS. 14A and 14B. The steps taken by the home node 102, 104 before and after an invalidation request is sent to a sharer node 102, 104 as described above are not changed in this embodiment of the invention.

In a first step, the home node 102, 104 determines the state of a given memory line of information 184 by reference to a corresponding directory entry 180 (step 1402). As described above, each directory entry 180 includes a state field 186, which is preferably set to one of four values—including invalid, exclusive, shared, and shared-cv. Accordingly, this determination is made by reference to the state field 186. If the state field 186 is set to shared, the format of the sharer-information field 188 is the limited-pointer format. If, however, the state field is set to shared-cv, the format of the sharer-information field 188 is the coarse-vector format.

If the state field 186 indicates that the sharer-information field 188 is in the limited-pointer format (step 1406-Yes), the home protocol engine 122 extracts the node identifiers directly from each of the four sub-fields of the sharer-information field 188 (step 1410). The node identifier in each sub-field is valid if it is not the predefined null identifier. As noted above, in preferred embodiments the null identifier value is zero. The home protocol engine 122 then sends an invalidation request to each node 102, 104 identified in the sharer-information field 188 as a sharer node 102, 104 (step 1414).

If, however, the state field 186 indicates that the sharer-information field 188 is in the coarse-vector format (step 1406-No), the home protocol engine 122 identifies for each group of bits within the sharer-information field 188 the first set bit (step 1418). Note that it is possible that one or more the groups may have no bits that are set.

Once the first set bit, if any, in each group of bits is identified, the home protocol engine 122 identifies the first node 102, 104 that corresponds to each of the identified first-set-bits using the techniques described above (step 1422). The above described techniques are extended somewhat in preferred embodiments however. If the first node 102, 104 that corresponds to a given identified first-set-bit is the requesting node or the home node, the home protocol engine 122 identifies the second node 102, 104 that corresponds to the identified first-set-bit. This step is repeated until a node 102, 104 that is neither the home node nor the requesting node is identified. If it is determined that none of the set bits in the group correspond to a node other than the home node and requesting node, an invalidation request is not sent by the home node for this particular group of bits in the sharer-information field 188. In alternative embodiments, this step is not taken by the home node 102, 104. Instead, the HPE 122 of the home node and the RPE 124 of the requesting node are configured to process these messages as described above without ever responsively invalidating the memory line of information 184.

Once one or more nodes 102, 104 are identified (i.e., up to one node per group of bits in the sharer-information field of the directory entry), the home protocol engine 122 sends an invalidation request to each of the identified nodes 102, 104 (step 1426). Included each invalidation request is a sharer group field containing the 10-bit group of bits associated with the designated recipient of a given invalidation request and possibly an identifier of the 10-bit group. (The sharer group field is not included in an invalidation request if the sharer-information field 188 is not in the coarse-vector format.) This sharer group field is required because the sharer nodes do not maintain information about the nodes 102, 104 that share a given memory line of information 184. The 10-bit group of sharer information that is sent along with the invalidation request permits each node that receives the invalidation request to identify the next node 102, 104 to receive an invalidation request as described above or to determine that there is no next node 102, 104 (i.e., that an invalidation acknowledgment should be sent to the requesting node 102, 104).

Additionally, the group identifier of the 10-bit group permits the sharer node 102, 104 to identify the position of each bit within the 10-bit group in the sharer-information field 188, which also permits the sharer node 102, 104 to identify the next node 102, 104 (if any) to receive the invalidation request, as described above, or to determine that there is no next node 102, 104. In an alternate embodiment, the group identifier is not included in the invalidation request and instead the protocol engines in each node are programmed to know the sharer group in which each such node resides. Since all the invalidation requests received by any particular node would always have the same sharer group identifier, the sharer group identifier is not strictly needed.

Upon receiving an invalidation request (step 1430) and adding a related entry 210 in the TSRF 202 (step 1432), a sharer node 102, 104 determines a next node, if any, by analyzing the sharer group field of the invalidation request. If all of the bits of the sharer group field are set to zero, there is no sharer information in the request (1434-No) and therefore there is no next node to which to send the invalidation request. Instead, the remote protocol engine 124 in the sharer node 102, 104 sends an invalidation acknowledgment to the requesting node (step 1438). The sharer-node then processes the invalidation request as described above with reference to step 1238 (step 1458).

If the sharer group field in the received invalidation request includes any set bits (i.e., includes sharer information) (step 1434-Yes), the remote protocol engine 124 in the sharer node 102, 104 determines the next node, if any, to receive an invalidation request (step 1442). The remote protocol engine in the sharer node identifies the next node by first determining the bit in the sharer group field that corresponds to the node identifier of the sharer node, and then determining if there is a next node (e.g., with a higher node identifier) that (A) also corresponds to that same bit of the sharer group field, and (B) is neither the home node (which is identified by the address of the memory line to be invalidated) nor the requesting node (which is identified by a requesting node field in the invalidation request). If not, the remote protocol engine looks for a next set bit (if any) in the sharer group field and determines if that next set bit corresponds to a node 102, 104 that is neither the home node 102, 104 nor the requesting node 102, 104. This process continues, processing the bits of the sharer group field in a predetermined order (e.g., from left to right) until the remote protocol engine either identifies a next node, or determines that there is no next node.

If a valid next node 102, 104 is identified (step 1446-Yes), the sharer node 102, 104 sends an invalidation request to the next node (step 1450). The sharer node 102, 104 includes in this invalidation request the same 10-bit sharer group field (and possibly a group identifier) that was included in the invalidation request received by the sharer node 102, 104. The sharer node 102, 104 then processes the invalidation request as described above with reference to step 1238 (step 1458). The sharer node 102, 104 then removes the related entry 210 from the TSRF 202 (step 1460).

If, a valid next node is not identified (step 1446-No), this means that the sharer node is the last node in the invalidation request daisy chain. In this case the sharer node sends an invalidation acknowledgment to the requesting node (step 1454). The sharer node then processes the invalidation request as described above with reference to step 1238 (step 1458). The sharer node 102, 104 then removes the related entry 210 from the TSRF 202 (step 1460).

Because each of the bits of the sharer group field may be associated with more than one nodes, the remote protocol engines in the nodes of the system are unable to determine which of the associated nodes (other than itself) are actually sharer nodes. When a node receives an invalidation request for a memory line of information 184 that it does not share, the node nevertheless sends an invalidation request (step 1450) or acknowledgment (step 1454) as described above. However, the processing of the received invalidation request at step 1458 comprises determining that the node is not a sharer of the specified memory line, and therefore no cache lines in the node are invalidated in response to the received invalidation request.

In other preferred embodiments, the bits of the sharer information field of the directory entries are divided into a larger number of groups of bits (e.g., four to ten groups). The number of such groups of bits corresponds to the maximum fanout of the daisy chained invalidation messages in these embodiments.

Efficient Processing of Interleaved Memory Transactions in a Multiprocessor System For the sake of simplicity, the description that follows focuses on activities associated with even clock cycles. Further, steps taken with respect to even clock cycles and the hardware that enables such steps is duplicated for activities associated with odd clock cycles.

As indicated above, the scheduler 212 attempts to schedule a memory transaction for execution during every even clock cycle. To do this, the scheduler 212 buffers in the microcode address latch 246 an instruction address associated with the scheduled memory transaction. But before a memory transaction is scheduled, the scheduler 212 identifies a number of instruction addresses and determines whether corresponding instructions can be executed during the following even clock cycle. In particular, the scheduler 212 identifies an instruction address associated with a running memory transaction, if there is one, and determines whether the corresponding instruction can be executed in the following even clock cycle. The scheduler 212 also identifies an instruction address associated with an active memory transaction, if any, in the even side of the TSRF 202. In this case, if such a memory transaction is identified, the corresponding instruction can be executed in the following even clock cycle. Additionally, the scheduler 212 identifies an instruction address associated with a message, if there is one, from an input source (i.e., an input buffer 192, the PS 132, or the ICS 112) and determines whether the corresponding instruction can be executed in the following even clock cycle. Whether the message comes from an input buffer 192, the PS 132, or the ICS 112 is determined in a previous clock cycle as described in more detail below.

After making the identifications and determinations described in the preceding paragraph, the scheduler 212 selects one of the instruction addresses (i.e., schedules an associated memory transaction) according to the following prioritization scheme: 1) a running memory transaction (highest priority); 2) an active memory transaction from the TSRF 202 (second highest priority); and then 3) a message from the input source (lowest priority). More specifically, the scheduler 212 schedules a running memory transaction if an instruction corresponding to the identified instruction address can be executed in the following (even) clock cycle. More specifically, if 1) there is no running memory transaction, or 2) the running memory transaction terminates, or 3) the running memory transaction enters a waiting state (i.e., Waiting or Local_Waiting); and 4) there is an active memory transaction in the even side of the TSRF 202, the scheduler 212 schedules the active memory transaction. Further, if 1) there is no running memory transaction, or 2) the running memory transaction terminates, or 3) the running memory transaction enters a waiting state; and 4) there are no active memory transactions in the even side the TSRF 202, then the scheduler 212 schedules a memory transaction associated with the message, if there is one, from an input source.

As noted above, the scheduler 212 selects a message from an input source. And as indicated above, messages stored in an input buffer 192 originate from either the ICS 112 or the PS 132 (see FIG. 1). The spectrum of messages includes, therefore, buffered (i.e., stored in an input buffer 192 of the protocol engine, FIG. 5) and unbuffered (i.e., taken directly from the ICS 112 or the PS 132) high priority messages, buffered and unbuffered low priority messages, and buffered and unbuffered I/O messages from the ICS 112 and the PS 132. Two or more messages can be buffered at any one time and, therefore, the selection of such messages is prioritized, as illustrated in FIG. 15.

A high priority message from the ICS 112 is a message solicited by an existing memory transaction. If such a memory transaction is scheduled, contents of the message are merged with the memory transaction's entry 210 in the TSRF 202 and the merged memory transaction is subsequently executed.

A high priority message from the PS 132 may or may not have been solicited by a memory transaction with an entry 210 in the TSRF 202. This type of high priority message can be merged with an existing memory transaction, be the basis of a new memory transaction, or left in an input buffer 192 for subsequent processing. If the scheduler 212 schedules a memory transaction corresponding to this type of message, therefore, the scheduler 212 takes steps consistent with any of these scenarios, as described next.

The scheduler 212 scans the TSRF 202 for an entry 210 corresponding to a memory transaction in a waiting state that concerns the same memory line as the message (i.e., a matching, waiting memory transaction for the message). If such an entry 210 is found, the scheduler 212 1) stores the TSRF entry ID of this entry 210; 2) sets the state of this entry 210 to active; and 3) squashes execution of an erroneously scheduled new memory transaction (as described in the following paragraph). The scheduler 212 will subsequently schedule the now active memory transaction. But if a corresponding TSRF entry 210 is not found, no further steps are taken with respect to merging the high priority message from the PS with an existing memory transaction.

In case the high priority message is to be the basis of a new memory transaction, the scheduler 212 schedules a new memory transaction corresponding to the message and allocates an entry 210 in the TSRF 202 to the new memory transaction (i.e., creates the new memory transaction). The scheduler 212 also determines whether the new memory transaction conflicts with any existing memory transaction. But because of the amount of time it takes to makes this determination, the scheduler 212 speculates that the new memory transaction will not conflict with any existing memory transaction and schedules the new memory transaction for execution. If the scheduler 212 does not speculate correctly (i.e., the new memory transaction conflicts with an existing memory transaction), the scheduler 212 subsequently squashes execution of the new memory transaction. Further, if the message was speculatively selected from the PS 132, the scheduler 212 also transfers the contents of the message into a control buffer (i.e., an input buffer 192).

A low priority message from the PS 132 or the ICS 112 or an I/O message from the PS 132 is always an unsolicited message. If a new memory transaction corresponding to such a message is to be scheduled, the scheduler 212 first determines whether the new memory transaction conflicts with any existing memory transactions (i.e., any entries 210 in the TSRF 202). Because of the amount of time it takes to make this determination, however, the scheduler 212 speculates that the new memory transaction does not conflict with any existing memory transaction and schedules the new memory transaction for execution. As a result, the scheduler 212 also allocates an entry 210 in the TSRF 202 to the memory transaction associated with the message (i.e., creates the new memory transaction). If, however, the new memory transaction conflicts with any existing memory transaction, the scheduler 212 squashes execution of the new memory transaction and sets the state of the new memory transaction to "Suspended." If the new memory transaction does not conflict with any existing memory transaction, the scheduler 212 sets the state of the new memory transaction to Active and executes the new memory transaction as scheduled.

As noted above, the scheduler 212 identifies an instruction address associated with a message from an input buffer 192, the ICS 112, or the PS 132. In other words, the scheduler selects a message from an input source for processing. If a memory transaction associated with this message is not scheduled (a scenario that can occur for a variety of reasons as described above), the scheduler 212 continues processing this message, but not to execute an associated memory transaction. Instead, the scheduler 212 processes the message only to create a new memory transaction or to merge the message with a matching, waiting memory transaction. Such memory transactions are subsequently processed as entries 210 from the TSRF 202, instead of as messages from an input source, in an unrelated action.

Furthermore, in preferred embodiments of the present invention, the scheduler 212 selects messages associated with even clock cycles from an input source for processing during even clock cycles (instead of odd clock cycles as is the case above) or activates a suspended memory transaction. If the former action is taken, a memory transaction associated with the message is not a candidate for scheduling. Instead, the scheduler 212 processes the message only to create a new memory transaction or to merge the message with a matching, waiting memory transaction. Such memory transactions are subsequently processed as entries 210 from the TSRF 202, instead of as messages from an input source, in an unrelated action. The later action (activating a suspended memory transaction), which is taken if a running memory transaction terminates, includes setting the state of a suspended memory transaction that corresponds to the same memory line of information as the terminated memory transaction to Active.

Figure 16:
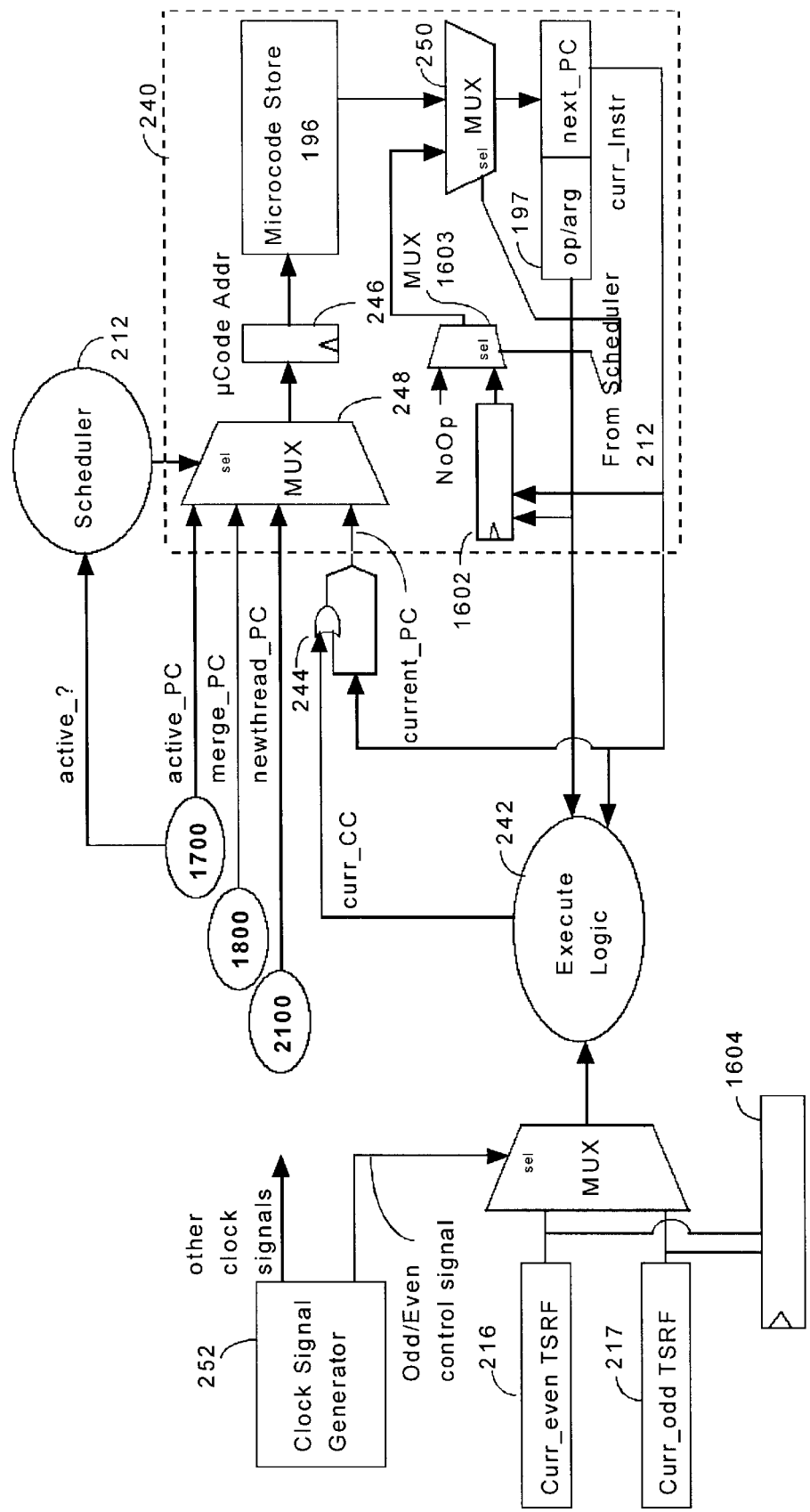
FIG. 16 is a block diagram of a portion the execution logic of the protocol engine of FIG. 5.

Attention now turns to a more detailed description of hardware that enables the above described operations in a preferred embodiment of the present invention. FIG. 16 is a more detailed version of FIG. 8. In particular, FIG. 16 illustrates additional inputs to multiplexer 248. See the discussion above with reference to FIG. 8 for an explanation of the multiplexer 248 input "current_PC," shown emanating from the execute logic 242. The new inputs to MUX 248 include the "newthread_PC" signal, the "merge_PC" signal, and the "active_PC" signal. Each of these "PC" signals is a microcode address, corresponding to a microcode instruction in the microcode store 196. These signals emanate from circuitry represented by the ovals marked 2100, 1800, and 1700 respectively. This circuitry is illustrated separately from the scheduler 212, but for the most part comprises a portion of the scheduler 212, as well as other parts of the protocol engine. Additionally, where data or control signals are shown emanating from the circuitry represented by the ovals marked 2100, 1800, and 1700 and connecting to the scheduler 212, the data or control signals are conveyed between specifically illustrated elements and other elements of the scheduler 212.

Also new in FIG. 16 is a first latch 1602, a 2-to-1 multiplexer (MUX) 1603, and a second latch 1604. As illustrated in FIG. 16, contents of the current instruction buffer 197 are copied into the first latch 1602 via the data lines connecting the current instruction buffer 197 to the execute logic 242. The output of the first latch 1602 is connected as data input to the multiplexer 1603. Also connected as data input to the multiplexer 1603 is a no-operation code ("no op"). The selection input of the multiplexer 1603 is a signal from the scheduler 212. As mentioned above, certain instructions must be re-executed by the execute logic 242. To facilitate this process, a given instruction is first copied into the first latch 1602, and then copied back into the current instruction buffer 197 through multiplexer 1603 and the other 2-to-1 multiplexer 250 illustrated in FIG. 16. Also, as described more fully below, the execution of certain instructions (i.e., memory transactions) must be squashed, i.e., terminated. To accomplish this task, the scheduler 212 copies the no-operation code into the current instruction buffer 197 through multiplexers 1603 and 250 (FIG. 16).

The second latch 1604 stores a memory line address extracted from either of a pair of latches 216, 217 that store the information for even and odd memory transactions respectively. As described more fully below, the memory line address is copied into the second latch 1604 when a memory transaction terminates. The memory line address is then used to identify and activate a suspended memory transaction corresponding to this memory line address.

Figure 17:
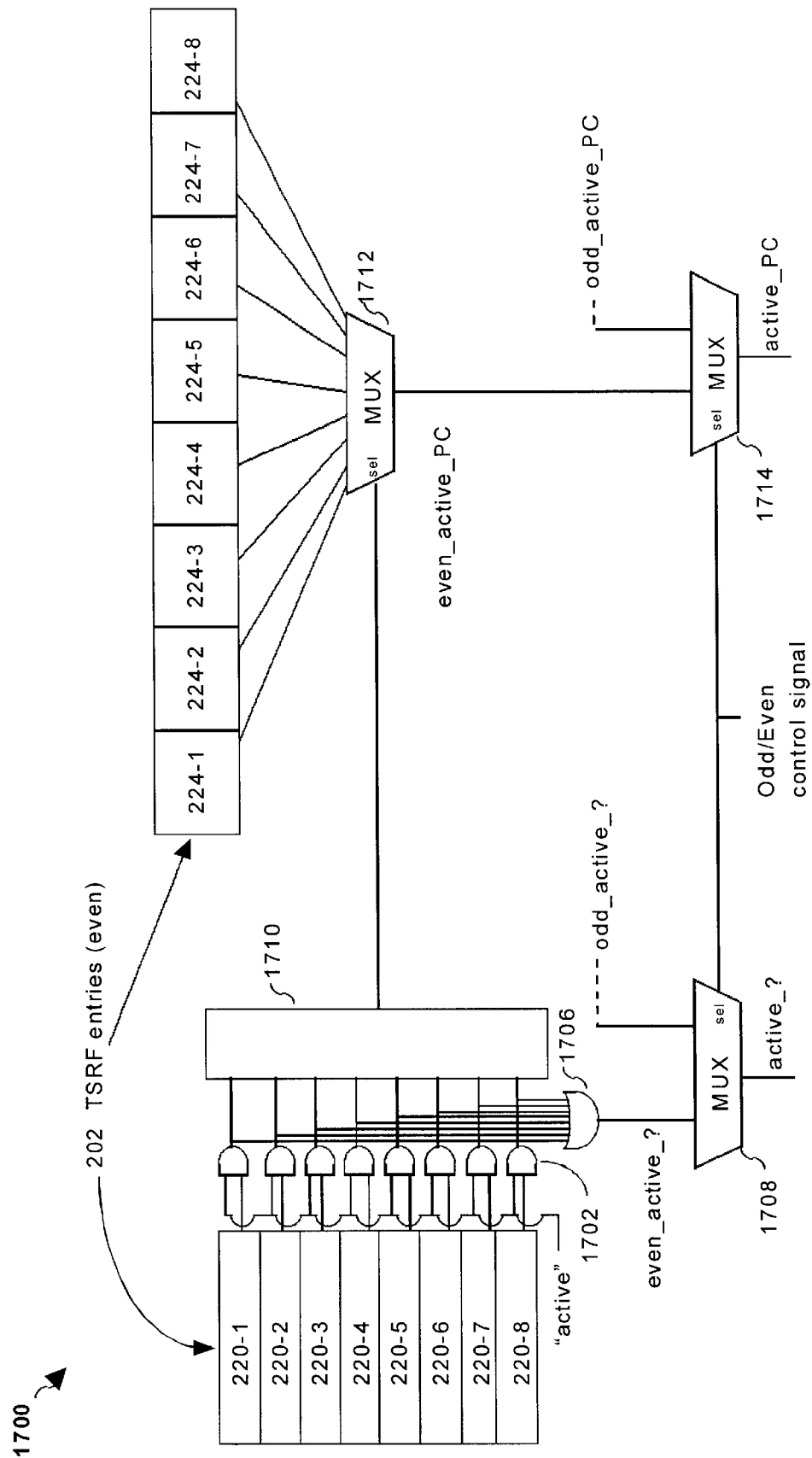
FIGS. 17–19 and 21–24 are block diagrams of a portion of a scheduler that comprises a portion of the protocol engine of FIG. 5.
Figure 22:
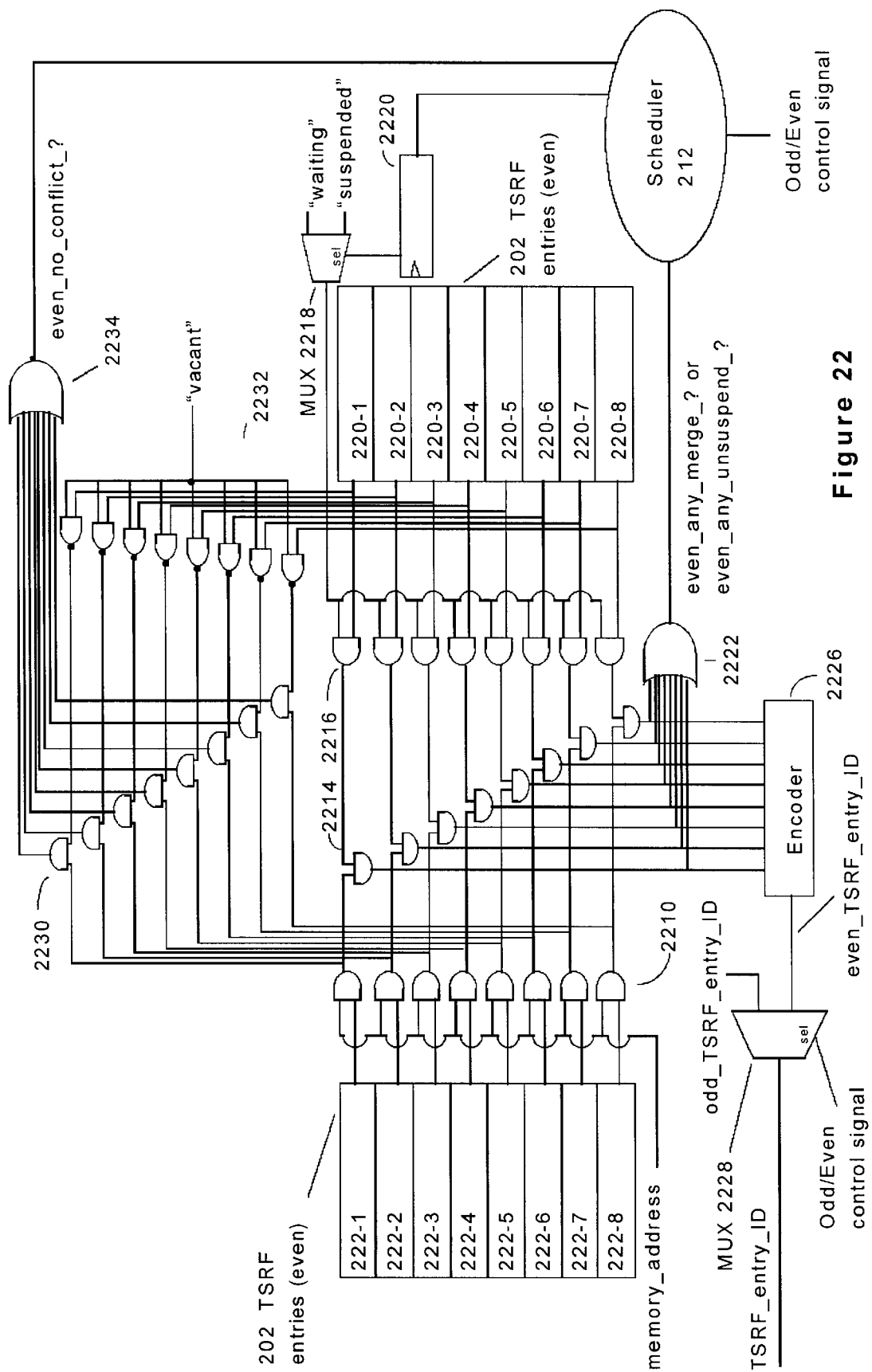
Figure 23:
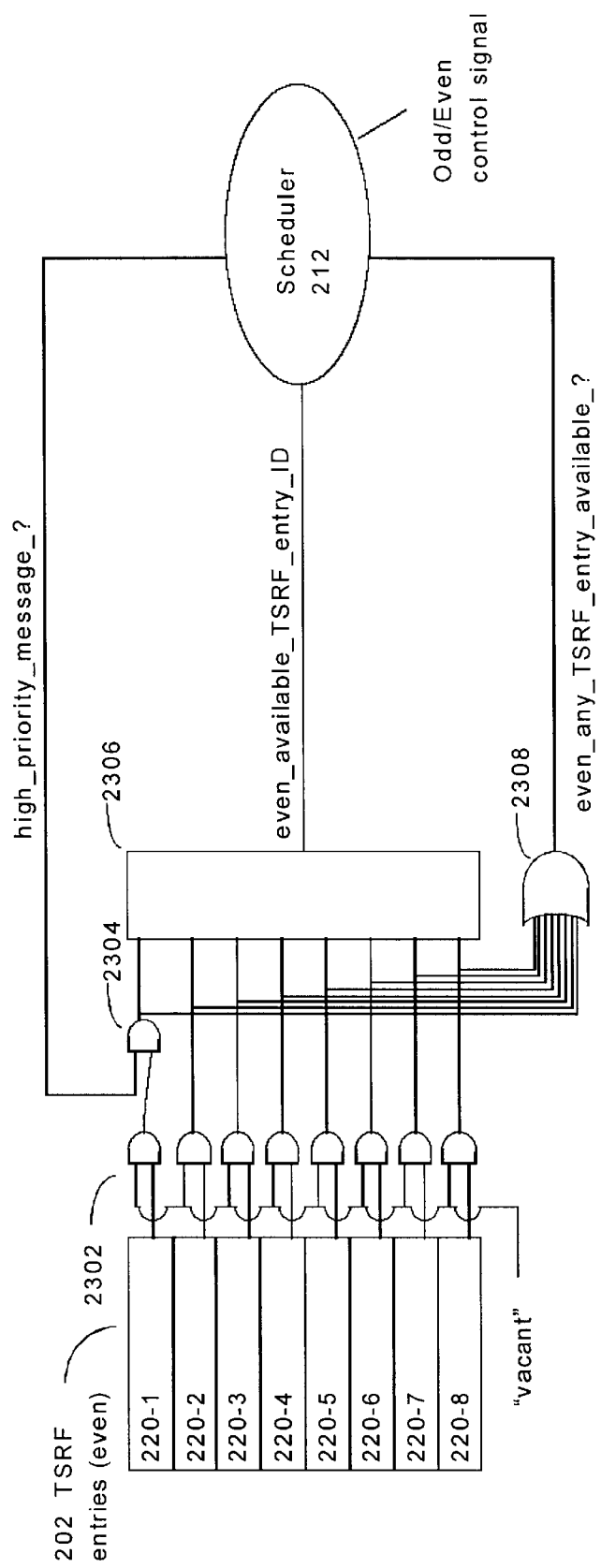

As illustrated in FIG. 17, the circuitry represented by the oval marked 1700 in FIG. 16 includes the TSRF 202, a series of AND gates 1702, an OR gate 1706, a first 2-to-1 multiplexer 1708, an encoder 1710, an eight-to-one multiplexer 1712, and a second 2-to-1 multiplexer 1714. Also shown in FIG. 17 is the Odd/Even control signal, which emanates from clock signal generator 252 as illustrated in FIGS. 8 and 16. Note that FIGS. 16–19 and 21–24 illustrate plurality of logic gates (e.g., the series of AND gates 1702). These logic gates are conceptualized illustrations of the hardware in a preferred embodiment of the present invention. The actual hardware implementation may, therefore, be different without departing from the scope of the present invention. For example, the AND gates illustrated in FIGS. 17, 22, and 23 are preferably implemented with XOR-NOT gates.

The circuitry of FIG. 17 attempts to identify an active memory transaction. More specifically, the output of this circuitry is the active_? control signal and the active_PC data signal. The active_? control signal indicates whether an active memory transaction has been identified. The active_PC data signal carries the contents of the "next PC" (next program counter) field 224 of an entry 210 in the TSRF 202 corresponding to an active memory transaction.

In more detail now, data lines connect each of the state fields 220 of the even entries 210 in the TSRF 202 as data inputs to a separate AND gate from the series of AND gates 1702. Further, an Active state designation is also connected as another data input to each of the AND gates in the series of AND gates 1702. As a result, the output of a given AND gate from the series of AND gates 1702 is high only if the state of a corresponding state field 220 (i.e., memory transaction) is set to Active. Each output signal from the series of AND gates 1702 is connected as data input to an OR gate 1706. The output of the OR gate 1706, therefore, is high if any of the state fields 220 of the eight even entries 210 in the TSRF 202 are set to Active. The output of the OR gate 1706 is, in turn, connected as data input to the first multiplexer 1708.

The output of the OR gate 1706 is called the "even_active_?" control signal. Recall that the state fields 220 illustrated in FIG. 17 are the state fields 220 of the "even" entries 210 in the TSRF 202. The Figures show that the TSRF 202 has eight even entries and eight odd entries, but clearly the number of entries in the TSRF 202 may vary from one implementation to another. The even_active_? control signal does not reflect the state of the odd entries 210 in the TSRF 202. Instead, duplicate circuitry (not shown, because it is a duplicate of the circuitry shown in FIG. 17) is used to obtain an odd_active_? control signal, which is also connected as data input to the first multiplexer 1708.

The output of the first multiplexer 1708 is the active_? control signal. To ensure that the active_? control signal is consistent with the current clock cycle, the Odd/Even control signal is used to select either the even_active_? control signal or the odd_active_? control signal.

Each output signal from the series of AND gates 1702 is also connected as data input to an encoder 1710. The encoder 1710 encodes the position of a high signal from the series of AND gates 1702 as a 3-bit binary signal that is connected as selection input to a multiplexer 1712. In preferred embodiments, the encoder 1710 encodes the identifier of an arbitrary high signal. In alternate embodiments, the encoder 1710 is configured to select the state field 220 that has been set to Active for the longest period of time. The "next PC" fields 224 of the even entries 210 in the TSRF 202 are connected as data inputs to the multiplexer 1712. As a result, the output of the multiplexer 1712 is the value of the "next PC" field 224 of an even entry 210 with a state field 220 set to Active.

The output of the multiplexer 1712 is labeled even_active_PC and is connected as data input to the second multiplexer 1714. The "next PC" fields 224 illustrated in FIG. 17 are from the even entries 210 in the TSRF 202. This even_active_PC data signal does not reflect the odd entries 210 in the TSRF 202. Instead, duplicate circuitry (not shown) is used to obtain an odd_active_PC data signal, which is also connected to another data input of the multiplexer 1708.

The output of the second multiplexer 1714 is the active_PC data signal. To ensure that the active_PC data signal is consistent with the current clock cycle, the Odd/Even control signal is used to select either the even_active_PC data signal or the odd_active_PC data signal.

Figure 18:
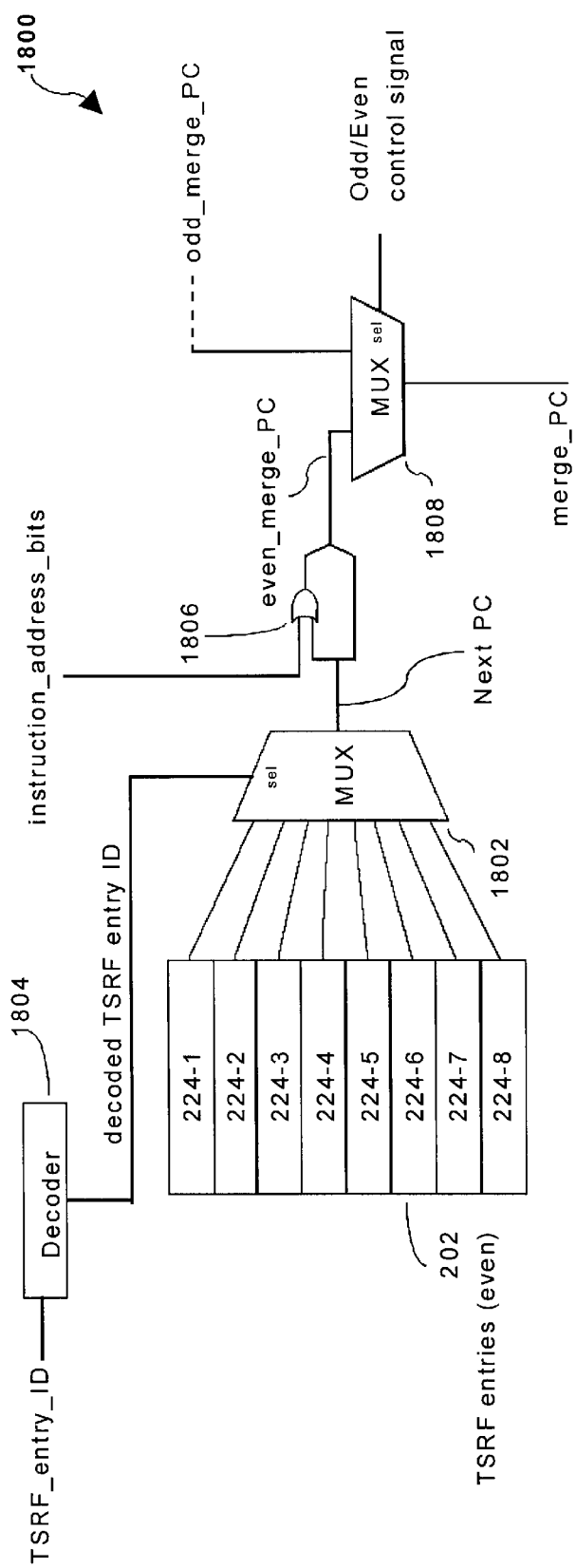

As illustrated in FIG. 18, the circuitry represented by the oval marked 1800 (in FIG. 16) includes the TSRF 202, a multiplexer 1802, a latch 1804, a two-input OR gate 1806, and a multiplexer 1808. This circuitry generates the merge_PC signal. As described above, TSRF entries 210 include a "next PC" field 224, which stores an instruction address. In certain situations, the precise instruction executed depends upon the content of a message. In these situations, the value of a corresponding "next PC" field 224 is merged with several bits (e.g., four bits) of a message type identifier included in the message. The result of this merger is a merged instruction address carried by the merge_PC signal. As illustrated in FIG. 16, the merge_PC signal is connected as a data input to the multiplexer 248. But the merge_PC signal is also connected to the even side of the TSRF 202 (connection not illustrated). The first connection facilitates the scheduling of a corresponding memory transaction during the same clock cycle in which the merged instruction address is generated. The second connection facilitates copying the merged instruction address into the address field 222 of an even TSRF entry 210 (i.e., the corresponding memory transaction) during the same clock cycle in which the merged instruction address is generated.

The circuitry illustrated in FIG. 18 is, moreover, used only in conjunction with high priority messages originating from the ICS 112 (buffered or unbuffered) or high priority messages from the PS 132 (always buffered) for which a TSRF entry ID has been determined.

In more detail now, the "next PC" field 224 of the even entries 210 in the TSRF 202 are connected as data inputs to the multiplexer 1802. A first TSRF_entry_ID signal is connected as data input to the decoder 1804, which produces a decoded TSRF entry ID that is connected as selection input to the multiplexer 1802. The value of a selected "next PC" field 224 of one of the even TSRF entries 210 is connected as data input to the multiplexer 1808 and the OR gate 1806. More specifically, the most significant 6-bits of the Next PC value, which comprises 10-bits, are connected as data input to the multiplexer 1808 and the least significant 4-bits of the Next PC value are connected as data input to the OR gate 1806. The least significant 4-bits are logically OR'd with 4-bits of the instruction_address_bits signal.

The result of this merger is also connected as data input to the multiplexer 1808. The even_merge_PC data signal comprises the result of the merger and the most significant 6-bits of the Next PC value. Also connected as data input to the multiplexer 1808 is an odd_merge_PC value. The circuitry used to produce this value is not illustrated in FIG. 18, but is preferably identical to the circuitry used to produce the even_merge_PC value, except that it is coupled to the odd TSRF entries of the TSRF 202. The Odd/Even control signal, which is produced by the clock signal generator 252, is connected as selection input to the multiplexer 1808 to select the even_merge_PC value on an even clock cycle and the odd_merge_PC value on an odd clock cycle. The output of the multiplexer 1808 is the merge_PC signal.

As described above, the scheduler 212 determines whether an instruction corresponding to the identified instruction address can be executed in a following even clock cycle. In the case of the instruction address carried by the merge_PC signal, the nature of the determination is preferably quite simple. Specifically, if the instruction address is extracted from a high priority message from the ICS 112, the scheduler 212 need not take any steps to make the determination. As noted above, all such messages include a TSRF entry ID. And as also noted above, the inclusion of the TSRF entry ID facilitates same-cycle merges, which means that the memory transaction associated with the instruction address carried by the merge_PC signal can be executed in the following even clock cycle. The same is true for high priority messages from the PS 132 stored in an input buffer 192 that include a TSRF entry ID. (But as noted above, high priority messages from the PS 132 are not received with a TSRF entry ID. Instead, the TSRF entry ID for these messages is determined, if at all, by the scheduler while processing the message.)

Figure 19:
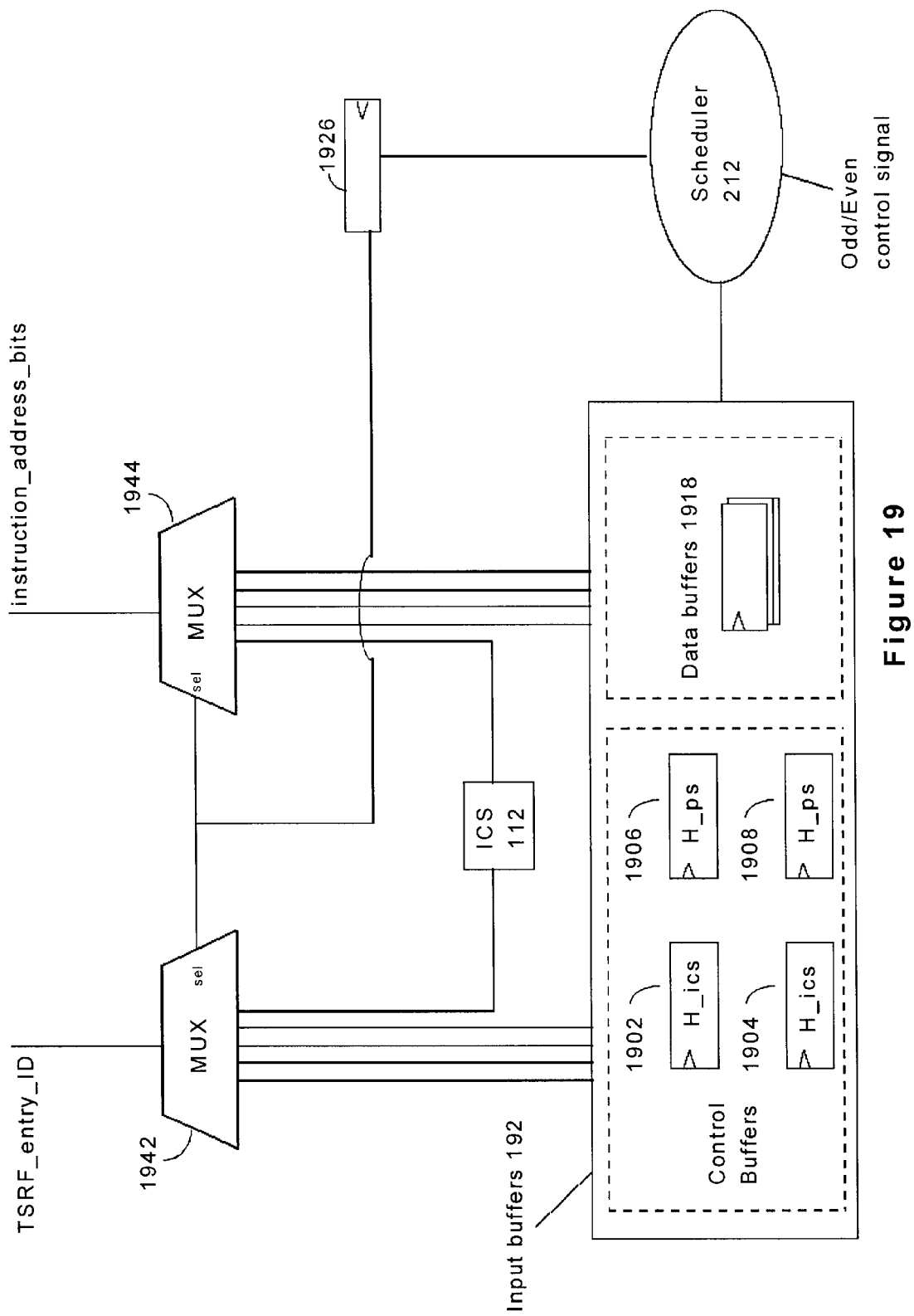

The first TSRF_entry_ID signal and the instruction_address_bits signal are generated by the circuitry illustrated in FIG. 19. This circuitry includes input buffers 192, a first latch 1926, the ICS 112, a first multiplexer 1942, and a second multiplexer 1944. More specifically, the scheduler 212 connects to each of the input buffers 192 illustrated in FIG. 19 to determine whether any of the input buffers 192 contain a message and to read or set the state of such a message. As illustrated in FIG. 19, the input buffers 192 include a plurality of control buffers, i.e., two H_ics buffers 1902, 1904 to store high priority messages originating from the ICS 112 and two H_ps buffers 1906, 1908 to store high priority messages originating from the PS 132. The input buffers 192 also include a plurality of data buffers 1918 to store data corresponding to, and received in conjunction with, messages stored in the control buffers.

As noted above, the scheduler 212 can read or set the state of a message in an input buffer 192. Preferred embodiments of the present invention include three states: invalid, valid, and valid_ID. The invalid state indicates that a valid message is not stored in a corresponding input buffer 192. The valid state indicates that a valid message without a TSRF entry ID is stored in a corresponding input buffer 192. And the valid_ID state indicates that a valid message with a TSRF entry ID is stored in a corresponding input buffer 192.

Because high priority messages from the ICS 112 always include a TSRF entry ID, the state of the H_ics buffers 1902, 1904 is either invalid or valid_ID. But because a buffered high priority messages from the PS 132 may or may not include a TSRF entry ID, the state of the H_ps buffers 1906, 1908 can be invalid, valid, or valid_ID.

The first TSRF_entry_ID signal and the instruction_address_bits signal are produced by the first multiplexer 1942 and the second multiplexer 1944, respectively. Moreover, these two signals are derived from the same message source (e.g., an input buffer 192), so the first latch 1926 provides simultaneous selection input to the first and second multiplexers 1942, 1944.

Input to the first and second multiplexers 1942, 1944 includes the ICS 112, the H_ics buffers 1902, 1904, and the H_ps buffers 1906, 1908. In other words, only message sources capable of producing messages with a TSRF entry ID are coupled to the data inputs of the first and second multiplexers 1942, 1944. As noted above, the first and second H_ics buffers 1902, 1904 always store messages with a TSRF entry ID. Additionally, an H_ps buffer 1906, 1908 can include a TSRF entry ID if it has been determined by the scheduler 212 and saved back to the H_ps buffer 1906, 1908. Further, a message from the ICS 112 can also include a TSRF entry ID. In particular, messages from the ICS 112 can be high priority messages that would otherwise be stored in an H_ics buffer. And although the PS 132 can provide high priority messages, the TSRF entry ID, if any, corresponding to such messages must be determined by the scheduler 212. The PS 132 is not, therefore, a viable source of unbuffered messages with a TSRF entry ID.

Figure 20:
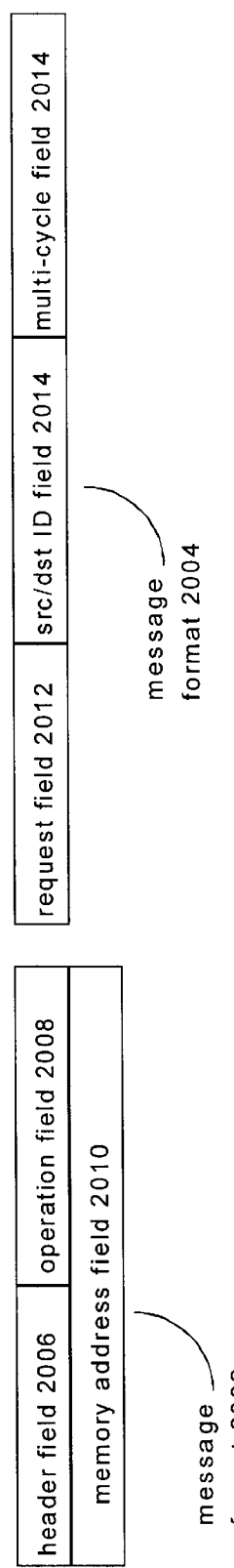
FIG. 20 illustrates two message formats.

In more detail now, the instruction_address_bits signal comprises 4-bits of a message type identifier included in messages processed by the protocol engine 122, 124. In preferred embodiments of the present invention, messages from the ICS 112 and the PS 132 have distinct message formats. In particular, FIG. 20 illustrates a first message format 2002 and a second message format 2004. Messages received through the PS 132 use the first message format 2002 whereas messages received through the ICS 112 use the second message format 2002.

The first message format 2002 includes a 32-bit header field 2006, a 32-bit operation field 2008 (the first 8-bits being allocated to an operation code), and a 64-bit memory address field 2010. The header field 2006 includes information that facilities the routing of messages among nodes 102, 104. The operation field 2008 includes a message type identifier and the memory address field 2010 identifies the address of a memory line 184 that is the subject of the message. Some messages received through the PS 132 also include 512 bits of data. These messages require five clock cycles for delivery because the datapath through the PS 132 is only 128 bits.

The second message format 2004 includes a 4-bit request field 2012, a 6-bit src/dst ID field 2014, and a 1-bit multi-cycle field 2016. The request field 2012 stores the message type identifier discussed above. The src/dst ID field 2114 identifies the source or destination of the message. The multi-cycle field 2016 indicates whether additional message packets will follow an initial message packet. Specifically, if the multi-cycle field 2016 in the initial message packet, or in subsequent message packets, is set to "1", an additional message packet follows. The purpose of the additional packets is to transmit data included with a message.

As described above, the input buffers 192 preferably include control buffers and data buffers. The control buffers preferably store information extracted from the first 64 or 128 bits of a message (i.e., the first or first and second message packets of a message) while the data buffers preferably store any additional data that follows. Moreover, a message is eligible for processing after the first or first and second message packets are received. Generally, the data can be received while the message is being processed for eventual execution.

Further, the data buffers 192 are preferably allocated to a memory transaction corresponding to a message, and remain allocated until 1) the memory transaction terminates or enters the Waiting state (but not the Local-Waiting state) and 2) any data-sends initiated on behalf of the memory transaction are complete.

Because the message formats used by the PS 132 and the ICS 112 are different, the location of the 4-bits extracted from a message depends on whether the message is received through the PS 132 or the ICS 112. In particular, if the message is received through the PS 132, the 4-bits are extracted from the least significant 4-bits of the operation code included in the operation field 2008. But if the message is received through the ICS 112, the 4-bits are extracted from the 4-bit request type field 2012. As a result, the data input lines connecting the second multiplexer 1944 to the H__ics buffers 1902, 1904 and the H__ps buffers 1906, 1908 are connected to different bits of the respective buffers.

As illustrated in FIG. 16, the circuitry represented by the oval marked 2100 produces the newthread__PC signal. The newthread__PC signal carries an instruction address extracted from a message that could be the basis of a new memory transaction. The newthread__PC signal is connected to the multiplexer 248 illustrated in FIG. 16 so that the new memory transaction can be scheduled during the clock cycle in which the instruction address carried by the newthread__PC signal is extracted. But the newthread__PC signal is also connected to the even side of the TSRF 202 (connection not illustrated) to copy the extracted instruction address into a corresponding TSRF entry 210 during the clock cycle in which the instruction address is extracted.

Figure 21:
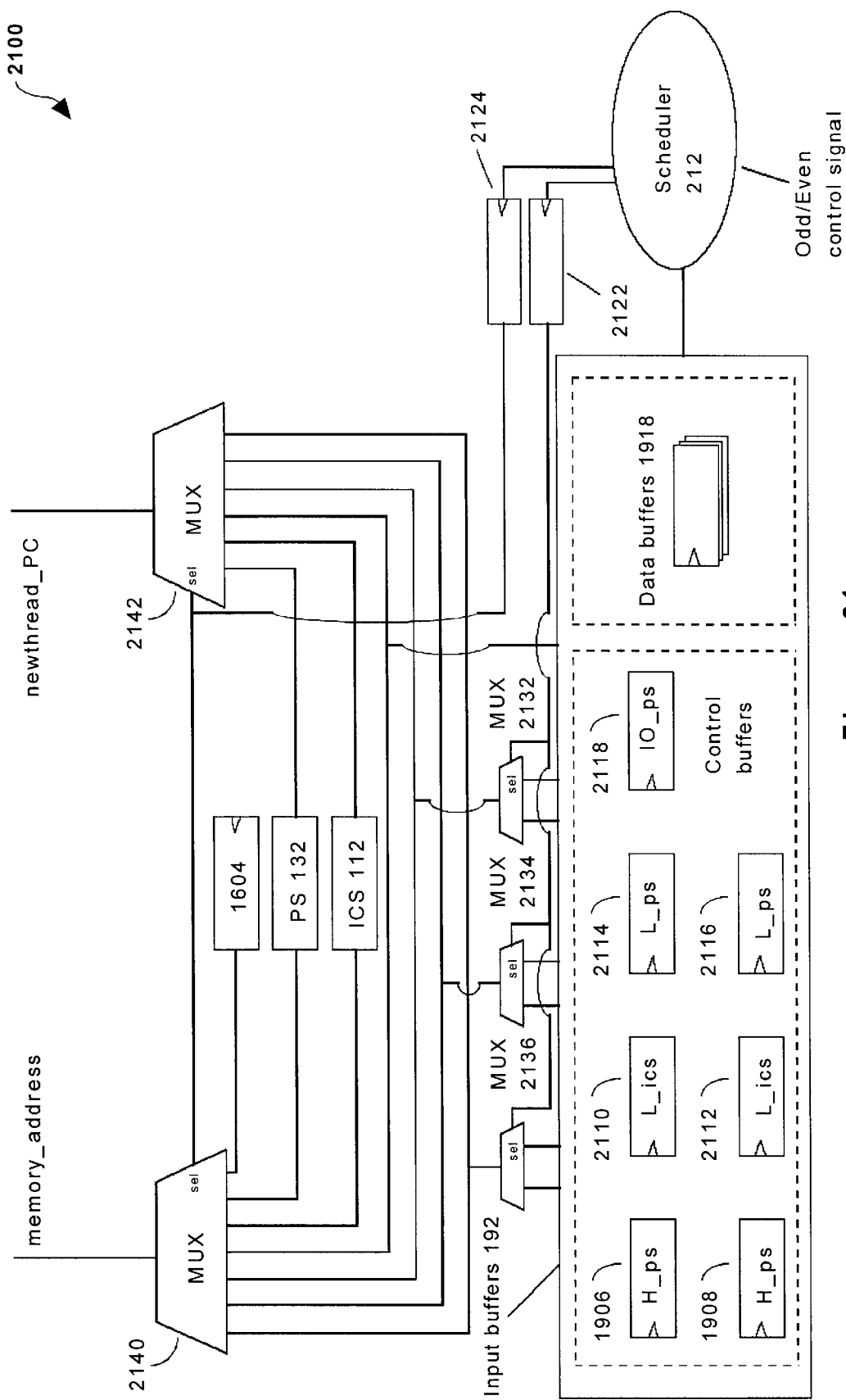

The circuitry represented by the oval marked 2100 is illustrated in FIG. 21 and includes input buffers 192, a first latch 2122, a second latch 2124, a first, second and third 2-to-1 multiplexers 2132, 2134, 2136, the ICS 112, the PS 132, a fourth latch 1604, a 7-to-1 multiplexer 2140, and a 6-to-1 multiplexer 2142.

Again, the scheduler 212 is connected to each of the input buffers 192 to determine whether any of the input buffers 192 contain a message and to read or set the state of such a message. FIG. 21 illustrates additional control buffers preferably included in the input buffers 192. Specifically, the input buffers 192 additionally include two L__ics buffers 2110, 2112 to store low priority messages originating from the ICS 112, two L__ps buffers 2114, 2116 to store low priority messages originating from the PS 132, and an IO__ps buffer 2118 to store an I/O message (which is always a low priority message) originating from the PS 132.

As noted above, preferred embodiments of the present invention include three states: invalid, valid, and valid__ID. With respect to low priority messages and I/O messages, a TSRF entry ID is never included in these messages because these messages are never merged with memory transactions. As a result, the state of an L__ics buffer 2110, 2112, an L__ps buffer 2114, 2116, or an IO__ps buffer 2118 is either invalid or valid.

The scheduler 212 also connects with the first and second latches 2122, 2124 to set them as needed. The first latch 2122 is, in turn, connected as selection input to the first, second and third 2-to-1 multiplexers 2132, 2134, 2136. Connected as data input to the first, second and third 2-to-1 multiplexers 2132, 2134, 2136 are the H__ps buffers 1906, 1908, the L__ics buffers 2110, 2112, and the L__ps buffers 2114, 2116, respectively.

The outputs of the first, second and third 2-to-1 multiplexers 2132, 2134, 2136 are connected as data inputs to the 7-to-1 multiplexer 2140. Also connected as data input to the 7-to-1 multiplexer 2140 is the IO__ps buffer 2118, the fourth latch 1604, the PS 132, and the ICS 112. One of these data inputs is selected as the output of the 7-to-1 multiplexer 2140 by selection input from the second latch 2124. The output of the 7-to-1 multiplexer 2140 is the memory__address signal, which carries a memory address from one of the seven data input sources of the 7-to-1 multiplexer 2140.

The output of the second latch 2124 is also selection input for the 6-to-1 multiplexer 2142 (selection of a seventh input has no effect on this MUX). The data inputs to the 6-to-1 multiplexer 2142 includes the outputs of the first, second and third 2-to-1 multiplexers 2132, 2134, 2136, the IO__ps buffer 2118, the PS 132, and the ICS 112. The output of the 6-to-1 multiplexer 2142 is the newthread__PC signal (which is an instruction address).

And as described above, the message formats used by the PS 132 and the ICS 112 are different, so the location of the instruction address extracted from a message depends on whether the message is received through the PS 132 or the ICS 112. As a result, the data lines connecting the 6-to-1 multiplexer 2142 to the input buffers storing messages from the PS 132 and the input buffers storing messages from the ICS 112 are connected to different bits of the respective buffers.

The memory__address signal generated by the circuitry illustrated in FIG. 21 is data input to the circuitry illustrated in FIG. 22. This circuitry generates a second TSRF__entry__ID signal, an even__no__conflict__? signal, an even__any__merge? signal and even-any__unsuspend__? signal. The same signal line that carries the even__any__merge__? signal also carries an even__any__unsuspend__? signal.

The even__no__conflict__? signal, together with the even__any__merge__? signal, enables the scheduler 212 to make decisions with respect high priority messages originating from the PS 132. In particular, if the even__any__merge__? signal is high, the TSRF entry ID carried by the second TSRF__entry__ID signal is saved back to a corresponding input buffer 192 (circuitry not illustrated). The scheduler 212 also changes the state of the input buffer 192 to reflect the inclusion of a TSRF entry ID (circuitry not illustrated). The TSRF entry ID enables the message to be merged with an entry 210 in the TSRF 202 (i.e., a matching, waiting memory transaction) using the circuitry illustrated in FIG. 20.

The even_no_conflict_? signal also enables the scheduler 212 to make decisions with respect to messages that are not subject to merger (i.e., all low priority messages and unsolicited high priority messages for which there is no matching, waiting memory transaction) originating from either the ICS 112 or the PS 132. In particular, this signal determines whether a new memory transaction based on such a message is Active or Suspended upon creation or left for subsequent processing in an input buffer 192.

And finally, the even_any_unsuspend_? signal together with an even_TSRF_entry_ID signal, which is a precursor to the second TSRF_entry_ID signal, enable the scheduler 212 to identify and activate a suspended memory transaction. More specifically, the even_any_unsuspend_? signal indicates the existence of a qualifying suspended memory transaction (i.e., a suspended memory transaction concerning a memory line of information corresponding to a terminated memory transaction) and the even_TSRF_entry_ID signal identifies the location of a such a memory transaction (i.e., an entry 210 in the TSRF 202).

Note that only the second TSRF_entry_ID signal is the result of multiplexing controlled by the Odd/Even control signal. This is because only this signal interfaces circuitry that is not duplicated for even and odd memory transactions. So while the circuitry illustrated in FIG. 22 generates the above described signals (with the exception of the second TSRF_entry_ID signal), duplicate circuitry is used to do the same for odd memory transactions.

Attention now turns to a detailed description of the circuitry illustrated in FIG. 22. This circuitry includes the even entries of the TSRF 202, a first series of two-input AND gates 2210, a second series of two-input AND gates 2214, a latch 2220, a first 2-to-1 multiplexer 2218, a third series of two-input AND gates 2216, an eight-input OR gate 2222, a 3-bit encoder 2226, a second 2-to-1 multiplexer 2228, a fourth series of two-input AND gates 2230, a series of two-input NAND gates 2232, and a NOR gate 2234.

In more detail now, the address field 222 of the eight even entries 210 in the TSRF 202 are each connected as data input to a separate AND gate in the first series of two-input AND gates 2210. Also connected to the first series of two-input AND gates 2210 is a memory_address signal. The memory_address signal is, therefore, subject to a logical AND operation with a memory line address from each of the even entries 210 in the TSRF 202. The output of a given AND gate in the first series of AND gates 2210 is high, therefore, only if the memory_address signal and the memory line address of a corresponding address field 222 (i.e., memory transaction) match.

Each output of the first series of AND gates 2210 is connected as data input to an AND gate in the second series of AND gates 2214. The other data input to the AND gates in the second series of AND gates 2214 is the output of the third series of AND gates 2216.

Connected as data input to each AND gate in the third series of AND gates 2216 is the output of the first 2-to-1 multiplexer 2218 and a state field 220 of an even entry 210 in the TSRF 202. And connected as data input to the first 2-to-1 multiplexer 2218 are two state designations—Waiting and Suspended. The selection input to the first 2-to-1 multiplexer 2218 is the latch 2220, which is set by the scheduler 212. The scheduler 212 sets the first 2-to-1 multiplexer 2218 to select the Waiting state designation if the circuitry illustrated in FIG. 22 is to determine whether an existing memory transaction (i.e., entry 210) is in a waiting state and concerns a memory line that corresponds to the memory_address signal. But if the circuitry illustrated in FIG. 22 is to determine whether a suspended memory transaction should be activated because of the termination of another, related memory transaction, the scheduler 212 sets the first 2-to-1 multiplexer 2218 to select the Suspended state designation. An output of a given AND gate in the third series of AND gates 2216 is high, therefore, only if the state designation selected by the first 2-to-1 multiplexer 2218 matches the state of a corresponding even entry 210 in the TSRF 202. An output of an AND gate in the second series of AND gates 2214, moreover, is high only if a corresponding entry 210 in the TSRF 202 has a state designation that matches the state designation selected by the first 2-to-1 multiplexer 2218 and a memory address that matches the memory_address signal.

The output of the second series of AND gates 2214 is connected as data input the eight-input OR gate 2222 and the 3-bit encoder 2226. The output of the OR gate 2222 is either the even_merge_? signal or the even_unsuspend_? signal depending on the value of the latch 2220 and is high if any output from the second series of AND gates 2214 is high. Further, the output of the OR gate 2222 is connected to and processed by the scheduler 212 as described in more detail below.

The output of the 3-bit encoder 2226 is the even_TSRF_entry_ID signal. This signal is derived by encoding the position of an arbitrary high signal from the second series of AND gates 2214. The even_TSRF_$_{entry}$_ID signal, along with an odd_TSRF_entry_ID signal, are then connected as data input to the second 2-to-1 multiplexer 2228. The circuitry used to produce the odd_TSRF_entry_ID signal is not illustrated in FIG. 22, but is preferably identical to the circuitry used to produce the even_TSRF_entry_ID signal. The Odd/Even control signal, which is produced by the clock signal generator 252, is connected as selection input to the second 2-to-1 multiplexer 2228 to select the even_TSRF_entry_ID signal on an even clock cycle and the odd_TSRF_entry_ID signal on an odd clock cycle. The output of the second 2-to-1 multiplexer 2228 is the second TSRF_entry_ID signal.

The output of each AND gate in the first series of AND gates 2210 is also connected as data input to a separate AND gate in the fourth series of AND gates 2230. Also connected as data input to each AND gate in the fourth series of AND gates 2230 is the output of a series of NAND gates 2232. The data input to the series of NAND gates 2232 is the state field 220 of the even entries 210 in the TSRF 202 and a Vacant state designation. The output of a NAND gate in the series of NAND gates 2232 is, therefore, high only if the state of a corresponding entry 210 in the TSRF 202 is not set to Vacant. And the output of an AND gate in the fourth series of AND gates 2230 is, in turn, low if a corresponding entry 210 in the TSRF 202 has a state designation set to Vacant or has a memory line address that does not match the memory_address signal. The output of each AND gate of the fourth series of AND gates 2230 is connected as data input to the NOR gate 2234. The output of the NOR gate 2234, designated the even_no_conflict_? signal, is high only if all of the data inputs are low (i.e., all of the entries in the TSRF either have a state designation set to Vacant or a memory line address that does not match the memory_address signal). The even_no_conflict_? signal is connected to and processed by the scheduler 212 as described in more detail below.

As indicated above, there are certain instances in which an entry 210 in the TSRF 202 is allocated to a transaction corresponding to a message (i.e., a new memory transaction is created). In these instances, the scheduler 212 must determine that an entry 210 is available for this purpose and the TSRF entry ID of such an entry 210. However, the circuitry illustrated in FIG. 22 can only determine that such an allocation is required. The circuitry to perform these additional tasks is illustrated in FIG. 23.

Included in FIG. 23 is the TSRF 202, the scheduler 212, a first series of two-input AND gates 2302, a two-input AND gate 2304, a 3-bit encoder 2306, and an eight-input OR gate 2308.

More specifically, the state field 220 of each even entry 210 in the TSRF 202 is separately connected as data input to an AND gate in the series of AND gates 2302. Also connected as data input to each AND gate in the series of AND gates 2302 is a data signal set to the Vacant state designation. As noted above, a Vacant state designation indicates that the corresponding entry 210 is not being used by another memory transaction. The output of an AND gate in the series of AND gates 2302 is, therefore, high only if the state of a corresponding entry 210 in the TSRF 202 is set to Vacant.

The output of seven of the AND gates in the series of AND gates 2302 are connected as data input to the decoder 2306 and the OR gate 2308. The output of an eighth AND gate in the series of AND gates 2302 is instead connected as data input to the AND gate 2304. The other data input connected to the AND gate 2304 is the high_priority_message_? signal, which originates from the scheduler 212. The scheduler 212 sets the high_priority_message_? signal high if a vacant entry 210 is to be allocated to a high priority message. The output of the AND gate 2304 is high only if the state of the corresponding entry 210 is set to vacant and is to be allocated to a high priority message. As a result, low priority messages are prevented from occupying all of the even TSRF entries 210. The output of the AND gate 2304 is connected as data input to the decoder 2306 and the OR gate 2308.

The output of the OR gate 2308 is the even_any_TSRF_entry_available_? signal, which is connected to the scheduler 212. In view of the preceding paragraph, the even_any_TSRF_entry_available_? signal is high if any of the seven even entries 210 not connected to the AND gate 2304 are vacant or the even entry 210 connected to the AND gate 2304 is vacant and to be allocated to a high priority message for which there is no matching, waiting memory transaction.

The output of the 3-bit encoder 2306 is the even_available_TSRF_entry_ID signal, which is connected to the scheduler 212. The even_available_TSRF_entry_ID signal carries the TSRF entry ID of a vacant entry 210. The 3-bit encoder 2306 encodes the position of an arbitrary high data input signal to generate this output.

If the even_any_TSRF_entry_available_? signal is high, the scheduler 212 allocates the entry 210 identified by the even_available_TSRF_entry_ID signal to a new memory transaction. The allocation preferably includes setting the state of the allocated entry 210 (i.e., the new memory transaction). As noted above, the even_no_conflict_? signal (illustrated in FIG. 22) indicates whether an allocated entry 210 conflicts with a previously allocated entry 210 (i.e., existing memory transaction). The state of the allocated entry 210 is, therefore, set by reference to the even_no_conflict_? signal.

Figure 24:
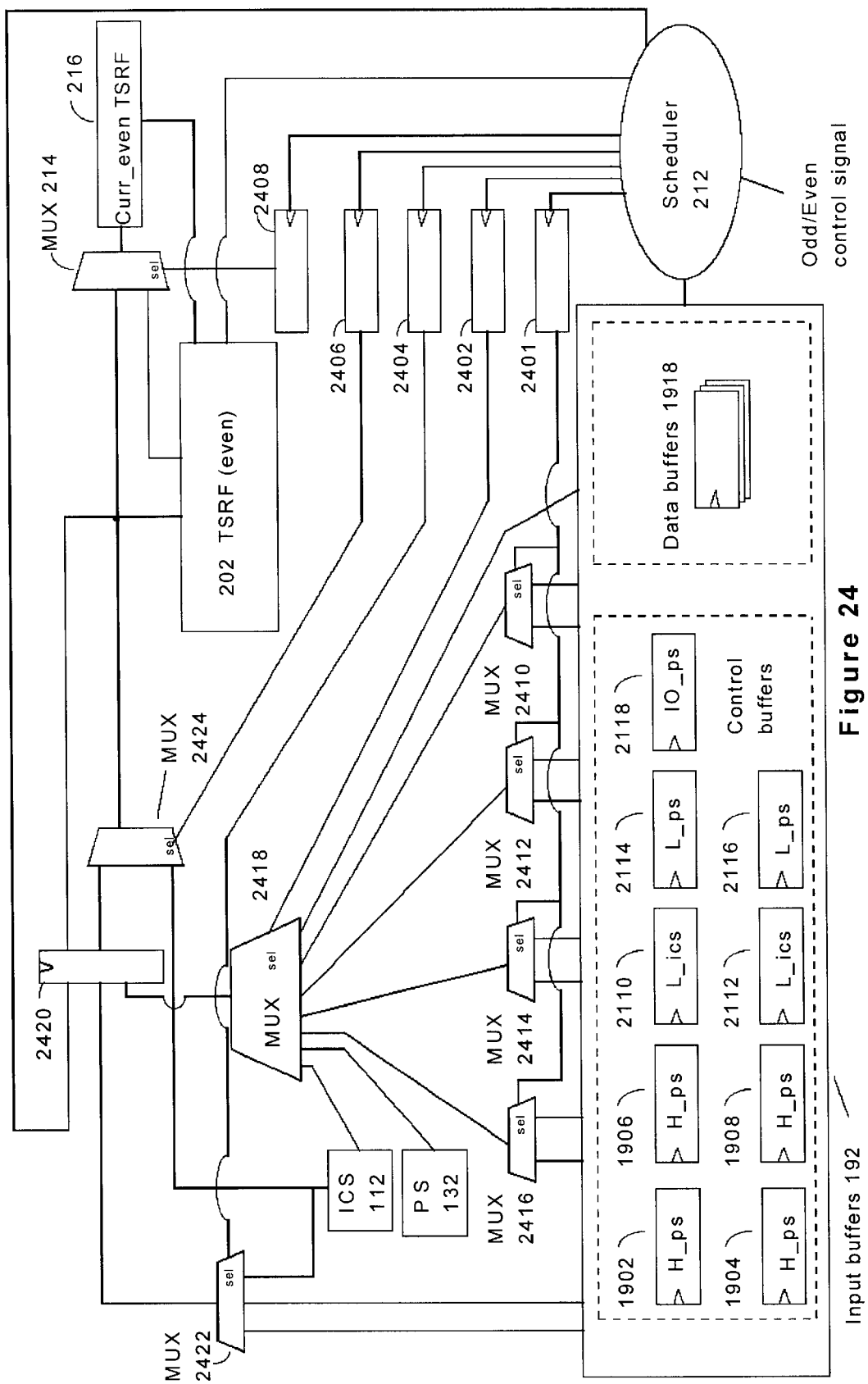

FIG. 24 illustrates circuitry used to copy data from an input buffer 192, the ICS 112, and/or the PS 132 into an even entry 210 in the TSRF 202 and possibly the current even TSRF buffer 216 and circuitry used to copy data from an even entry 210 in the TSRF 202 into the current even TSRF buffer 216 and vice versa.

In particular, the circuitry illustrated in FIG. 24 includes the TSRF 202, the scheduler 212, the current even TSRF buffer 216, input buffers 192; first through sixth latches 2401, 2402, 2404, 2406, 2408, 2420; first through sixth 2-to-1 multiplexers 2410, 2412, 2414, 2416, 2424, 214; the ICS 112, the PS 132, a 7-to-1 multiplexer 2418, and a 3-to-1 multiplexer 2422.

More specifically, the scheduler 212 connects to each of the input buffers 192 as described above with reference to FIG. 22. The scheduler 212 also connects with the first through fifth latches 2401, 2402, 2404, 2406, 2408 to set them as needed. The first latch 2401 is, in turn, connected as selection input to the first through fourth 2-to-1 multiplexers 2410, 2412, 2414, 2416. At most, one of these multiplexers will be selected by the 7-to-1 multiplexer 2418, so there is no danger of a selection-input conflict between these multiplexers. The first through fourth 2-to-1 multiplexers 2410, 2412, 2414, 2416 are connected to the H_ics buffers 2002, 2004, the H_ps buffers 2006, 2008, the L_ics buffers 2010, 2012, and the L_ps buffers 2014, 2016, respectively, to extract information from those buffers.

The outputs of the first through fourth 2-to-1 multiplexers 2410, 2412, 2414, 2416 are four of seven inputs connected to the 7-to-1 multiplexer 2418. Also connected as data inputs to the 7-to-1 multiplexer 2040 are the IO_ps buffer 2018, an output of the PS 132, and an output of the ICS 112. Further, the second latch 2402 is connected as selection input to the 7-to-1 multiplexer 2418. The output of the 7-to-1 multiplexer 2418 is information from a message originating from either the ICS 112 or the PS 132, which is connected as data input to the sixth latch 2420.

Also connected as data input to the sixth latch 2420 is the output of the 3-to-1 multiplexer 2422, which is used to extract directory information from low priority messages originating from the ICS 112. Data input to the 3-to-1 multiplexer 2422 includes, therefore, the ICS 112 and the L_ics buffers 2010, 2012. This directory information is not included in messages from other sources, so it is not extracted through the 7-to-1 multiplexer 2418. The selection input to the 3-to-1 multiplexer 2422 is the output of the third latch 2404. When the second latch 2402 is set to select an L_ics buffer 2010, 2012 or the ICS 112, the third latch 2404 is set to make the same selection. These are the only instances in which the output of the 3-to-1 multiplexer 2422 is written to the sixth latch 2420.

Further, the scheduler 212 is also connected as data input to the sixth latch 2420. This connection enables the scheduler 212 to initialize various bits of the sixth latch 2420 as needed.

The sixth latch 2420 has two outputs. A first output is connected as data input to the fifth 2-to-1 multiplexer 2424; the second output is connected as data input to the sixth 2-to-1 multiplexer 214 and the TSRF 202. The second output includes all of the information stored in the sixth latch 2420 with the exception of any directory information included therein. Any directory information stored in the sixth latch 2420 is instead included in the first output, which again, is connected as data input to the fifth 2-to-1 multiplexer 2424. Also connected as data input to the fifth 2-to-1 multiplexer 2424 is directory information extracted from an unbuffered message received via the ICS 112. Selection input to the fifth 2-to-1 multiplexer 2424 is provided by the fourth latch 2406. The fifth 2-to-1 multiplexer 2424 is needed because directory information is sometimes received in a second message packet of a multi-packet message. If this second message packet is received before or will be received while information from a corresponding first message packet is copied into the sixth latch 2420, the scheduler 212 sets the fourth latch 2406 to select the sixth latch 2420 as the source of the directory information. But if the second message packet will be received while information is being copied from the sixth latch 2420, the scheduler 212 sets the fourth latch 2406 to select the ICS 112 as the source of the directory information.

The second output of the sixth latch 2420 and the output of the fifth 2-to-1 multiplexer 2424 are joined together and connected—as a single data input—to the sixth 2-to-1 multiplexer 214 and the even entries 210 in the TSRF 202 (entry selection circuitry not shown). FIG. 6B illustrates, generally, circuitry that extracts information from an entry 210 in the TSRF 202 for storage in either the current even TSRF buffer 216 or the current odd TSRF buffer 217. FIG. 24 shows that data input to the 214 multiplexer (and the 215 multiplexer) preferably includes the joined output of the sixth latch 2420 and the fifth 2-to-1 multiplexer 2424 as described above. Moreover, the selection input of the sixth 2-to-1 multiplexer 214 is provided by the fifth latch 2408.

Ordinarily, the joined output of the sixth latch 2420 and the fifth 2-to-1 multiplexer 2424 is copied only into an entry 210 in the TSRF 202. But in some instances, this output is also copied into the current even TSRF buffer 216 as illustrated in FIG. 24. This permits the execute logic 242 to execute a corresponding instruction in the next even clock cycle. If not for the bypass, an extra even clock cycle would be required for the execute logic 242 to execute the corresponding instruction (i.e., an extra clock cycle to copy the information into the TSRF 202, and then into the current even TSRF buffer 216).

Additionally, the scheduler 212 is connected to the TSRF 202 to directly set the state fields 220 of even entries in the TSRF 202 as described below.

The circuitry illustrated in FIG. 24 is used only for memory transactions corresponding to even clock cycles. The present invention includes duplicate circuitry, not shown in the Figures, for memory transactions corresponding to odd clock cycles.

Attention now turns to a detailed description of steps performed by the protocol engine, and the timing thereof, that enable a preferred embodiment of the present invention. In particular, FIG. 25 illustrates a series of steps that take place over an exemplary four clock cycle period. The steps included in FIG. 25 represent a complete cycle from message selection to instruction execution. Generally, each of the steps included in FIG. 25 are executed regardless of the actual message and/or memory transaction selections made by the scheduler 212 (e.g., the selection of a high priority message in step 2502 or the scheduling of a running memory transaction in step 2510 does not affect the selection of a message in step 2512). But FIGS. 26–31 illustrate various steps taken in response to specific message and/or memory transaction selections made by the scheduler 212 (e.g., steps taken by the scheduler 212 when an active memory transaction is scheduled differ from steps taken when a new memory transaction is scheduled). The steps illustrated in FIGS. 26–31, moreover, complement rather than displace the steps illustrated in FIG. 25. Like the discussion of hardware above, this discussion focuses on even memory transactions. The invention encompasses duplicate steps, offset by one clock cycle, for odd memory transactions.

A first step occurs during the $1^{st}$ Clock Cycle, which is an odd clock cycle, of FIG. 25. Specifically, the scheduler 212 selects a message from an input source (i.e., directly from an input buffer 192 or speculatively from the PS 132 or the ICS 112) (step 2502). As noted above, the input buffers 192 are accessible to the scheduler 212 so that the scheduler 212 can identify messages stored in input buffers 192 and determine the state of such messages. If a plurality of such messages are stored in input buffers 192, the scheduler 212 selects one of these messages by reference to the prioritization scheme illustrated in FIG. 15 and described in detail above. As also described above, the scheduler 212 speculatively selects a message from the PS 132 or the ICS 112 (i.e., selects the PS 132 or the ICS 112 during the $1^{st}$ Clock Cycle as a message source for the $2^{nd}$ Clock Cycle) when none of the input buffers 192 store a message during the $1^{st}$ Clock Cycle. Step 2502 also includes the scheduler 212 setting one or more latches to reflect the selection. For instance, if the selected message includes a TSRF entry ID (e.g., the selected message is stored in an H_ics buffer 1902, 1904 or an H_buffer 1906, 1908 and has a state set to valid_ID), the scheduler 212 sets the latch 1926 illustrated in FIG. 19 to select the input buffer 192 that stores this message during the $2^{nd}$ Clock Cycle. As described above with reference to FIGS. 18 and 19, setting latch 1926 in this way results in the extraction of a TSRF entry ID included with the selected message so that a merger is possible in a subsequent clock cycle. But if the selected message does not include a TSRF entry ID (e.g., the selected message is stored in an H_ps buffer 1906, 1908 or a low priority input buffer 2110, 2112, 2114, 2116, 2118 and has a state set to valid), the scheduler 212 sets the first and second latches 2122, 2124 illustrated in FIG. 21 to select the input buffer 192 that stores the selected message during the $2^{nd}$ Clock Cycle. Additionally, if the selected message is a high priority message without a TSRF entry ID (e.g., the selected message is stored in an H_ps buffer 1906, 1908 and has a state set to valid), the scheduler 212 sets the latch 2220 illustrated in FIG. 22 to select the Waiting state designation during the $2^{nd}$ Clock Cycle. Finally, if the scheduler 212 speculatively selects a message from the PS 132 or the ICS 112, the scheduler 212 sets the latches in both FIGS. 19 and 21 as described above. In other words, the scheduler 212 prepares for a message with a TSRF ID and for a message without a TSRF ID. Again, this is necessary because the scheduler 212 cannot predict with certainty the type of message, if any, that will be received during a subsequent clock cycle.

The next step takes place within the $2^{nd}$ Clock Cycle, which is an even clock cycle. Specifically, the scheduler 212 identifies an instruction address for a running memory transaction, if there is one, and determines whether an instruction corresponding this instruction address can be executed during the $4^{th}$ Clock Cycle (i.e., the next even clock cycle) (step 2504). As described above with reference to FIGS. 6B and 8, this step includes the analysis of the running memory transaction's state and a merger of the Next PC value from the current instruction buffer 197 and the value of the curr_CC signal.

The scheduler 212 also identifies during the $2^{nd}$ Clock Cycle an instruction address for an active memory transaction, if any, stored in the even side of the TSRF 202 (step 2506). Note that an instruction corresponding to the instruction address (i.e., corresponding to an active memory transaction) is always executable in the following even clock cycle. As a result, the scheduler 212 does not need to take additional steps to determine whether this instruction is executable in the following clock cycle. The only issue then is whether there are any active memory transactions stored in the even side of the TSRF 202. Step 2506 includes, therefore, the scheduler 212 using the circuitry illustrated in FIG. 17 to identify such a memory transaction and extract an instruction address therefrom.

The scheduler 212 also identifies an instruction address for the selected message (i.e., the message directly or speculatively selected in step 2502 during the 1$^{st}$ Clock Cycle) and determines whether an instruction corresponding to this instruction address can be executed in the 4$^{th}$ Clock Cycle (i.e., the following even clock cycle) (step 2508). The precise sub-steps included in step 2508 depend upon the type of the selected message. FIG. 26 includes three tables that illustrate steps taken for each type of message.

In particular, Table 2602 illustrates a step taken when the selected message is a high priority message with a TSRF entry ID (e.g., a high priority message stored in an H_ics buffer 1902, 1904 or an H_buffer 1906, 1908 with a message state set to valid_ID). Specifically, the scheduler 212 merges the selected message with a matching, waiting memory transaction that is identified by the TSRF entry ID (step 2610). To accomplish this task, the scheduler 212 uses the circuitry illustrated in FIGS. 18 and 19 to extract the TSRF entry ID and instruction address bits from the selected message, extract a Next PC value from the matching, waiting memory transaction by reference to the extracted TSRF entry ID, and then merge the instruction address bits and the Next PC value to produce an instruction address (i.e., a merged instruction address) carried by the merge_PC signal. Again, the latch 1926 illustrated in FIG. 19 is set by the scheduler 212 in step 2502 during the 1$^{st}$ Clock Cycle. And as noted above, the merge_PC signal is connected to the multiplexer 248 illustrated in FIG. 16, but the merged instruction address may or may not be selected in step 2510 during the 2$^{nd}$ Clock Cycle. This signal is also connected to the TSRF 202, and the merged instruction address is copied into the address field 222 of the TSRF entry 210 identified by the extracted TSRF entry ID (step 2612). Finally, an instruction corresponding to the merged instruction address is always executable in the 4$^{th}$ Clock Cycle (i.e., the following even clock cycle), so in this instance, the scheduler 212 need not take any steps to determine whether this is so.

Table 2604 illustrates steps taken when the selected message is a low priority message (e.g., a message stored in an L_ics buffer 2110, 2112, an L_ps buffer 2114, 2116, or the IO_ps buffer 2118). In a first step, the scheduler 212 extracts an instruction address from the selected message using the circuitry illustrated in FIG. 21 (step 2620). As noted above, the instruction address is carried by the newthread_PC signal and connected thereby to the multiplexer 248 illustrated in FIG. 16 and the TSRF 202. This circuitry also extracts a memory line address from the selected message. The memory line address is carried by the memory_address signal and connected thereby to the circuitry illustrated in FIG. 22. Also, the first and second latches 2122 and 2124, which enable these extractions, are set by the scheduler 212 in step 2502 during the 1$^{st}$ Clock Cycle. In a second step, the scheduler 212 determines whether an existing memory transaction conflicts with the new memory transaction (i.e., a memory transaction corresponding to the selected message) using the circuitry illustrated in FIG. 22 (step 2622). Recall that two memory transactions conflict if they concern the same memory line. Similarly, a low priority message conflicts with a memory transaction if they concern the same memory line. Output of this circuitry includes the even_no_conflict_? signal, which indicates the presence or absence of a conflicting memory transaction. If there is a conflict, an instruction corresponding to the identified instruction cannot be executed during the following even clock cycle. The scheduler 212 also attempts to allocate during the 2$^{nd}$ Clock Cycle a TSRF entry 210 to the new memory transaction using the circuitry illustrated in FIG. 23 (step 2624). Whether this attempt is successful is indicated by the even_any_TSRF_entry_available_? signal. Finally, if the attempt is successful, the scheduler 212 also copies the extracted instruction into the address field 222 of the TSRF entry 210 identified by the TSRF entry ID carried by the even_available_TSRF_entry_ID signal illustrated in FIG. 23 (step 2626).

Table 2606 illustrates steps taken when the selected message is a high priority message without a TSRF entry ID (e.g., a high priority message stored in an H_ps buffer 1906, 1908 and a state set to valid). As noted above, high priority messages can be merged with an existing memory transaction, can be the basis of a new memory transaction, or can be left in an input buffer 192 for subsequent processing. But the circuitry illustrated in FIG. 22 cannot determine which of these applies and act on this determination during a single clock cycle. Steps 2630, 2632, and 2634 are, therefore, identical to steps 2620, 2622, and 2624 taken for low priority messages (i.e., messages that are to be the basis of new memory transactions). In case the selected message is to be merged with an existing memory transaction, the scheduler 212 also attempts to identify a matching, waiting memory transaction (i.e., a memory transaction in a waiting state that concerns the same memory line as the selected message) and copy a corresponding TSRF entry ID into the selected message (e.g., the input buffer 192 that stores the selected message) using the circuitry illustrated in FIG. 22 (step 2636). Output of this circuitry includes the even_any_merge_? signal and the TSRF_entry_ID signal. Again, the even_any_merge_? signal indicates whether there is a matching, waiting memory transaction and the TSRF_entry_ID signal carries the TSRF entry ID of the matching, waiting memory transaction if there is one. And again, the latch 2220 illustrated in FIG. 22, which enables the generation of the TSRF_entry_ID signal and the even_any_merge_? signal, is set by the scheduler 212 in step 2502 during the 1$^{st}$ Clock Cycle. Finally, if the attempt to allocate an available TSRF entry in step 2634 is successful, no memory transaction conflicts with the new memory transaction, and the even_any_merge_? signal does not indicate the existence of a matching, waiting memory transaction, the scheduler 212 also copies the extracted instruction into the address field 222 of the TSRF entry 210 identified by the TSRF entry ID carried by the even_available_TSRF_entry_ID signal illustrated in FIG. 23 (step 2638).

Referring back to FIG. 25, the scheduler 212 takes two additional steps during the 2$^{nd}$ Clock Cycle. In particular, the scheduler 212 selects one of the identified instruction addresses according to the predefined prioritization scheme described in detail above (i.e., schedules a memory transaction corresponding to the selected instruction address) (step 2510). And as also described in detail above with reference to FIGS. 8 and 16, this step includes copying the selected instruction address into the microcode address latch 246.

Step 2510 also includes additional sub-steps that depend upon the instruction address selected. Specifically, the scheduler 212 sets a plurality of buffers to enable execution of subsequent steps consistently with the selection. Additionally, the scheduler 212 typically makes a number of memory-transaction state changes consistent with the selection.

With respect to setting buffers, if a memory transaction corresponding to the selected message is scheduled, the scheduler 212 sets the first, second, third, fourth, and fifth latches 2401, 2402, 2404, 2406 2408 illustrated in FIG. 24 so that information from the selected message is copied into the current even TSRF buffer 216 and a corresponding TSRF entry 210 during the $3^{rd}$ Clock Cycle (i.e., the next clock cycle). Copying the information into both locations eliminates a clock cycle that would otherwise be needed to copy this information into the TSRF 202 and then into the current even TSRF buffer 216. If an active memory transaction is scheduled, the scheduler 212 sets the fifth latch 2408 illustrated in FIG. 24 to copy information from a TSRF entry 210 corresponding to the active memory transaction into the current even TSRF buffer 216 during the $3^{rd}$ Clock Cycle. If the running memory transaction is scheduled by the scheduler 212, the scheduler does not set any latches to copy information related to the running memory transaction into the current even TSRF buffer 216 since this information is already there. And if either an active memory transaction or a running transaction is scheduled, the scheduler 212 sets the first, second, third, and fourth latches 2401, 2402, 2404, 2406 illustrated in FIG. 24 so that information from the selected message is copied or merged into a corresponding entry 210 in the TSRF 202 during the $3^{rd}$ Clock Cycle (i.e., the next clock cycle) as described in more detail below.

With respect to the state changes, preferred embodiments of the present invention configure the even side of the TSRF 202 to be comprised of two sections. A first section consists of discrete latches for the state field 220, the address field 222, and the next PC field 224. A second section consists of a register array and includes all of the remaining fields of the TSRF 202. Use of the discrete latches in the first section enables faster reads and writes with respect to the state field 220, the address field 222, and the next PC field 224. Still, in preferred embodiments of the present invention, the first section preferably includes only two write ports for the state field 220, the address field 222, and the next PC field 224 respectively. As a result, only two state changes are possible during any one clock cycle. To avoid a scenario in which three state changes would otherwise be required during a single clock cycle, the state change for a scheduled active memory transaction (i.e., Active to Running) is delayed until the following clock cycle. Other memory transaction state changes usually take place during the clock cycle in which the need for a state change is detected by the scheduler 212. Without this delay, the scenario mentioned above would occur if 1) an active memory transaction is scheduled; 2) a running memory transaction enters a waiting state; and 3) a selected message is available for processing. Specifically, the active memory transaction would be changed from Active to Running, the running memory transaction would be changed from Running to Vacant, Waiting, or Local_Waiting, and a memory transaction corresponding to the selected message would be changed from Waiting or Local_Waiting to Active or just set to Active during a single clock cycle. A careful review of the timing illustrated in FIGS. 25–31 shows that because of this delay (i.e., delaying the state change for a scheduled active memory transaction), there is no potential for three state changes during any one clock cycle.

So when a running memory transaction enters a Vacant state or a Waiting or Local_Waiting state, the scheduler 212 makes the state change during the same clock cycle. Additionally, when an active memory transaction is scheduled, the scheduler 212 makes the state change during the following clock cycle. When a memory transaction corresponding to the selected message is scheduled, the state change depends upon the type of the selected message, but it is made during the same clock cycle. Specifically, when the selected message includes a TSRF entry ID, the scheduler 212 sets the state of the matching, waiting memory transaction to Running. When the selected message is a low priority message, the scheduler 212 sets the state of the new memory transaction to Running if no memory transaction conflicts with the new memory transaction or Suspended if a memory transaction conflicts with the new memory transaction. When the selected message is a high priority message without a TSRF entry ID, but there is a matching, waiting memory transaction for the selected message, the scheduler 212 sets the state of the matching, waiting memory transaction to Active. When the selected message is a high priority message without a TSRF entry ID and there is no matching, waiting memory transaction for the selected message, the scheduler 212 sets the state of the new memory transaction to Running if no memory transaction conflicts with the new memory transaction. Further, when a running memory transaction or an active memory transaction is scheduled, the scheduler 212 takes similar steps with respect to state changes for a memory transaction corresponding to the selected message. The distinction is that instead of setting a state to Running, the state is set to Active.

The scheduler 212 also selects another message from an input source (i.e., directly from an input buffer 192 or speculatively from the PS 132 or the ICS 112) or initiates activation of a suspended memory transaction (step 2512). As indicated above, in certain instances, the scheduler 212 attempts to activate a suspended memory transaction. Specifically, if a running transaction terminates (an action that does not include entering a waiting state) during the $2^{nd}$ Clock Cycle, the scheduler 212 A) sets the second latch 2124 illustrated in FIG. 21 so that the 7-to-1 multiplexer 2140 selects the fourth latch 1604 as data input in step 2514 during the $3^{rd}$ Clock Cycle; B) sets the first latch 2220 illustrated in FIG. 22 so that the 2-to-1 multiplexer 2218 selects the Suspended state designation in step 2514 during the $3^{rd}$ Clock Cycle; and C) copies the memory line address of the terminated memory transaction into the fourth latch 1604 illustrated in FIGS. 16 and 21.

But if a running memory transaction does not terminate during the $2^{nd}$ Clock Cycle, the scheduler 212 selects another message from an input source. Basically, this step is identical to step 2502 described above. One important distinction is that a message selected in this step (i.e., during an even clock cycle) will not be scheduled for execution (as a new memory transaction or as part of a merged memory transaction) during the third clock cycle following the current clock cycle (i.e., three clock cycles later). This is not true for a message selected in step 2502 (i.e., during an odd clock cycle). As described above, a memory transaction corresponding to a message selected in step 2502 can be scheduled for execution during the $4^{th}$ Clock Cycle (i.e., the third clock cycle following the $1^{st}$ Clock Cycle). Instead, the earliest a message selected in step 2512 during the $2^{nd}$ Clock Cycle can be executed is the fourth clock cycle following the $2^{nd}$ Clock Cycle. In other words, a message is selected in step 2512 for merger with an existing memory transaction or to be the basis of a new memory transaction. In order to be executed, an active memory transaction corresponding to this message must then be scheduled in a subsequent clock cycle.

In the $3^{rd}$ Clock Cycle, the scheduler 212 begins processing the message selected in step 2512 of the $2^{nd}$ Clock Cycle or searching for and activating a suspended memory transaction (step 2514). If a running memory transaction terminates during the $2^{nd}$ Clock Cycle, circuitry illustrated in FIG. 22 is configured to produce the even_any_unsuspend_? signal and the TSRF_entry_ID signal. The former indicates the presence of a matching, suspended memory transaction in the TSRF 202. Recall, that in this instance, the suspended memory transaction matches if it includes the memory line address stored in the fourth latch 1604 illustrated in FIG. 21. If the even_any_unsuspend_? signal does indicate the presence of a matching, suspended memory transaction in the TSRF 202, the TSRF_entry_ID signal carries the TSRF entry ID of the matching, suspended memory transaction. The scheduler 212 then uses this information in step 2514 to activate the suspended memory transaction. The scheduler 212 can then—during a subsequent clock cycle, in an unrelated action—schedule this memory transaction as described above with reference to step 2506.

But if a running memory transaction does not terminate during the $2^{nd}$ Clock Cycle, the precise sub-steps taken in step 2514 depend upon the type of the message selected in step 2512. FIG. 26, as described above, illustrates the steps taken when certain types of messages are selected by the scheduler 212. Step 2514 also includes setting the state of a memory transaction corresponding to the message selected in step 2512. Specifically, when the selected message is a high priority message for which there is a matching, waiting memory transaction, the scheduler 212 sets the state of the matching, waiting memory transaction to Active. When the selected message is a low priority message, the scheduler 212 sets the state of the new memory transaction to Active if no memory transaction conflicts with the new memory transaction or Suspended if a memory transaction conflicts with the new memory transaction. When the selected message is a high priority message for which there is no matching, waiting memory transaction, the scheduler 212 sets the state of the new memory transaction to Active if no memory transaction conflicts with the new memory transaction. But if a memory transaction does conflict with this last type of message, the selected message is left in an input buffer 192 for subsequent processing when the conflict no longer exists.

The scheduler 212 also selects another message from an input source during the $3^{rd}$ Clock Cycle (step 2516). Because this selection takes place during an odd clock cycle, a memory transaction corresponding to a message selected in this step is eligible for scheduling in the following clock cycle. Thus, steps 2502 and 2516 are but two steps in a repeating cycle of steps. In other words, step 2516 marks the beginning of another, overlapping iteration of the four clock cycle sequence of steps illustrated in FIG. 25.

Additional steps are taken by the scheduler 212 during the $3^{rd}$ Clock Cycle, but the particular steps taken depend upon which instruction address is selected in step 2510. Again, steps taken in conjunction with the continued execution of a running memory transaction are described above, and will not be repeated here. FIG. 27, however, illustrates steps taken during the $3^{rd}$ Clock Cycle (and the $4^{th}$ Clock Cycle) if the scheduler 212 schedules an active memory transaction in step 2510 during the $2^{nd}$ Clock Cycle. In particular, the scheduler 212 copies an instruction corresponding to the selected instruction address into the current instruction buffer 197 (step 2702). This process is described above with respect to FIG. 8 in the context of scheduling a running memory transaction. In fact, this step, though labeled differently in subsequent figures, is the same regardless of the source of the instruction address. The scheduler 212 also extracts information from the TSRF entry 210 corresponding to the scheduled memory transaction using the circuitry illustrated in FIG. 24 (step 2704). As noted above, the scheduler 212 sets the fifth latch 2408 during the $2^{nd}$ Clock Cycle for this purpose if an active memory transaction is scheduled in step 2510. Moreover, the scheduler 212 sets the state of the memory transaction corresponding to the selected instruction address to Running (step 2706). This step is accomplished by modifying the state designation included in the TSRF entry 210 that stores information for the memory transaction corresponding to the selected instruction address.

The scheduler 212, furthermore, finishes processing the message selected in step 2502 of the $1^{st}$ Clock Cycle (step 2708). Since a memory transaction corresponding to this message was not scheduled in step 2510 during the $2^{nd}$ Clock Cycle, the scheduler 212 completes the task of merging the selected message into a matching, waiting memory transaction, creating a new memory transaction based on the selected message, or leaving the message in place for subsequent processing. The precise sub-steps taken in step 2708 depend upon the type of the selected message. FIG. 28 illustrates the sub-steps taken for each message type. In particular, Table 2802 illustrates steps taken during the $3^{rd}$ Clock Cycle if the scheduler 212 selects a message with a TSRF entry ID in step 2502 during the $1^{st}$ Clock Cycle but does not schedule a corresponding memory transaction in step 2510 during the $2^{nd}$ Clock Cycle. First, the scheduler 212 copies information from the selected message into a corresponding TSRF entry 210 using circuitry illustrated in FIG. 24 (step 2810). Note that the data lines that copy this information do not overlap the data lines that copy information from the TSRF 202 into the current even TSRF buffer 216. This permits parallel execution of step 2810 and, for example, step 2704, which also uses circuitry illustrated in FIG. 24. The scheduler 212 sets the latches 2401, 2402, 2404, 2406 to enable step 2810 in step 2510 during the $3^{rd}$ Clock Cycle when a memory transaction corresponding to the selected message is not scheduled. Second, the scheduler 212 sets the state of the input buffer 192 that stores the selected message to invalid using the circuitry illustrated in FIG. 24 (step 2814). As noted above, the connection between the scheduler 212 and the input buffers 192 illustrated in FIG. 24 enables the scheduler 212 to access and modify the input buffers 192. Step 2814 ensures that this message will not be mistakenly processed a second time and frees the input buffer 192 that stored the selected message, making it available to store a new message.

Table 2804 illustrates steps taken during the $3^{rd}$ Clock Cycle if the scheduler 212 selects a low priority message in step 2502 during the $1^{st}$ Clock Cycle, but does not schedule a corresponding memory transaction in step 2510 during the $2^{nd}$ Clock Cycle. First, if an entry 210 is available for allocation in step 2624, the scheduler 212 copies information from the selected message into the allocated TSRF entry 210 using the circuitry illustrated in FIG. 24 (step 2820). Note that step 2820 is essentially the same as step 2810. As indicated above, the scheduler 212 sets the latches 2401, 2402, 2404, 2406 that enable step 2820 in step 2510 during the $2^{nd}$ Clock Cycle when a memory transaction corresponding to the selected message is not scheduled. In addition, if an entry 210 is available for allocation in step 2624, the scheduler 212 sets the state of the input buffer 192 that stores the selected message to invalid (step 2824). This step ensures that this message will not be mistakenly processed a second time and frees the input buffer 192 for other messages. But if a TSRF entry 210 is not available for allocation in step 2624, the message is left in the input buffer 192 for subsequent processing when an entry 210 is available.

Table 2806 illustrates steps taken during the $3^{rd}$ Clock Cycle if the scheduler 212 selects a high priority message without a TSRF entry ID in step 2502 during the $1^{st}$ Clock Cycle, but does not schedule a corresponding memory transaction in step 2510 during the $2^{nd}$ Clock Cycle. Note that some of the steps illustrated in Table 2806 are identical to steps illustrated in Table 2804 because there might not be a matching, waiting memory transaction for the selected message. But if there is, the selected message now includes the TSRF entry ID of the matching, waiting memory transaction. Recall that in step 2636 during the second clock cycle, the circuitry illustrated in FIG. 22 is used to determine the TSRF entry ID of the matching, waiting memory transaction and save it into the selected message.

Turning to the steps illustrated in Table 2806, if there is no matching, waiting memory transaction for the selected message, no memory transaction conflicts with the new memory transaction, and an entry 210 is available for allocation in step 2634 during the $2^{nd}$ Clock Cycle, the scheduler 212 copies information from the selected message into a corresponding TSRF entry 210 (step 2830). The circuitry that enables the scheduler 212 to execute step 2830 is illustrated in FIG. 24. Again, the scheduler 212 sets the latches 2401, 2402, 2404, 2406 that enable step 2810 in step 2510 during the $2^{nd}$ Clock Cycle when a memory transaction corresponding to the selected message is not scheduled. Further, the circuitry illustrated in FIGS. 22 and 23 enables the scheduler 212 to determine whether the requirements of this step are met before executing them. Specifically, the even__any__merge__? signal indicates the absence or presence of a matching, waiting memory transaction, the even__no__conflict__? signal indicates the absence of a conflicting memory transaction, and the even__any__TSRF__entry__available__? signal indicates the availability of a TSRF entry for allocation.

If there is a matching, waiting memory transaction for the selected message, the scheduler 212 merges the selected message with the matching, waiting memory transaction (step 2834). The circuitry that enables the scheduler 212 to execute step 2834 is illustrated in FIGS. 18, 19, and 24. In particular, the TSRF entry ID of the matching, waiting memory transaction and instruction address bits are extracted from the selected message and the TSRF entry ID is then used to merge the instruction address bits with a Next PC value extracted from the matching, waiting memory transaction (i.e., a TSRF entry corresponding to the matching, waiting memory transaction). The result of this merger is the merged instruction address, which is carried by the merge__PC signal and copied into the TSRF entry 210 corresponding to the matching, waiting memory transaction instead.

If there is a matching, waiting memory transaction for the selected message or an entry 210 is available for allocation in step 2634 during the $2^{nd}$ Clock Cycle and the new memory transaction does not conflict with an existing memory transaction, the scheduler sets the state of the input buffer 192 that stores the selected message to invalid (step 2840). In other words, this step is taken if the selected message is the basis of a new memory transaction or merged with an existing memory transaction to ensure that the selected message is not processed a second time and to make the input buffer 192 available for new messages.

Finally, if there is no matching, waiting memory transaction for the selected message, the new memory transaction does conflict with an existing memory transaction, and the selected message was speculatively selected from the PS 132, the scheduler 212 copies contents of the selected message into an input buffer 192 (i.e., either h__ps buffer 1906, 1908) for subsequent processing (step 2842).

Returning to FIG. 27, which illustrates steps taken when an active memory transaction is scheduled in step 2510 during the $2^{nd}$ Clock Cycle, the next step includes the execute logic 242 executing an instruction corresponding to the selected instruction address (step 2710). Like step 2702 before it, this step is essentially the same for all instructions regardless of the source of the instruction address. So the explanation given above with reference to FIG. 8 applies to step 2710 as well. At this point, the active memory transaction scheduled in step 2510 during the $2^{nd}$ Clock Cycle is a running memory transaction.

As noted above, a memory transaction corresponding to the message selected in step 2502 (FIG. 25) during the $1^{st}$ Clock Cycle can be scheduled in step 2510 during the $2^{nd}$ Clock Cycle. When this occurs, the precise steps taken during the $3^{rd}$ Clock Cycle (and the fourth Clock Cycle) depend upon the type of the message selected. For instance, FIG. 29 illustrates steps taken during the $3^{rd}$ Clock Cycle if the scheduler 212 selects a message with a TSRF entry ID in step 2502 during the $1^{st}$ Clock Cycle and schedules a corresponding memory transaction in step 2510 during the $2^{nd}$ Clock Cycle. First, the scheduler copies an instruction corresponding to the selected instruction address into the current instruction buffer 197 (step 2902). Second, the scheduler 212 copies information from the selected message into the current even TSRF buffer 216 using the circuitry illustrated in FIG. 24 (step 2904). Third, the scheduler 212 sets the state of the input buffer 192 that stores the selected message to invalid (step 2908). During the $4^{th}$ Clock Cycle the execute logic 242 executes the instruction corresponding to the instruction address selected by the scheduler 212 in step 2510 during the $2^{nd}$ Clock Cycle (step 2910).

FIG. 30 illustrates steps taken during the $3^{rd}$ Clock Cycle if the scheduler 212 selects a low priority message in step 2502 of the $1^{st}$ Clock Cycle and schedules a corresponding memory transaction in step 2510 during the $2^{nd}$ Clock Cycle. First, if a memory transaction conflicts with the new memory transaction (i.e., the memory transaction corresponding to the selected message) and an entry 210 is available for allocation in step 2624, the scheduler 212 copies information from the selected message (via the sixth latch 2420 and the fifth 2-to-1 multiplexer 2424 illustrated in FIG. 24) into the TSRF entry 210 allocated in step 2624 (step 3002). Second, if a memory transaction conflicts with the new memory transaction or no entry 210 is available for allocation in step 2624, the scheduler 212 squashes the selected instruction address (step 3106). More specifically, the scheduler 212 directs the two 2-to-1 multiplexers 1603 and 250 illustrated in FIG. 16 to copy a no-op code into the current instruction buffer 197. As a result, the execute logic 242 will not execute the instruction corresponding to the instruction address selected by the scheduler 212 in step 2510 during the $2^{nd}$ Clock Cycle. Third, if no memory transaction conflicts with the new memory transaction and an entry 210 is available for allocation in step 2624, the scheduler 212 copies an instruction corresponding to the selected instruction address into the current instruction buffer 197 (step 3008) and copies information from the selected message into the current even TSRF buffer 216 (step 3010). Fourth, if an entry 210 is available for allocation in step 2624, the scheduler 212 sets the state of the input buffer 192 that stores the selected message to invalid (step 3014). As a result of the execution requirements for steps 3002–3014, the scheduler 212 takes no action, leaving the selected message in an input buffer 192 for subsequent processing, if no entry is available for allocation in step 2624. And in step 3016 during the $4^{th}$ Clock Cycle, the execute logic 242 executes an instruction corresponding to the instruction address—selected by the scheduler in step

2510 during the $2^{nd}$ Clock Cycle—if no memory transaction conflicts with the new memory transaction and an entry 210 is available for allocation in step 2624. Recall, that if these conditions are not met, the scheduler 212 squashes the selected instruction address in step 3006 during the $3^{rd}$ Clock Cycle.

FIG. 31 illustrates steps taken during the $3^{rd}$ Clock Cycle if the scheduler 212 selects a high priority message without a TSRF entry ID in step 2502 during the $1^{st}$ Clock Cycle and schedules a corresponding memory transaction in step 2510 during the $2^{nd}$ Clock Cycle. First, if there is no matching, waiting memory transaction for the selected message, no memory transaction conflicts with the new memory transaction, and an entry 210 is available for allocation in step 2634, the scheduler 212 copies information from the selected message (via the sixth latch 2420 and the fifth 2-to-1 multiplexer 2424 illustrated in FIG. 24) into the current even TSRF buffer 216 (step 3102). Second, if there is a matching, waiting memory transaction for the selected message, a memory transaction conflicts with the new memory transaction, or no entry 210 is available for allocation in step 2634, the scheduler 212 squashes the selected instruction address (step 3106). More specifically, the scheduler 212 directs the two 2-to-1 multiplexers 1603 and 250 illustrated in FIG. 16 to copy a no-op code into the current instruction buffer 197. As a result, the execute logic 242 will not execute the instruction corresponding to the instruction address selected by the scheduler 212 in step 2510 during the $2^{nd}$ Clock Cycle. Third, if there is a matching, waiting memory transaction for the selected message, the scheduler 212 merges the selected message with the matching, waiting memory transaction (i.e., copies contents of the selected message into the TSRF entry 210 corresponding to the matching, waiting memory transaction) (step 3108). Fourth, if there is a matching, waiting memory transaction for the selected message or no memory transaction conflicts with the selected message and an entry is available for allocation in step 2634, the scheduler 212 sets the state of the input buffer 192 that stores the selected message to invalid (step 3112). Finally, contents of the selected message are copied into an input buffer 192 for subsequent processing if there is no matching, waiting memory transaction for the selected memory transaction, a memory transaction conflicts with the new memory transaction, and the selected message was speculatively selected from the PS 132 (step 3113). And in step 3114 during the $4^{th}$ Clock Cycle, the execute logic 242 executes an instruction corresponding to the instruction address—selected by the scheduler in step 2510 during the $2^{nd}$ Clock Cycle—if there is no matching, waiting memory transaction for the selected message, no memory transaction conflicts with the selected message, and a TSRF entry 210 is available for allocation in step 2634. Recall, that if these conditions are not met, the scheduler 212 squashes the selected instruction address in step 3106 during the $3^{rd}$ Clock Cycle.

Returning to FIG. 25, the scheduler 212 also finishes processing the message selected in step 2512 during the $2^{nd}$ Clock Cycle (step 2518). Because this message, which corresponds to an even memory address, is selected in an even clock cycle, the processing sub-steps taken in step 2518 are identical to the processing sub-steps described in FIG. 28. And again, the precise sub-steps taken depend upon the type of the selected message. If the message is a high priority message with a TSRF entry ID, the sub-steps illustrated in Table 2802 of FIG. 28 are taken. If the message is a low priority message, the sub-steps illustrated in Table 2804 of FIG. 28 are taken. And if the message is a high priority message without a TSRF entry ID, the sub-steps illustrated in Table 2806 of FIG. 28 are taken.

Alternate Embodiments

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A protocol engine implementing a cache coherence protocol, for use in a multiprocessor computer system, the protocol engine comprising:
   a signal generator configured to generate a series of clock cycles;
   a memory transaction array configured to store entries representing a plurality of memory transactions, said plurality of memory transactions being associated with the series of clock cycles;
   execution logic configured to execute during a current clock cycle an instruction corresponding to a memory transaction selected in a previous clock cycle, said memory transaction associated with the current clock cycle; and
   scheduling logic configured to select during the current clock cycle an active memory transaction associated with the current clock cycle, if any, from among the plurality of memory transactions represented by said entries in said memory transaction array, said scheduling logic configured to then
      store during the current clock cycle a first instruction address in an instruction address latch when an instruction corresponding to said first instruction address can be executed during a next clock cycle associated with said current clock cycle, said first instruction address corresponding to the memory transaction selected in the previous clock cycle;
      store during said current clock cycle a second instruction address in said instruction address latch when said instruction corresponding to said first instruction address cannot be executed during said next clock cycle associated with said current clock cycle, said second instruction address corresponding to the active memory transaction; and
      copy during a next clock cycle not associated with the current clock cycle an instruction from an instruction cache into an instruction latch, said instruction corresponding to an instruction address stored in said instruction address latch, the execution logic being further configured to execute during said next clock cycle associated with the current clock cycle an instruction stored in the instruction latch.

2. The protocol engine of claim 1, wherein
the series of clock cycles comprise even and odd clock cycles.

3. The protocol engine of claim 1, wherein
the instruction corresponding to the first instruction address cannot be executed during the next clock cycle associated with the current clock cycle when the memory transaction selected in the previous clock cycle terminates during the current clock cycle, a state designation of said memory transaction selected in the previous clock cycle being set to vacant.

4. The protocol engine of claim 3, wherein
the instruction corresponding to the first instruction address cannot be executed during the next clock cycle associated with the current clock cycle when the memory transaction selected in the previous clock cycle requires a response from a device other than the protocol engine, a state designation of said memory transaction selected in the previous clock cycle being set to waiting.

5. The protocol engine of claim 1, wherein
the scheduling logic is configured to identify a plurality of active memory transactions represented by the entries stored in the memory transaction array, said scheduling logic is further configured to select the active memory transaction associated with the current clock cycle from said plurality of active memory transactions.

6. The protocol engine of claim 1, further comprising
a first information buffer, wherein the scheduling logic is further configured to copy during a clock cycle preceding the current clock cycle information corresponding to the memory transaction selected in the previous clock cycle into said first information buffer, the execution logic being further configured to access and update said information corresponding to the memory transaction selected in the previous clock cycle while executing the instruction corresponding to said memory transaction selected in said previous clock cycle.

7. The protocol engine of claim 6, wherein
when the instruction corresponding to the first instruction address cannot be executed during the next clock cycle associated with the current clock cycle the scheduling logic is further configured to:
copy from the first information buffer during the current clock cycle said information corresponding to the memory transaction selected in the previous clock cycle into the memory transaction array, and
copy during the next clock cycle not corresponding to the current clock cycle information corresponding to the active memory transaction into said first information buffer, the execution logic being further configured to access and update said information corresponding to the active memory transaction while executing one or more instructions corresponding to said active memory transaction.

8. The protocol engine of claim 6, further comprising
a second information buffer, wherein the scheduling logic is further configured to copy from the first information buffer during the current clock cycle a memory line address included in the information corresponding to the memory transaction selected in the previous clock cycle into said second information buffer when the memory transaction selected in the previous clock cycle terminates during the current clock cycle, said scheduling logic configured to then activate during the next clock cycle not associated with the current clock cycle a suspended memory transaction corresponding to the memory line address copied into in the second information buffer.

9. The protocol engine of claim 1, further comprising
a second instruction latch, wherein the scheduling logic is configured to copy during a clock cycle following the current clock cycle the instruction stored in the instruction latch from said instruction latch to said second instruction latch so that the execution logic can re-execute said instruction during the next clock cycle associated with the current clock cycle.

10. The protocol engine of claim 1, wherein
the execution logic is configured to generate during the current clock cycle a condition code from at least partial execution of the instruction stored in the instruction latch, said instruction comprising in part a next instruction address; and
the selection logic configured to combine the condition code and the next instruction address to produce the first instruction address.

11. The protocol engine of claim 1, further comprising
a series of input buffers for storing messages received by the protocol engine, each of said messages corresponding to a memory line, wherein the selection logic is configured to select during the previous clock cycle an input buffer, if any, from the series of input buffers buffering an available message associated with the current clock cycle.

12. The protocol engine of claim 11, further comprising
an input buffer selection latch, said latch configured to receive during the previous clock cycle and maintain during the current clock cycle an input buffer identifier, said input buffer identifier identifying the selected input buffer, the selection logic being configured to reference the input buffer identifier to access the input buffer during the current clock cycle.

13. The protocol engine of claim 11, wherein
when the available message includes a memory transaction identifier, the selection logic is configured to:
execute during the current clock cycle a merge of the available message and a memory transaction identified by said memory transaction identifier to produce a merged instruction address; and
store during the current clock cycle the new instruction address with the memory transaction array entry representing the memory transaction identified by said memory transaction identifier.

14. The protocol engine of claim 13, wherein
when the first instruction address and the second instruction address cannot be executed during said next clock cycle associated with said current clock cycle, the selection logic is configured to
copy during the current clock cycle the merged instruction address into the instruction address latch; and
set during the current clock cycle a state designation of the memory transaction identified by said memory transaction identifier to running.

15. The protocol engine of claim 13, wherein
when one of the first instruction address and the second instruction address can be executed during said next clock cycle associated with said current clock cycle, the selection logic is configured to set during the current clock cycle a state designation of the memory transaction identified by said memory transaction identifier to active.

16. The protocol engine of claim 11, wherein
the selection logic is configured to
determine for the available message a memory transaction identifier;
set a state designation of a memory transaction identified by said memory transaction identifier to active during the current clock cycle; and
execute during the next clock cycle not associated with the current clock cycle a merge of the available message and the memory transaction identified by said memory transaction identifier.

17. The protocol engine of claim 11, wherein
the selection logic is configured to allocate during the current clock cycle an entry of the entries stored in the memory transaction array for a new memory transaction when the available message is of a class of messages that does not correspond to any of the plurality of memory transactions represented by the entries stored in the memory transaction array, said new memory transaction corresponding to the available message.

18. The protocol engine of claim 17, wherein the available message is of the class when said available message is a low priority message.

19. The protocol engine of claim 17, wherein the available message is of the class when none of said plurality of memory transactions represented by the entries stored in the memory transaction array are in a waiting state and correspond to the memory line.

20. The protocol engine of claim 17, further comprising a first information buffer, wherein the scheduling logic is further configured to copy during the next clock cycle not associated with the current clock cycle information corresponding to the new memory transaction into said first information buffer, the execution logic being further configured to access and update said information corresponding to the new memory transaction while executing an instruction corresponding to said new memory transaction.

21. The protocol engine of claim 17, wherein the selection logic is configured to determine during the current clock cycle whether the available message conflicts with any of the plurality of memory transactions represented by the entries stored in the memory transaction array.

22. The protocol engine of claim 21, wherein the available message conflicts with any of the plurality of memory transactions represented by the entries stored in the memory transaction array when any of the plurality of memory transactions represented by the entries stored in the memory transaction array correspond to the memory line.

23. The protocol engine of claim 21, wherein the selection logic is configured to activate during the current clock cycle the new memory transaction when the available message does not conflict with any of the plurality of memory transactions represented by the entries stored in the memory transaction array and one of the first instruction address and the second instruction address can be executed during said next clock cycle associated with said current clock cycle.

24. The protocol engine of claim 21, wherein the selection logic is configured to, during the current clock cycle, set to running a state designation of the new memory transaction when the available message does not conflict with any of the plurality of memory transactions represented by the entries stored in the memory transaction array and the first instruction address and the second instruction address cannot be executed during said next clock cycle associated with said current clock cycle.

25. The protocol engine of claim 21, wherein the selection logic is configured to suspend during the current clock cycle the new memory transaction when the available message conflicts with any of the plurality of memory transactions represented by the entries stored in the memory transaction array.

26. The protocol engine of claim 21, wherein the selection logic is configured to copy during the current clock cycle an instruction address from the available message into the instruction address latch if the first instruction address and the second instruction address cannot be executed during said next clock cycle associated with said current clock cycle.

27. The protocol engine of claim 26, wherein the scheduling logic is configured to copy, during the next clock cycle not associated with the current clock cycle, a no-operation instruction into the instruction latch when the available message conflicts with any of the plurality of memory transactions represented by the entries stored in the memory transaction array.

28. The protocol engine of claim 11, wherein when the available message is of a class of messages that can correspond to a memory transaction the selection logic is configured to
    determine during the current clock cycle whether any of the plurality of memory transactions represented by the entries stored in the memory transaction array are in a waiting state and correspond to the memory line;
    determine during the current clock cycle whether space is available in the memory transaction array for a new memory transaction entry; and
    determine during the current clock cycle whether the available message conflicts with any of the plurality of memory transactions represented by the entries stored in the memory transaction array.

29. The protocol engine of claim 28, wherein the selection logic is further configured to
    identify during the current clock cycle a memory transaction identifier of a memory transaction that is in a waiting state and corresponds to the memory line; and
    store the memory transaction identifier with the available message.

30. The protocol engine of claim 29, wherein the selection logic is configured to activate during the current clock cycle the memory transaction, if there is one, that is in a waiting state and corresponds to the memory line.

31. The protocol engine of claim 29, wherein when said memory transaction identifier is identified, the selection logic is configured to execute during the next clock cycle not associated with the current clock cycle a merge of the available message with the memory transaction identified by said memory transaction identifier.

32. The protocol engine of claim 28, wherein the selection logic is configured to copy during the current clock cycle an instruction address from the available message into the instruction address latch if the first instruction address and the second instruction address cannot be executed during said next clock cycle associated with said current clock cycle.

33. The protocol engine of claim 32, wherein the scheduling logic is configured to copy during the next clock cycle not associated with the current clock cycle a no-operation instruction into the instruction latch when any of the plurality of memory transactions represented by the entries stored in the memory transaction array are in a waiting state and correspond to the memory line.

34. The protocol engine of claim 32, wherein the scheduling logic copies during the next clock cycle not associated with the current clock cycle a no-operation instruction into the instruction latch when none of the plurality of memory transactions represented by the entries stored in the memory transaction array are in a waiting state and correspond to the memory line; and there is no space available in the memory transaction array for the new memory transaction entry.

35. The protocol engine of claim 32, wherein the scheduling logic copies during the next clock cycle not associated with the current clock cycle a no-operation instruction into the instruction latch when none of the plurality of memory transactions represented by the entries stored in the memory transaction array are in a waiting state and correspond to the memory line; and the available message conflicts with any of the plurality of memory transactions represented by the entries stored in the memory transaction array.

36. The protocol engine of claim 28, wherein the available message conflicts with any of the plurality of memory transactions represented by the entries stored in the memory transaction array when any of the plurality of memory transactions represented by the entries stored in the memory transaction array corresponds to the memory line and is not in a waiting state.

37. The protocol engine of claim 28, wherein the selection logic is configured to activate during the current clock cycle the new memory transaction when none of the plurality of memory transactions represented by the entries stored in the memory transaction array are in a waiting state and correspond to the memory line;

there is space available in the memory transaction array for the new memory transaction entry;

the available message does not conflict with any of the plurality of memory transactions represented by the entries stored in the memory transaction array; and one of the first instruction address and the second instruction address can be executed during said next clock cycle associated with said current clock cycle.

38. The protocol engine of claim 28, wherein the selection logic is configured to, during the current clock cycle, set a state designation of the new memory transaction to running when none of the plurality of memory transactions represented by the entries stored in the memory transaction array are in a waiting state and correspond to the memory line;

there is space available in the memory transaction array for the new memory transaction entry;

the available message does not conflict with any of the plurality of memory transactions represented by the entries stored in the memory transaction array; and the first instruction address and the second instruction address cannot be executed during said next clock cycle associated with said current clock cycle.

39. The protocol engine of claim 11, wherein each of the series of input buffers is assigned a priority level from a plurality of priority levels, the scheduling logic configured to select the selected input buffer by reference to the priority level assigned to the selected input buffer, said selected input buffer having a highest priority level among one or more of the series of input buffers buffering an available message.

40. The protocol engine of claim 39, wherein the plurality of priority levels includes a first priority, a second priority, a third priority and a fourth priority, said first priority assigned to an input buffer configured to store messages of a type that always include a memory transaction identifier, said second priority assigned to an input buffer configured to store messages of a type that can include a memory transaction identifier, said third priority assigned to an input buffer configured to store messages of a type that do not include a memory transaction identifier, and said fourth priority assigned to an input buffer configured to store messages of a type sent only by an input/output device.

41. The protocol engine of claim 39, wherein the plurality of priority levels includes a first priority, a second priority and a third priority, said first priority assigned to an input buffer configured to store messages that are always solicited responses, said second priority assigned to an input buffer configured to store messages that can be solicited responses and unsolicited messages, and said third priority assigned to an input buffer configured to store messages that are never solicited responses.

42. The protocol engine of claim 1, further comprising a packet switch interface, an intra-chip switch interface, and a series of input buffers, said input buffers buffering messages received from said packet switch interface and said intra-chip switch interface during a clock cycle preceding the current clock cycle, said packet switch interface and said intra-chip switch interface also providing an unbuffered source of messages received by said packet switch interface and said intra-chip switch interface during the current clock cycle, wherein the selection logic is configured to select during the previous clock cycle from among said packet switch interface, said intra-chip switch interface, and said series of input buffers a message source for the current clock cycle; and said selection logic is further configured to extract a third instruction address from the message source and store said third instruction address in the instruction address latch during the current clock cycle when the instruction corresponding to the first instruction address cannot be executed during the next clock cycle associated with said current clock cycle and the memory transaction array does not include any active memory transactions associated with the current clock cycle.

43. The protocol engine of claim 42, further comprising a message source selection latch, said message source selection latch configured to receive during the previous clock cycle and maintain during the current clock cycle a message source identifier, the selection logic being configured to reference said message source identifier to access the message source during the current clock cycle.

44. The protocol engine of claim 42, wherein the selection logic is configured to select an input buffer, from the series of input buffer, as the message source instead of the packet switch interface and said intra-chip interface when said selected input buffer has an available message.

45. The protocol engine of claim 42, wherein the selection logic is configured to select from the series of input buffers an input buffer configured to store only messages that are solicited responses when said input buffer configured to store only messages that are solicited responses is buffering a message.

46. The protocol engine of claim 45, wherein the selection logic is configured to select from the series of input buffers an input buffer configured to store messages that are solicited responses and messages that are not solicited responses when said input buffer configured to store messages that are solicited responses and messages that are not solicited responses is buffering a message and said input buffer configured to store only messages that are solicited responses is not buffering a message.

47. The protocol engine of claim 46, wherein the selection logic is configured to select from the series of input buffers an input buffer configured to store only unsolicited messages when said input buffer configured to store only unsolicited messages is buffering a message and said input buffer configured to store only messages that are solicited responses and said input buffer configured to store messages that are solicited responses and messages that are not solicited responses are not buffering a message.

48. The protocol engine of claim 47, wherein the selection logic is configured to select from the series of input buffers an input buffer configured to store only messages corresponding to an input/output device when said input buffer configured to store only messages corresponding to said input/output device is buffering a message and said input buffer configured to store only messages that are solicited responses, said input buffer configured to store messages that are solicited responses and messages that are not solicited responses, and said input buffer configured to store only unsolicited messages are not buffering a message.

49. A protocol engine implementing a cache coherence protocol, for use in a multiprocessor computer system, the protocol engine comprising:
   a signal generator configured to generate a series of clock cycles;
   a memory transaction array configured to store entries representing a plurality of memory transactions, said plurality of memory transactions being associated with the series of clock cycles;
   a message source, said message source including a plurality of message ports and a plurality of input buffers, said plurality of input buffers configured to store messages received through said plurality of message ports;
   execution logic configured to execute during a current clock cycle an instruction corresponding to a memory transaction scheduled in a previous clock cycle, said memory transaction associated with the current clock cycle; and
   scheduling logic configured to:
      identify a plurality of memory transactions, if any, capable of execution during a next clock cycle associated with the current clock cycle, said plurality of memory transactions including one or more of:
         the memory transaction scheduled in a previous clock cycle;
         an active memory transaction associated with the current clock cycle stored in the memory transaction array; and
         a memory transaction corresponding to a message selected from the message source; and
      schedule during the current clock cycle one of the plurality of memory transactions according to a predefined prioritization scheme.

50. The protocol engine of claim 49, wherein the scheduling logic is configured to schedule the memory transaction scheduled in a previous clock cycle if identified by the scheduling logic as being capable of execution during the next clock cycle associated with the current clock cycle.

51. The protocol engine of claim 50, wherein the scheduling logic is configured to set during the current clock cycle a state of the memory transaction scheduled in a previous clock cycle if not identified by the scheduling logic as being capable of execution during the next clock cycle associated with the current clock cycle.

52. The protocol engine of claim 49, wherein the scheduling logic is configured to schedule the active memory transaction if identified by the scheduling logic as being capable of execution during the next clock cycle associated with the current clock cycle, and if the memory transaction scheduled in a previous clock cycle is not identified by the scheduling logic as being capable of execution during the next clock cycle associated with the current clock cycle.

53. The protocol engine of claim 52, wherein the scheduling logic is configured to set during a clock cycle after the current clock cycle a state of the active memory transaction to running.

54. The protocol engine of claim 49, wherein the scheduling logic is configured to schedule the memory transaction corresponding to the message selected from the message source if said corresponding memory transaction is identified by the scheduling logic as being capable of execution during the next clock cycle associated with the current clock cycle and if the memory transaction scheduled in a previous clock cycle and the active memory transaction are not identified by the scheduling logic as being capable of execution during the next clock cycle associated with the current clock cycle.

55. The protocol engine of claim 54, wherein the scheduling logic is configured to set during the current clock cycle a state of the memory transaction corresponding to the message selected from the message source.

56. The protocol engine of claim 49, wherein the scheduling logic is configured to select the message selected from the message source during a clock cycle preceding the current clock cycle for scheduling in conjunction with a corresponding memory transaction.

57. The protocol engine of claim 49, wherein the scheduling logic is further configured to select another message from the message source during the current clock cycle for merger into a waiting memory transaction.

58. The protocol engine of claim 49, wherein the scheduling logic is further configured to select another message from the message source during the current clock cycle to provide the basis of a new memory transaction.

59. The protocol engine of claim 49, wherein the scheduling logic is configured to directly select a message stored in one of said plurality of input buffers during a clock cycle preceding the current clock cycle.

60. The protocol engine of claim 49, wherein the scheduling logic is configured to speculatively select a message from one of said plurality of message ports during a clock cycle preceding the current clock cycle, said message not guaranteed to arrive during the current clock cycle.

* * * * *